United States Patent
Gagnon

(10) Patent No.: US 9,393,647 B2
(45) Date of Patent: *Jul. 19, 2016

(54) METHOD AND APPARATUS FOR VEHICLE REPAIR AND PAINTING

(71) Applicant: Morris Gagnon, Framington, NH (US)

(72) Inventor: Morris Gagnon, Framington, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 14/325,286

(22) Filed: Jul. 7, 2014

(65) Prior Publication Data

US 2014/0304962 A1 Oct. 16, 2014

Related U.S. Application Data

(63) Continuation-in-part of application No. 13/426,036, filed on Mar. 21, 2012, now Pat. No. 8,770,561.

(51) Int. Cl.
| | |
|---|---|
| B25H 1/00 | (2006.01) |
| B24B 11/00 | (2006.01) |
| B23P 6/00 | (2006.01) |
| B25B 11/00 | (2006.01) |

(52) U.S. Cl.
CPC . *B23P 6/00* (2013.01); *B25B 11/00* (2013.01); *B25H 1/0007* (2013.01); *Y10T 29/49746* (2015.01)

(58) Field of Classification Search
CPC ........ B25B 11/00; B25B 1/20; B25B 1/2405; B25B 5/10
USPC ................ 269/9, 24, 37, 42, 45, 71, 904, 905
See application file for complete search history.

(56) References Cited

U.S. PATENT DOCUMENTS

| | | | |
|---|---|---|---|
| 1,065,979 A | 7/1913 | Spencer | |
| 1,515,915 A * | 11/1924 | Valenta | B25H 1/00 219/158 |
| 2,081,602 A | 5/1937 | Rubenstein | |
| 2,458,370 A * | 1/1949 | Geddes | B21D 1/14 269/45 |
| 2,532,232 A | 11/1950 | Jensen | |
| 2,559,028 A * | 7/1951 | Oberwegner | B62B 3/10 248/647 |
| 4,268,020 A | 5/1981 | Wood | |
| 4,804,162 A | 2/1989 | Rice | |
| 4,838,199 A | 6/1989 | Weber | |
| 5,296,030 A | 3/1994 | young | |
| 5,586,743 A | 12/1996 | Sodolak | |
| 5,607,069 A | 3/1997 | Stroobants et al. | |
| 5,642,563 A | 7/1997 | Bonnett | |
| 5,707,450 A | 1/1998 | Thompson | |
| 5,713,783 A | 2/1998 | Szoke et al. | |
| 5,720,817 A | 2/1998 | Taylor | |
| 5,915,742 A | 6/1999 | Hung | |
| 6,024,348 A | 2/2000 | Ventura et al. | |
| 6,142,460 A * | 11/2000 | Irwin | B25B 11/00 269/37 |
| 6,158,701 A | 12/2000 | Deshler | |
| 6,173,947 B1 * | 1/2001 | Johnson | B05B 13/0285 269/17 |
| 6,234,432 B1 | 5/2001 | Piller et al. | |
| 6,296,239 B1 | 10/2001 | Sawyer | |
| 6,634,097 B1 | 10/2003 | Ikeda | |

(Continued)

*Primary Examiner* — George Nguyen
(74) *Attorney, Agent, or Firm* — Michael P. Kochka, Esq.

(57) ABSTRACT

A method, process and apparatus for repairing and repainting vehicles and vehicle components, specifically auto body repair and vehicle body components. The method and process reduce vehicle painting preparation time and eliminate material and waste material in the repair and repainting process. The apparatus is directed a vehicle component support stand which simulates the mounting of the body components on a vehicle to reduce time and expenses in the component repair and replacement process.

18 Claims, 56 Drawing Sheets

(56) References Cited

U.S. PATENT DOCUMENTS

| | | |
|---|---|---|
| 6,729,632 B2 | 5/2004 | Ferrigan |
| 6,763,286 B2 | 7/2004 | Metelski |
| 6,801,128 B1 | 10/2004 | Houston |
| 6,837,934 B1 | 1/2005 | Patrykus |
| 7,077,365 B2 | 7/2006 | Vincak |
| 7,093,809 B2 | 8/2006 | Hwang |
| 7,237,758 B2 | 7/2007 | Nikolic |
| 8,042,852 B2 | 10/2011 | Onuma et al. |
| 8,132,310 B2 | 3/2012 | Suga et al. |
| 8,215,623 B2 | 7/2012 | Bradsher |
| 8,770,561 B2 * | 7/2014 | Gagnon, Jr. ............. B25B 11/00 118/500 |
| 2004/0195472 A1 | 10/2004 | Clover |
| 2005/0051679 A1 | 3/2005 | Vincak |
| 2007/0022950 A1 | 2/2007 | Livingston |
| 2009/0184217 A1 | 7/2009 | Sprout |
| 2009/0269170 A1 | 10/2009 | Bradsher |
| 2012/0061894 A1 | 3/2012 | Cahill et al. |
| 2012/0240849 A1 * | 9/2012 | Deshler ............... B05B 13/0285 118/500 |
| 2013/0008763 A1 * | 1/2013 | Shimizu ................. B62D 65/06 198/617 |
| 2013/0026691 A1 | 1/2013 | Cahill et al. |
| 2014/0304962 A1 * | 10/2014 | Gagnon .................... B23P 6/00 29/402.18 |

* cited by examiner

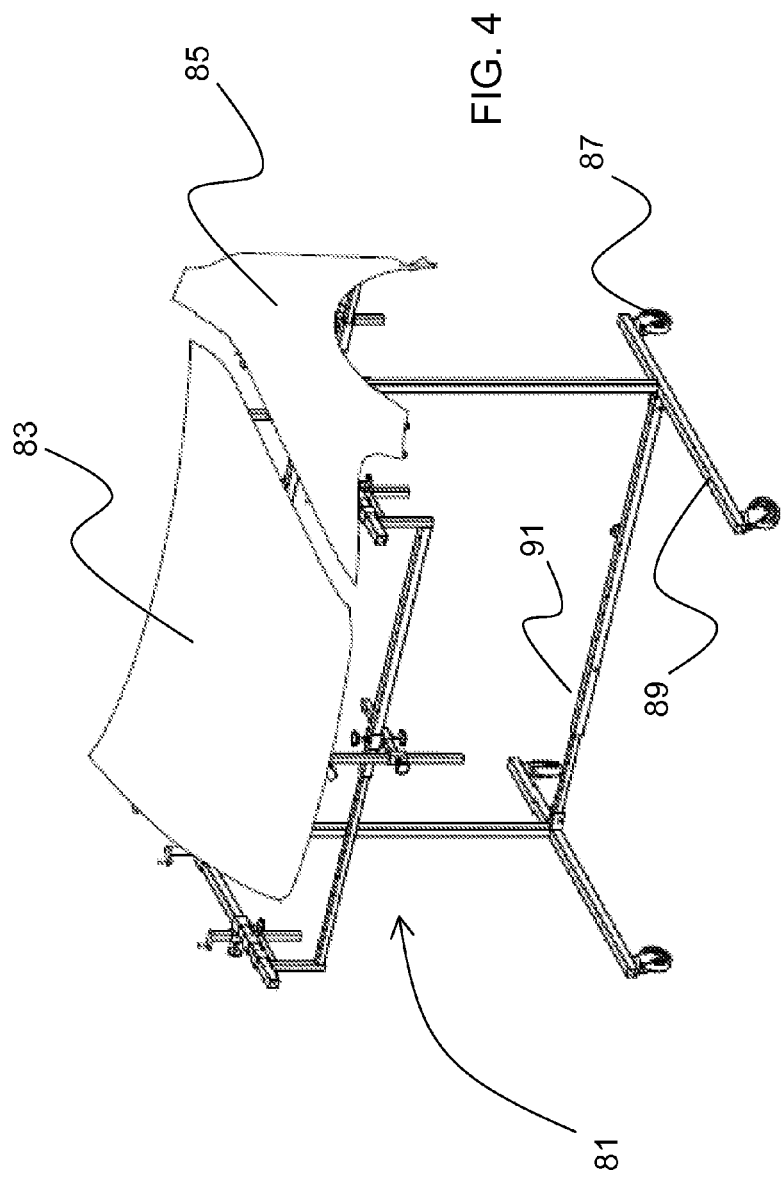

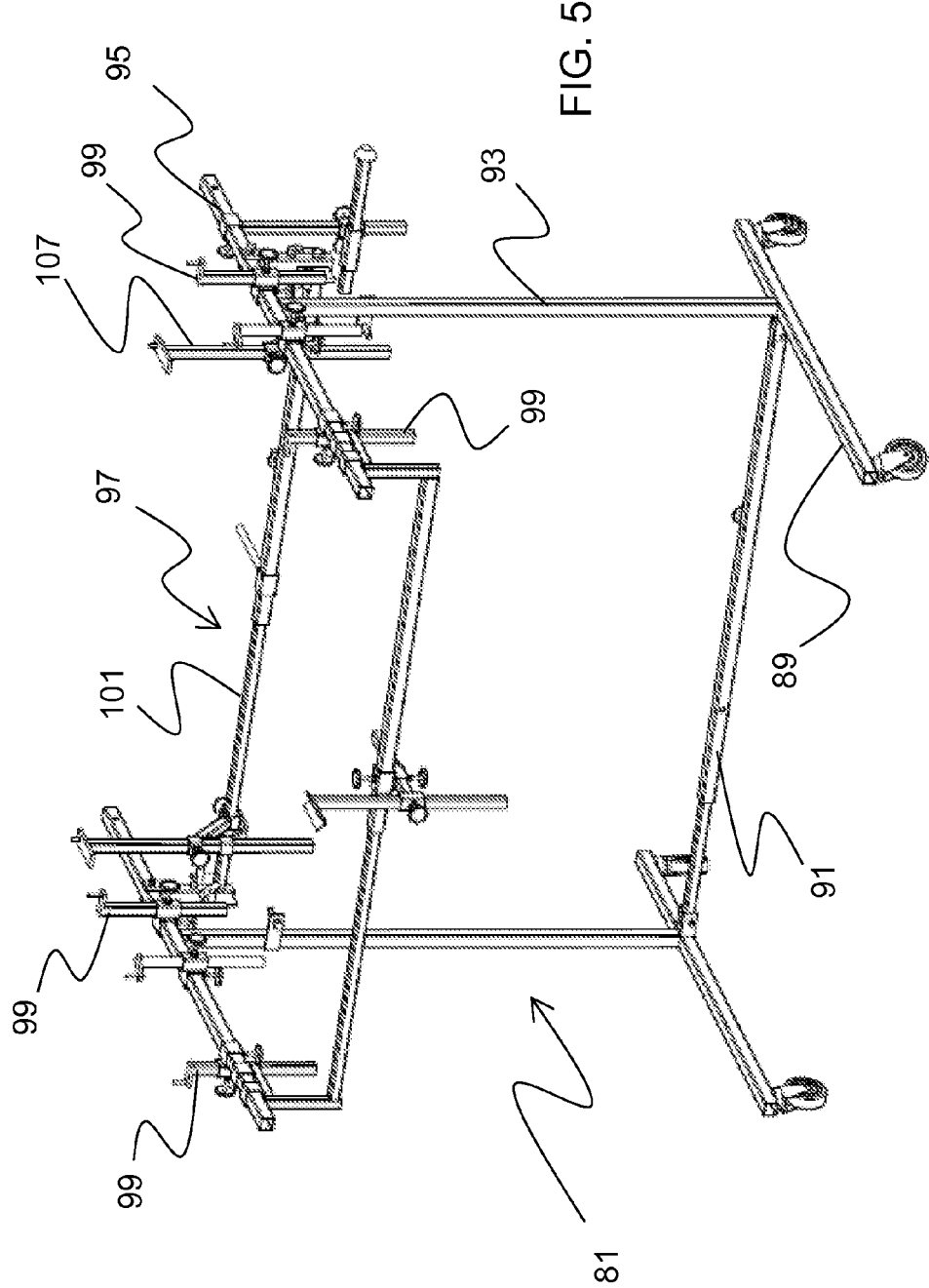

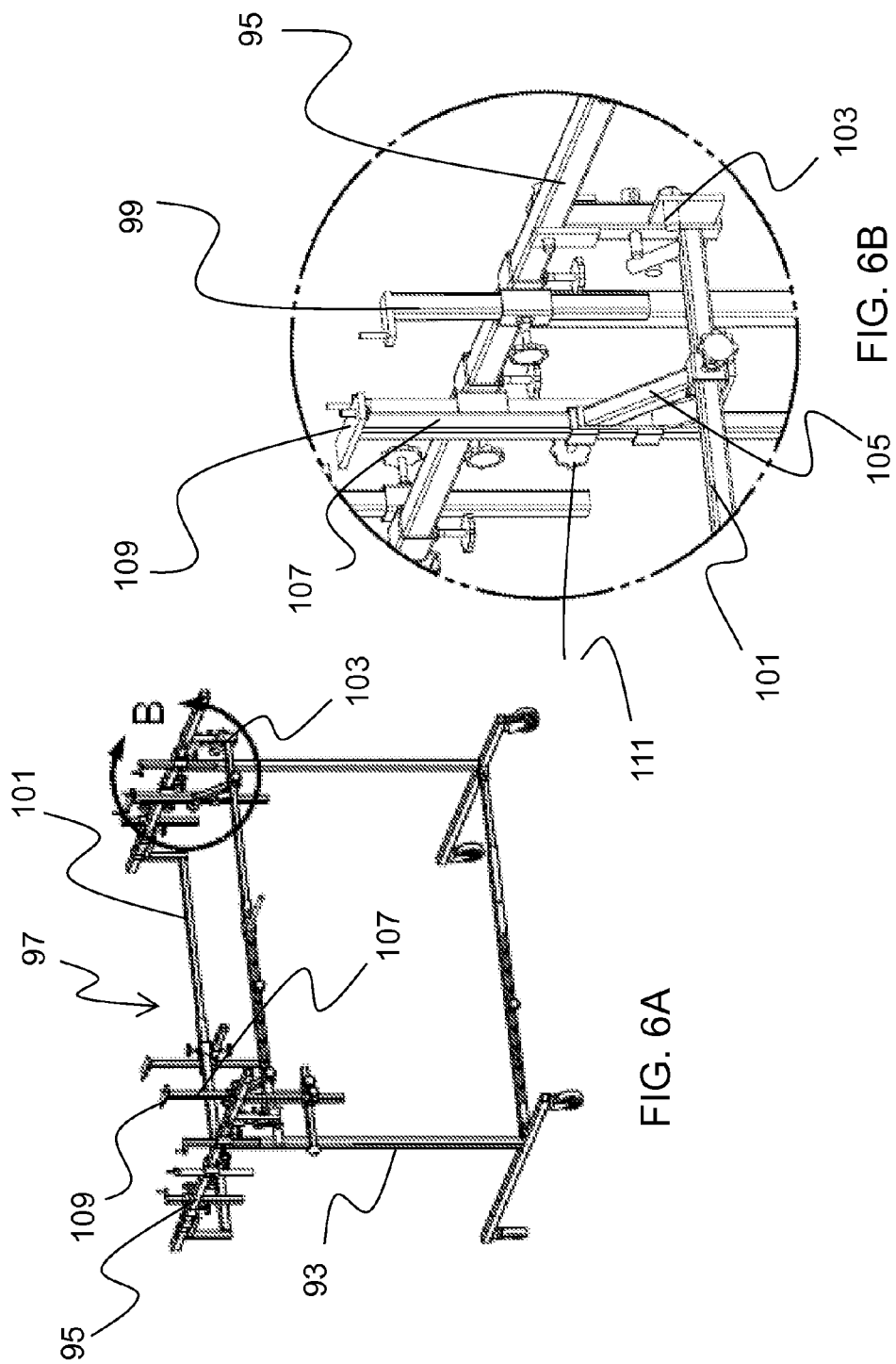

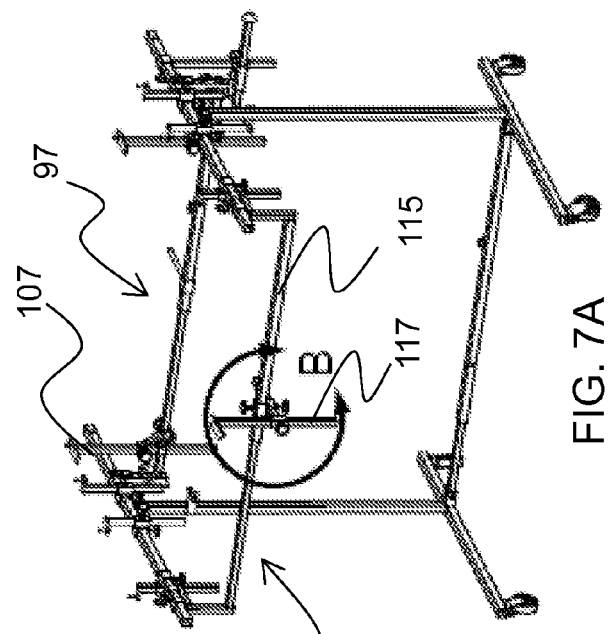
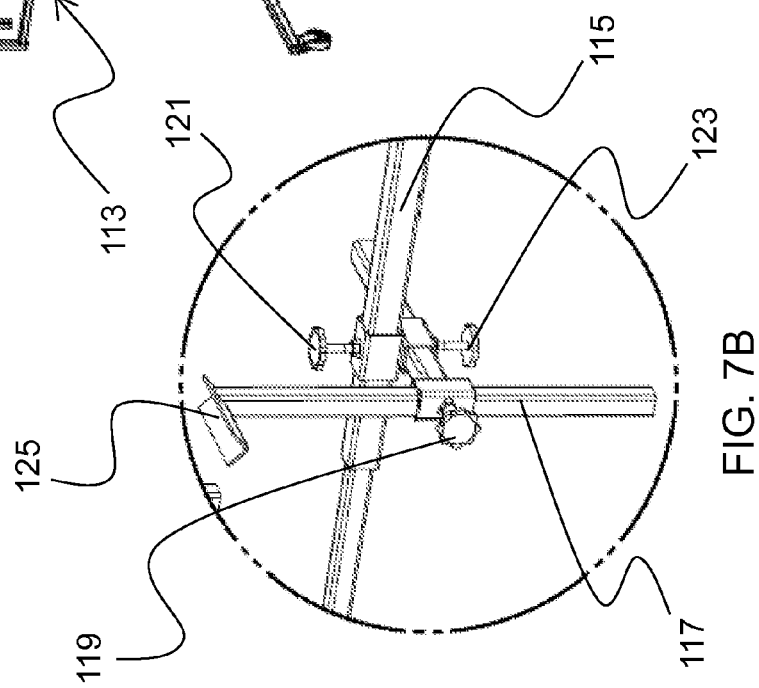

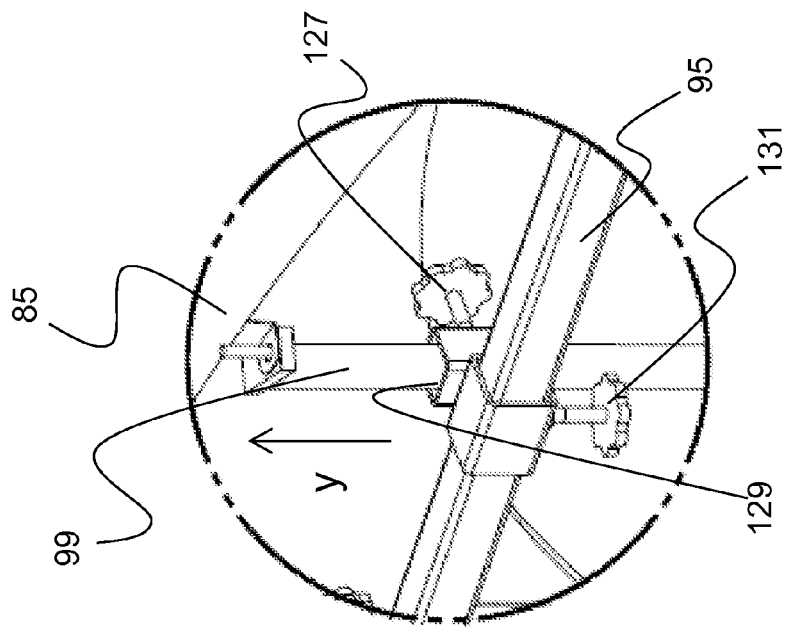
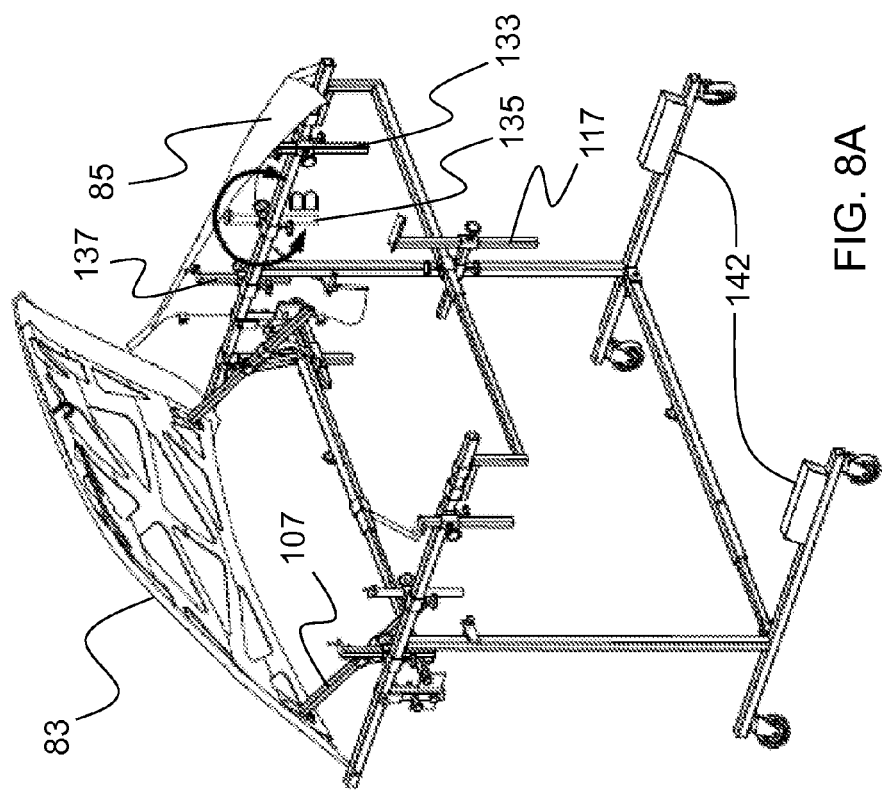
FIG. 8A
FIG. 8B

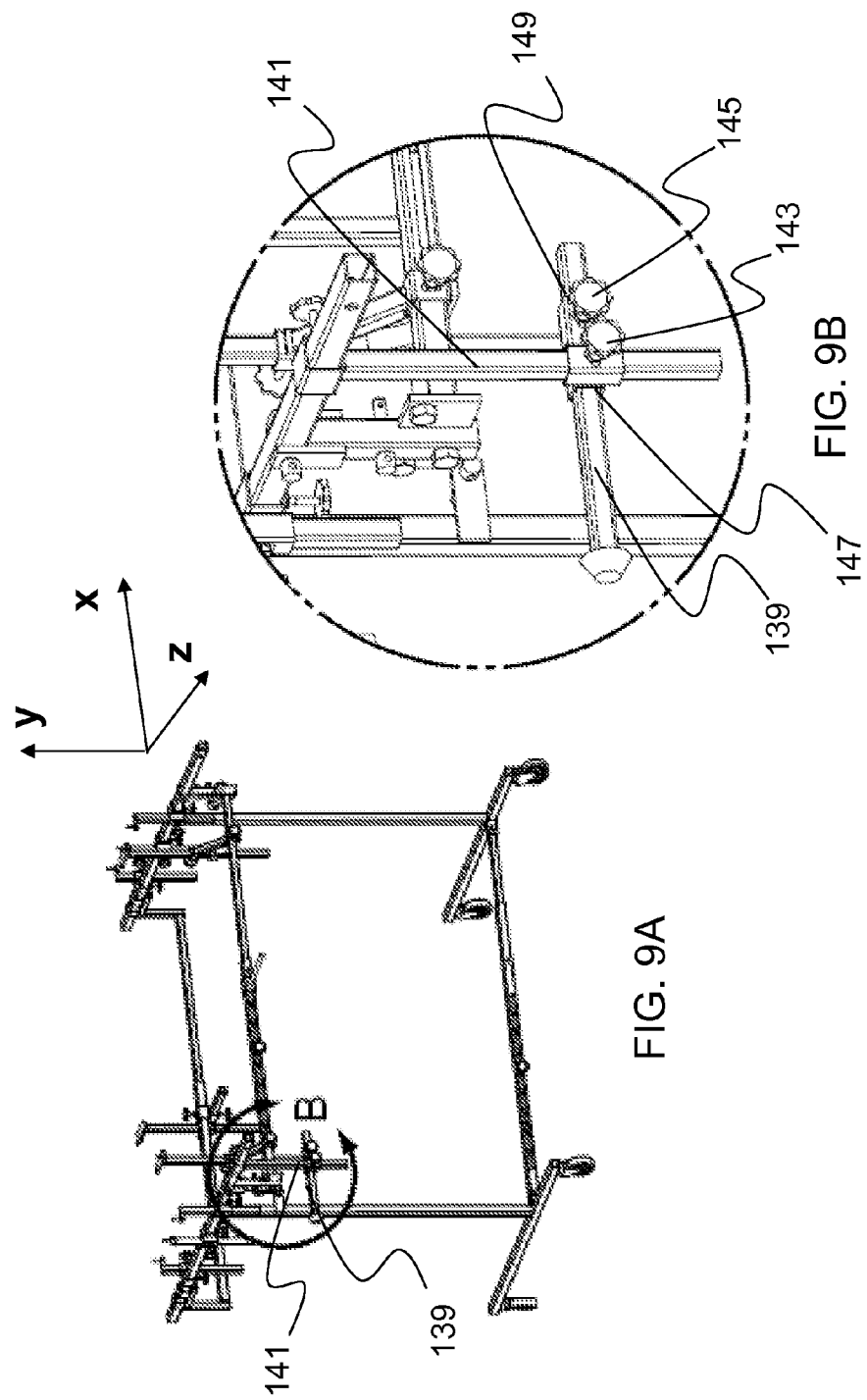

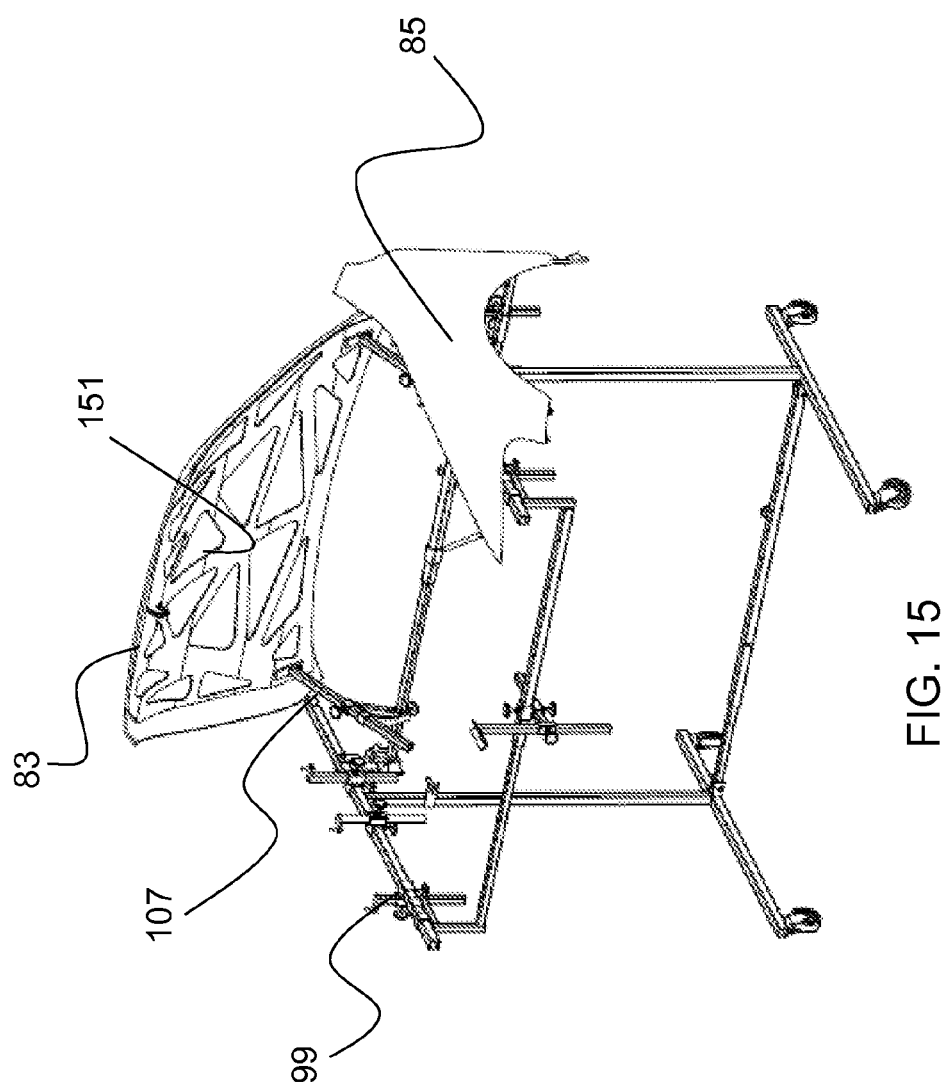

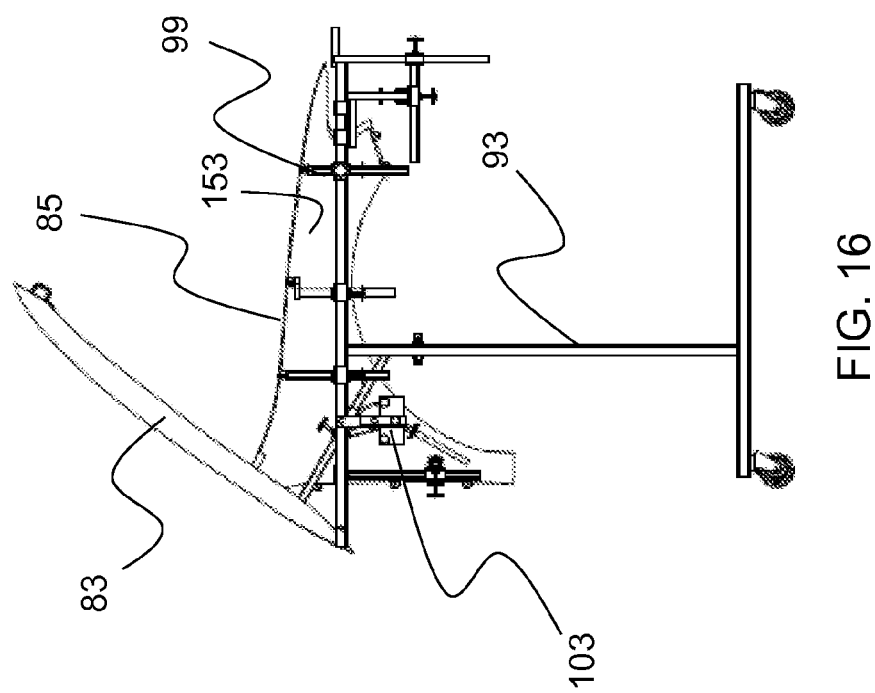

METHOD AND APPARATUS FOR VEHICLE REPAIR AND PAINTING

CROSS-REFERENCE TO RELATED APPLICATIONS

This application is a continuation-in-part of U.S. patent application Ser. No. 13/426,036, filed Mar. 21, 2012, entitled "Method and Apparatus for Vehicle Repair and Painting," which claims priority to U.S. provisional patent application Ser. No. 61/467,009, filed Mar. 24, 2011, entitled "Method and Apparatus for Vehicle Repair and Painting," the disclosures of which are incorporated by reference herein in their entireties.

BACKGROUND

1. Field of the Invention

This invention relates generally to a method, process and apparatus for repairing and repainting vehicles and vehicle components, specifically auto body repair and vehicle body components. This invention more particularly relates to a method and process for reducing vehicle painting preparation time and eliminating material and waste material in the repair and repainting process and also to a vehicle component support stand which simulates the mounting of the body components on a vehicle to reduce time and expenses in the component repair and replacement process.

2. Description of the Related Art

A substantial number of facilities provide services such as auto body repair, customization and restoration services. In such facilities it is often necessary to paint all or part of the vehicle and certain body components. In most cases in which a high-quality repair and paint finish are desired, the need arises to separate body components and accessories such as fenders, bumpers, hood, door and trunk as well as trim pieces for the painting process. Disassembly, or tear down, of component body parts and accessories on the vehicle is generally undertaken to ensure the high-quality repair and paint finish is applied to specific body components and panel surfaces as well as to the under surface and surrounding edges of each of the body components and panels.

It is well known that to achieve a high-quality paint job, repaired parts must first be repaired and then primed on the vehicle, after which they are prepped and then refinished with base and clear coats in the spray booth. In the case of replacement parts, the part itself is prepped, sealed, and jambed. Once this process is complete, the new panel is hung on the vehicle and the entire vehicle is brought into the booth. The vehicle must be masked in order to prevent any overspray from landing on unwanted areas of the vehicle. Only then can the new panel have the base and clear coats applied. In a typical painting facility of the type used in vehicle repair and repainting, a separate enclosed painting booth is usually provided. The spray booth helps to control the painting environment and provide necessary lighting and ventilation for the painting application. In addition, filtering systems operative in the spray booth minimize the amount of dust or other airborne particles within the environment. In addition, one or more air driven spray guns each coupled to a supply of compressed air by flexible hoses is operated by the painter to apply the paint to the body components and vehicle.

High quality and high-gloss mirror like finishes, in particular metallic paint finishes, are often made more difficult by the plurality of curved and faceted components typical of modern vehicle body parts. A major factor in achieving skillful painting results is the proper provision of lighting together with the ability to arrange and orient the body components in a desired manner. A skilled painter watches the light reflected off the body component during the painting to gauge proper application of paint.

In cases in which the entire vehicle is not brought into the booth, a paint stand would be used to hold the body components being painted. Paint stands for articles or body components being painted would ideally avoid entanglement with spray gun hoses and properly align body components which makes it easier to paint a piece. The currently available stands however do not allow easy alignment and orientation of body panels just as they would be on the vehicle when the vehicle is in an operable driveable state. Generally it is known in the art that in order to provide an appropriate paint finish, in particular a metallic paint finish which includes metal flakes in the paint itself, the component body parts which are to be painted must be placed back onto the vehicle and the entire vehicle placed inside the spray booth so that parts can be painted in their true orientation on the vehicle and permit appropriate blending with adjacent components and panels.

With the entire vehicle inside the spray booth it is also necessary to tape, paper and bag the entire vehicle, specifically covering and protecting the vehicle surfaces which are not to be sprayed or painted. This involves a substantial amount of adhesive masking tape to tape all surfaces and edges which do not require paint and to affix sheets of paper to certain critical areas around the vehicle which are not to receive paint such as windows, mirrors etc. Additionally, it is conventional to place a large bag or plastic sheet over the remainder of the vehicle including the wheels and parts of the undercarriage in order to eliminate any over-spray from the painting process which could contact other portions of the vehicle. This takes a tremendous amount of time, often more than one hour per vehicle, as well as tremendous amounts on the order of hundreds of square feet of paper, tape and plastic sheeting.

There exist painting stands for vehicle parts such as disclosed in U.S. Pat. No. 6,158,701 which discloses a painting stand for painting a fender. While the prior devices such as those described in the '701 patent provide some improvement in the art and in some instances have had certain commercial success, they are limited in their functionality and are subject to numerous faults. There are stands which permit for the mounting of multiple panels at the same time, but they do not provide for alignment and orientation of the body parts with immediately adjacent body parts to be blended and/or painted during the repair process just as if the components were on the vehicle.

There remains an unresolved and unfulfilled need in the art for a more efficient, cost-effective, versatile process for repairing and repainting vehicles which does not include preparing the whole vehicle for painting by masking and bagging the entire vehicle, and which allows and provides a stand which can simulate the appropriate alignment and orientation of the vehicle components and panels and which is easily movable and takes up less space in a conventional painting booth.

SUMMARY

Accordingly it is a general object of the present invention to provide an improved process for repairing and repainting vehicle components.

It is a more particular object of the present invention to provide a process which reduces the time necessary to prepare vehicle components for painting and more efficiently directs the skills of the repair and painting personnel.

It is another object of the present invention to reduce the number of touches on a vehicle as it moved in, out and around the repair facility during the repair and painting process.

It is still a yet further object of the invention to provide an improved painting stand for vehicle components which facilitates the painting and repair process for vehicle components.

It is a yet still further improvement of the present invention to provide a stand which ensures that the body components to be painted are blended, aligned and oriented in a matter highly similar to that which would occur if mounted on the vehicle itself.

Another object of the present invention is to reduce the amount of waste in paper, adhesive tape and plastic sheeting products which are conventionally used to protect a vehicle from overspray and reduce the amount of waste of these products into the recycle or waste stream.

The present invention is directed to an apparatus for supporting vehicle components for repair and painting comprising an articulated, rotatable hood support operable to position the hood in an open and closed orientation; an articulated fender support; an articulated door support; and wherein the hood, fender and door supports are operable to position the vehicle components in a driveable orientation to provide for blending of paint across the vehicle components.

These and other features, advantages and improvements according to this invention will be better understood by reference to the following detailed description and accompanying drawings.

BRIEF DESCRIPTION OF THE DRAWINGS

So the manner in which the above recited features of the present disclosure can be understood in detail, a more particular description of embodiments of the present disclosure, briefly summarized above, may be had by reference to embodiments, which are illustrated in the appended drawings. It is to be noted, however, the appended drawings illustrate only typical embodiments of embodiments encompassed within the scope of the present disclosure, and, therefore, are not to be considered limiting, for the present disclosure may admit to other equally effective embodiments, wherein:

FIG. 4 is a perspective view of an embodiment of a painting stand of the present invention including a hood and fender vehicle components thereon;

FIG. 5 is a perspective view of an embodiment of the painting stand of the present invention for supporting a hood and adjacent pair of fenders;

FIGS. 6A and 6B are perspective views of an embodiment detailing the hood support and fender support portions of the stand;

FIGS. 7A and 7B offer a perspective view of an embodiment of the front hood support of the stand;

FIGS. 8A and 8B are a perspective view of an embodiment of the stand including the hood in an open position and the hood support as well as a view of the fender support bars;

FIGS. 9A and 9B disclose a perspective view of a portion of the fender support and hood support;

FIG. 15 is a perspective view of an embodiment of the stand with the hood in an open position;

FIG. 16 is a side elevation view of an embodiment of the stand with the hood in an open position;

Figure 1A:
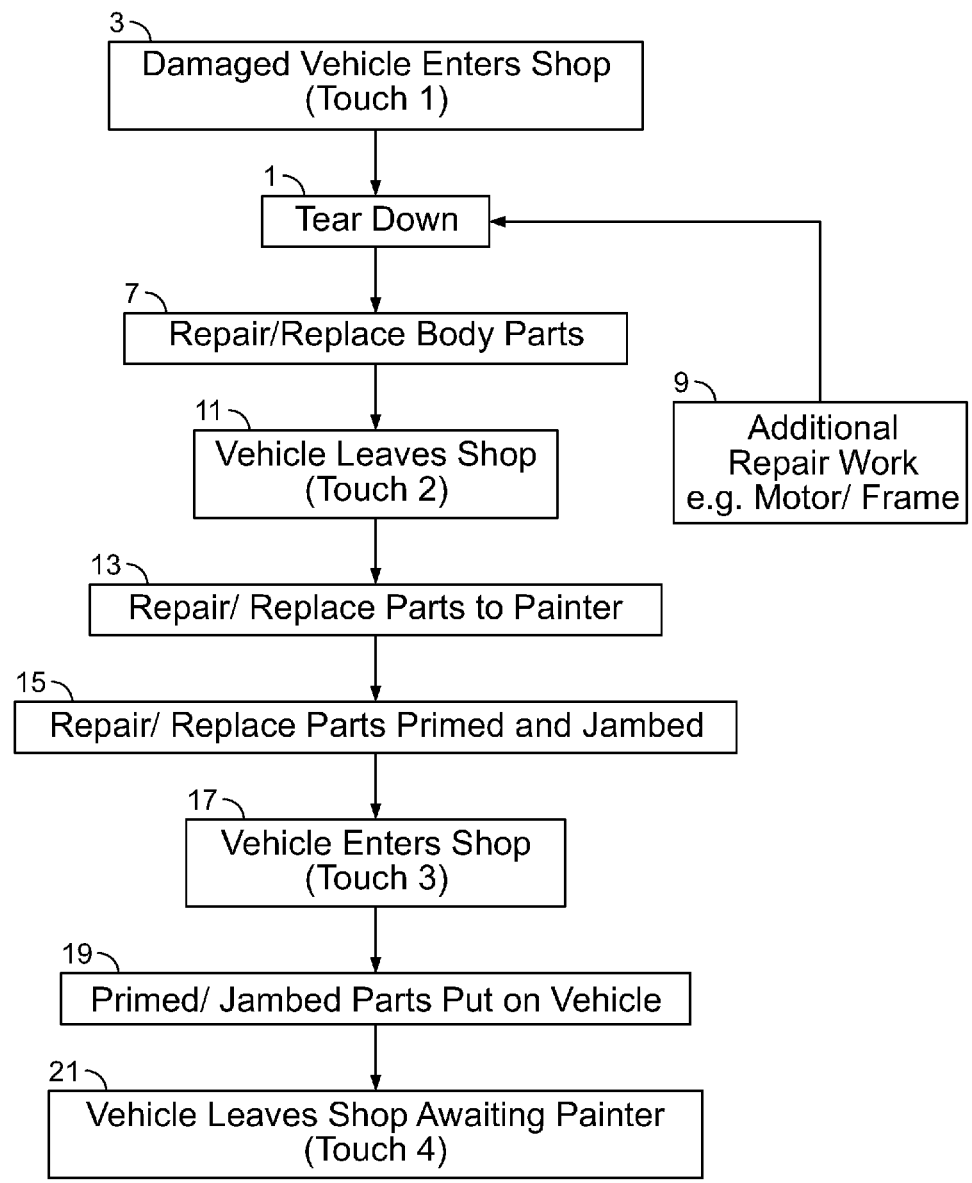
FIGS. 1A and 1B is a flow diagram of the prior art conventional method for vehicle and vehicle component repair.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Figure 1B:
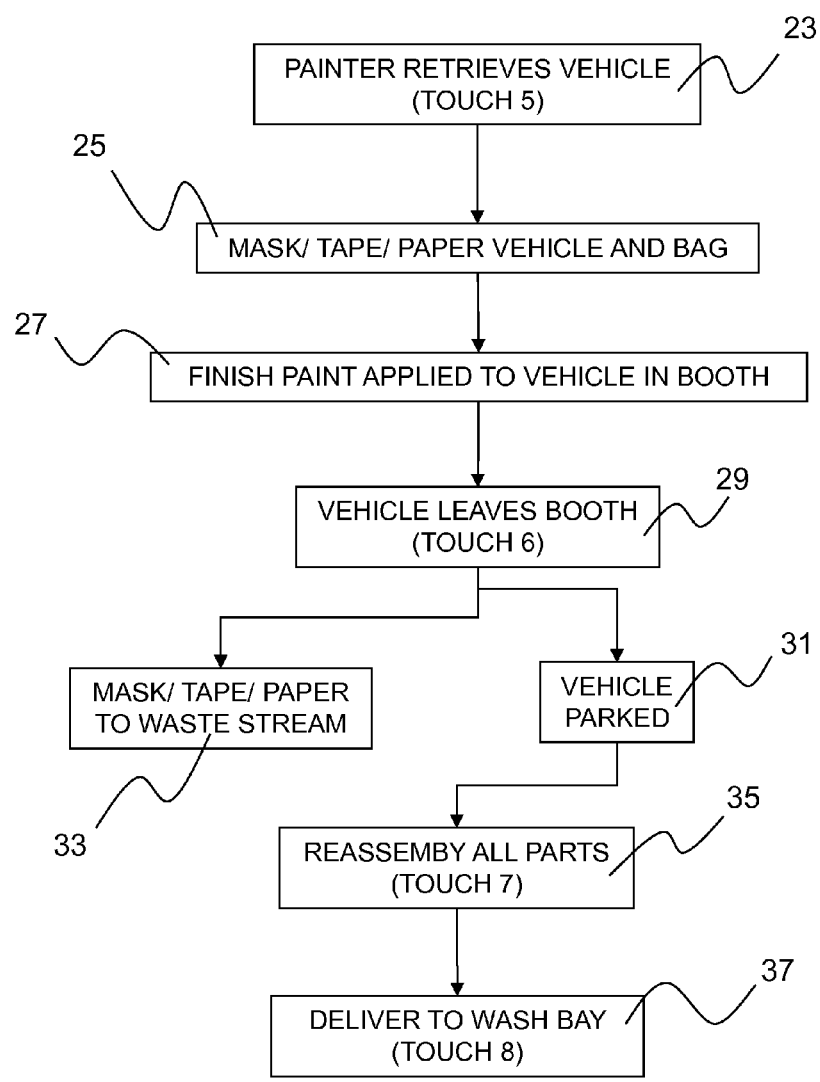

Observing FIGS. 1A and 1B, in a conventional auto body repair facility there is a known and fairly standard vehicle and component flow through the repair facility which provides for the adequate and complete repair of a damaged vehicle. It is to be appreciated that by the term "vehicle" used throughout this specification, it is understood that such a vehicle could include a motorcycle, truck, automobile or similar type of vehicle which needs substantial body and/or frame or other type of repair.

In the vehicle repair flow 1 of the prior art shown in FIGS. 1A and 1B, a damaged vehicle is brought to the repair facility and generally awaits its turn to be repaired in a parking lot near or adjacent the repair facility. In the first step 3 the damaged vehicle is brought into the repair facility by a technician called a "bodyman". This first step can also be referred to as a "touch" where the bodyman first "touches" the car to work on it. The efficiency of the vehicle and component flow is in many respects dependent upon the number of touches necessary to complete the entire repair process. Subsequent to the first touch (touch 1) the bodyman tears down the car to the extent necessary to repair the car. The tear down step 5 includes initially removing, for example, damaged main body components such as fenders, bumpers, doors, hoods, quarter panels or other similar body parts which are damaged and need direct and specific repair. The main body components are understood to be generally the outer body components and panels of the vehicle which are most visibly damaged in an accident. Repair of these main body components is hereinafter referred to as primary repair to differentiate from any secondary repair work which may be done to the vehicle as discussed in further detail below. Additional vehicle components such as trim, lights, inner cabin and door panels, seats, etc., may also be removed by the bodyman to facilitate secondary repair of the vehicle due to damage beyond that of the primary repair to the body components.

The vehicle is then touched again (touch 2) 11 and returned to the parking or storage area while the body components, now removed from the vehicle, are repaired or replaced by the bodyman. It is to be appreciated that the vehicle may also remain to some extent in the repair facility for other repair work besides that of the main body components. For example the frame of a vehicle may be straightened, or repair work done in the cabin of the vehicle may also be accomplished at this time. In any event, once any secondary repair 9 is completed, the vehicle is subjected to the second touch and returned to the parking area to await the completion of initial body work on the main body components.

With the body components still off the car and now repaired or replaced by the bodyman, the bodyman sends the body components to the painter at step 13 to be primed and jambed. The priming and jambing step 15 includes application of a priming paint to seal bare metal, repaired, fiberglass, epoxy, plasticized surfaces or any other underlying and exposed surface portions of the body components and to provide an adequate base upon which a final paint application can be provided. Jambing refers to the application of a base coat of paint to areas generally not visible when the car is in a finished and in a driveable condition, for example the undersurface of the hood, the under-surface of fenders and bumpers. The base coat is usually the same color as the finish coat which will be subsequently applied to the outer surfaces of these components but because the surfaces to which it is applied are seldom if ever seen, the jambing process and base coat applied thereby does not require the same attention to detail as the finish paint.

Once the body components are primed and jambed the components are returned to the bodyman to be reassembled on the vehicle. The bodyman must again retrieve the vehicle from the parking area at step 17, touch 3, and bring the vehicle back into the shop to reattach the primed and jambed parts onto the vehicle at step 19. It is important that the body components are reattached onto the vehicle in their original and final orientation and configuration prior to painting. This is critical because the body components must be configured with one another on the vehicle so as to be positioned immediately next to the adjacent body component or panel so that the final paint coat which is applied to the vehicle can be appropriately blended across the repaired and adjacent component or panels. It is also important as is conventionally done that the body components be placed on the vehicle so that components are properly aligned and oriented in a 3-dimensional manner with respect to one another and the vehicle as a whole so that the vehicle can be painted correctly.

Painting a finish coat, particularly a metallic based paint coat, on a vehicle requires the body parts be configured immediately adjacent one another and correctly oriented in the 3-dimensional plane with respect to the vehicle and one another so that the paint is first applied in a uniform and blended manner and secondly dries in a way which allows the metallic molecular matrices structure of the paint to properly align. The orientation of the body panels in their normal state, i.e. as they are mounted in a final driveable condition, in the 3-dimensional plane on the vehicle ensures that the metallic molecular structure of the paint dries on the components just as the components and finish paint will be seen by anyone observing the vehicle. Adjacent body panels which were not damaged, but are immediately adjacent repaired or new panels or components, must be blended. The term "blended" generally means a certain amount of overspray is allowed to extend over and onto the "blend panel," as it is often referred to, during the finish coat painting process. The blending technique is an important skill and method which a painter uses to ensure that the finish paint coat applied to the damaged body components of the vehicle appear uniform and consistent with the remaining previously (often factory) painted and undamaged body components of the vehicle.

Metallic paint, also called polychromatic or "metal flake" paint, is used on the majority of new automobiles sold. Metallic paint can reveal the contours of bodywork more than non-metallic, or "solid" paint. Close-up, the small metal flakes included in the paint create a sparkling effect. The look of metallic paints is to a great extent dependent upon how the paint dries, and in what orientation the metal flakes are solidified in the dried paint. The metallic paint dries differently and has a different final appearance depending on the planar orientation of the body panel during painting. The metallic flakes in the paint dry differently depending on whether they are sprayed onto the component surface aligned in a horizontal surface, vertical surface or at any angle there between. For example if the top surface of a vehicle hood, which of course lays substantially horizontal in its final orientation on a finished vehicle, is painted while hanging in a vertical manner in a paint booth as is often done, the metallic flakes will be oriented and lie differently than paint applied to an adjacent surface such as the top edge surface of a fender. In the final driveable condition of the vehicle, the vehicle hood is substantially planarly aligned with the top edge surface of the fender. If the fender was painted in a substantially conventional manner aligned at least close to its final position on a vehicle, the flakes which dry on the essentially horizontal aligned upper top edge surface of the fender will lie in an entirely different orientation from those on the vertical top surface of the hanging hood. This will create a visible discrepancy in the metallic paint between the top surface of the hood and the immediately adjacent top edge surface of the fender.

In order to get a uniform and consistent paint application and correct visual appearance of adjacent body components and/or panels when the vehicle is in a complete driveable condition, it is thus conventional to remount and reattach all the repaired and replaced, primed and jambed body components and panels back onto the vehicle in their final, complete and driveable position and place the entire vehicle in the paint booth for the finish painting. This of course requires that the bodyman reattach and remount the repaired/replaced primed and jambed parts back on the vehicle. Once this is complete, the vehicle is again returned to the parking area, touch 4, at step 21 to await its turn to be prepped and put into the painting booth for the final finish painting.

Next, at step 23 shown in FIG. 1B, the painter retrieves the vehicle again, touch 5 and brings the vehicle to a paint prep area, or even directly into the paint booth where the vehicle is then prepped for painting. In most repair facilities only one vehicle at a time can fit in the painting booth. The preparation of the vehicle for painting at step 25 is particularly time and materials consuming. With the entire vehicle in the booth for painting a substantial amount of masking, taping, papering and bagging of the vehicle must occur to protect against paint adhering to inappropriate portions of the vehicle which are not being repainted. With the entire vehicle in the paint booth, any surface which is not to receive paint, e.g. direct paint or blending, must be covered or protected from overspray during the painting process. The painter and painting staff spend a substantial amount of time (usually one to two man hours) masking portions of the vehicle that cannot receive any overspray paint. For example if a driver's side vehicle door has been repaired and is being repainted, the rear driver's side door and front left fender may need to be blended during the painting process, so all three of these body components must be left exposed. Every other component of the vehicle must be protected from overspray. This requires a substantial amount of tape and paper to cover over the components immediately adjacent the exposed components. Also, once inside the painting booth, the vehicle is bagged, i.e. covered and encased with a plastic sheet, which covers any portion of the vehicle not covered with tape and paper so that no paint reaches any portion of the tires, rims, windows, etc. on the rest of the vehicle. Again, this is a time-consuming and materials intensive procedure using a substantial amount of special automotive masking tape and protective paper as well as many square feet in the range of at least 100-200 sq.ft, of plastic sheeting to cover the entire vehicle.

Once the vehicle is entirely prepped, the finish paint is applied by the painter in the booth to the vehicle at step 27. The final finish painting may require several coats of different paint on top of the primer including the underlying metallic paint as well as a clear coat to protect the metallic paint and give the vehicle a high gloss appearance. As discussed above, during painting of the metallic coat the metallic paint may be sprayed not only onto the repaired component but may also be feathered or blended onto at least a portion of the adjacent panels or components to provide a uniform finish and appearance.

Once the painting is complete, the vehicle is stripped of the tape, paper and plastic at touch 6 at step 29 and usually returned in to the parking area 31 to await the final reassembly of all parts by the bodyman. It is to be appreciated that all of the stripped off tape, paper and plastic painted with overspray, while potentially recyclable, is essentially waste that cannot be reused in the repair facility. The paper, tape and plastic sheeting is either placed into recycling if possible or into a disposal stream for such materials at step 33, as it cannot be reused in the present form in the repair facility. Stripped of the prepping materials the vehicle is then parked in the parking area and awaits the bodyman who retrieves the vehicle at step 35, touch 7, and returns the vehicle into the body shop to have the remaining components such as trim, door panels, or interior cabin panels refitted onto the vehicle. The vehicle is then at step 37 and touch 8 delivered to a wash bay for a final cleaning before being given back to the customer.

It is important to recognize that by reducing the number of touches of repair shop personnel, specifically those of the painter and bodyman, and movement of the car, a significant amount of time is saved in the entire process of the vehicle repair. More importantly, the reduction of touches on the vehicle by these personnel reduces the amount of man-hours spent moving vehicles by the painter and bodyman who are more effectively employed in using their skills to fix and paint vehicles. Therefore, besides the time savings of touches, the bodyman and the painter can be more effectively employed in repair work and painting work for vehicles and components in the product flow through the repair facility. The novel process and apparatus described in a first embodiment below reduces the touches to a vehicle and greatly reduces time, energy and material used and discarded in the repair and repainting of a damaged vehicle.

Figure 2:
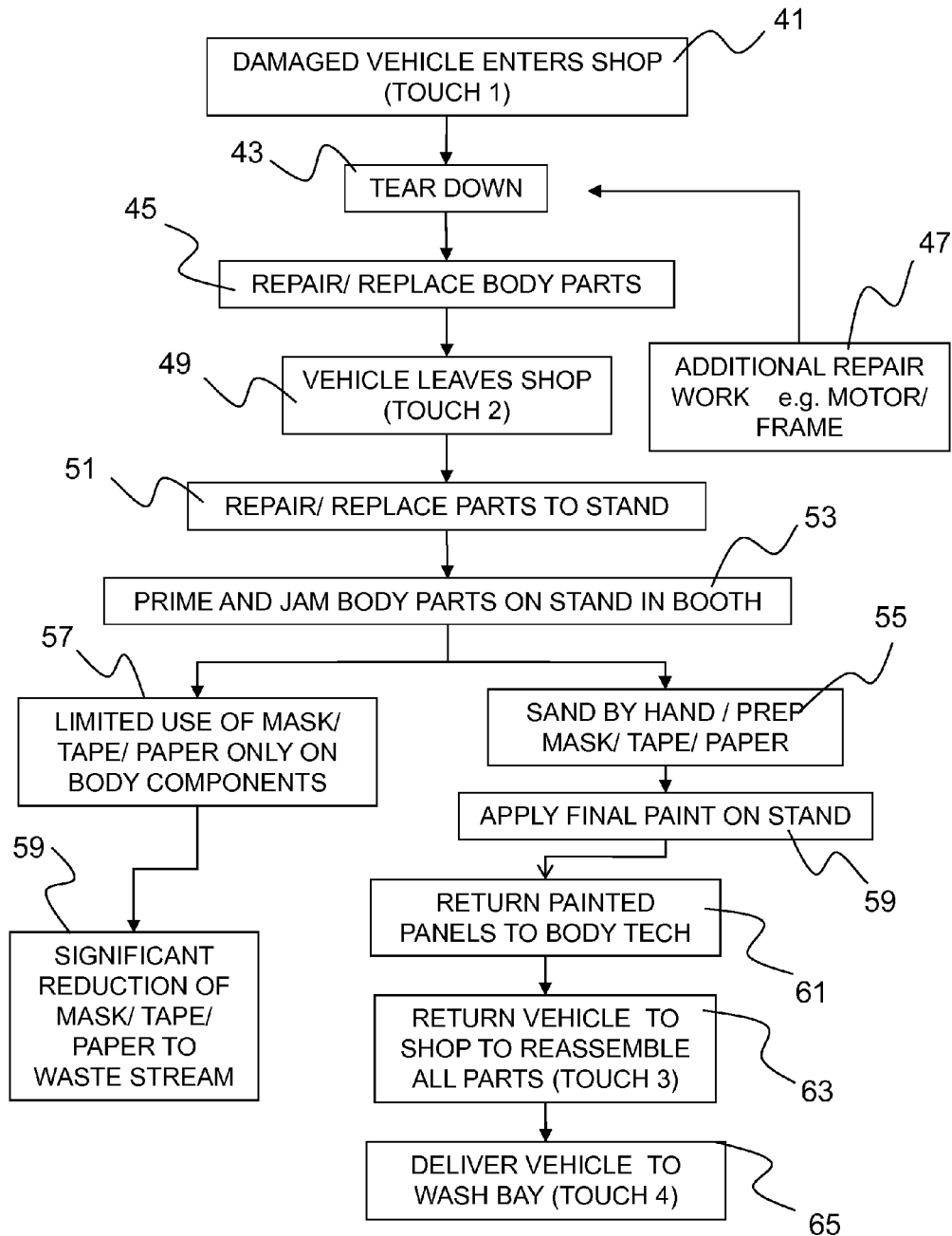
FIG. 2 is a flow diagram of one embodiment of a process of the present invention which details in an improved repair and repainting method and process for automobile body components.

The process shown as a flowchart specifically in FIG. 2 makes use of special body component stands for receiving and handling the repaired body components entirely through the painting process without having to reattach and remount the body components back onto the vehicle. The use of such stands as described in further detail below not only reduces the number of touches to the vehicle, but also eliminates waste associated with prepping the entire vehicle for finish painting as described above. In general, as will be explained in further detail in the following description relating specifically to the component stands themselves, the component stands simulate the particular alignment and orientation of the body components for both priming and jambing, and more importantly, finish painting of components in the appropriate orientation and alignment with one another without reattaching and remounting body components onto the vehicle and placing the entire vehicle in the painting booth. In this novel process, the necessary body components which require painting and/or repair are placed on a specially designed stand which can be easily introduced into the painting booth and takes up significantly less space therein relative to an entire vehicle. This frees up considerable space in the painting booth providing for any number of other painting operations to be simultaneously occurring. Also, this method and the component stands eliminates the necessity to have the vehicle in the shop for the painting process and critically reduces the amount of time and material used in paint preparation for the final paint finish to be applied to the components.

Just as in FIG. 1A a damaged vehicle is brought into the repair facility shops by the bodyman at step 41, touch one. Also similar to the conventional process, the bodyman tears down the vehicle at step 43, to accomplish body component repairs or replacement at step 45. The vehicle is moved back out to the parking area at his point, or as described previously, other repairs 47 to frame, prime mover may be done before returning the vehicle to the parking area for touch 2 at step 49. Once the body components are repaired or replaced by the bodyman, the parts are given to the painter to be primed and jambed as before. However in the present embodiment the components are supported on the component stand in a particularly defined alignment and orientation at step 51.

The body components, including any components which need to be blended with the repaired/replace components, are placed upon a specially designed stand, or stands, to be further described in detail below, which supports the body components of the vehicle in alignment and orientation similar to that as if they were on the vehicle. Additionally, where the hood is one of the body components, the hood is rotatable on the stand about its normal opening axis to facilitate priming and jambing the under-surface of the hood. Once placed on the special stand by either the bodyman or the painter, the body components are primed and jambed in the booth at step 53.

Importantly, instead of the painter next retrieving the vehicle as in the conventional procedure, so that the repaired or replaced body parts would be placed on the vehicle in their final alignment and orientation to facilitate receiving the final finish paint, the body components remain on the stand. Remaining on the stand, the primed and jambed body components may be sanded and prepped for a final paint finish at step 55 without being remounted or reattached to the vehicle.

Because of the nature of the stand providing the correct alignment and orientation of the component parts with respect to one another and just as they would be on the vehicle, there is no further preparation requirement for the entire vehicle. This time and material step in the conventional repair procedure is almost, if not entirely, eliminated. There may be some masking and taping of certain portions of the body components for the final finish paint application, for example the inside surface of a door component, however this is a very small time and material prep job 57 compared to masking, taping, papering and bagging the entire vehicle. By way of example, if a door was damaged and repaired, and is now primed and ready for a final painting on the outer surface of the door, the only portion of the door that need be masked off may be the inner surface and perhaps the window, assuming the door is a loaded door having all its window and latch components as opposed to being a stripped down door.

Without having to mask, paper and bag the entire vehicle, the finish paint application can be almost immediately undertaken at step 55 after the priming and jambing paint is dry. Again, this is because of the specific orientation and alignment of individual body components on the stand where the finish paint application occurs just as if the components where remounted on the car. The stand supports both the repaired/replaced components, along with any components which need to be blended with the repaired/replaced components during the final finish paint application. Once the finish paint is applied to the components and blended with any adjacent components in the booth at step 59, the repaired/replaced components may be returned to the body technician for inspection and adjustment if necessary at step 61. After these final adjustments the blended components are complete and are ready to be remounted or reattached to the vehicle.

At step 63 the vehicle is returned to the shop with a touch 3 where the reassembly of all components and other parts is accomplished generally by the bodyman. After reassembly the bodyman delivers the vehicle to the wash bay at step 65, touch 4, for final preparation and return to the customer. This new method has thus eliminated four major touches to the vehicle in the repair process saving man hours and vehicle time in the repair facility as well as provided more space in the booth for several vehicle body component sets to be painted and prepped where only a single vehicle and its body components would typically have fit before. Critically, there is also a significant savings in time and material by substantially eliminating the prep phase for the entire vehicle in the painting booth as noted at step 67. In the conventional method the entire vehicle has to be masked with tape along edges and portions of the body which should not receive paint. Additionally, large amounts of paper, held in place by the tape, is used to cover a significant portion of the remainder of the vehicle body which was not intended to be painted. Also, the bagging of the vehicle with large sheets of plastic as is conventionally done is also eliminated. This reduces tremendously the use of tape, paper and plastic products in the repair process saving cost and time for the repair facility and importantly also eliminating large amounts of these products from the waste and recycle stream.

With the vehicle now ready for delivery to the customer after only 5 touches as compared to the known process of at least 8 touches, it is to be appreciated that this process saves time for the painter as well as the bodyman and increases their productivity in not having to retrieve and return the car to and from the parking area repeatedly. The repair facility as a whole is more efficient and uses less prep material by not necessitating the remounting of components on the vehicle after priming and jambing. The above described process and method is facilitated by the special stand which arranges the components in the same manner as on the completed and finished vehicle, and is described in further detail below.

Figure 3:
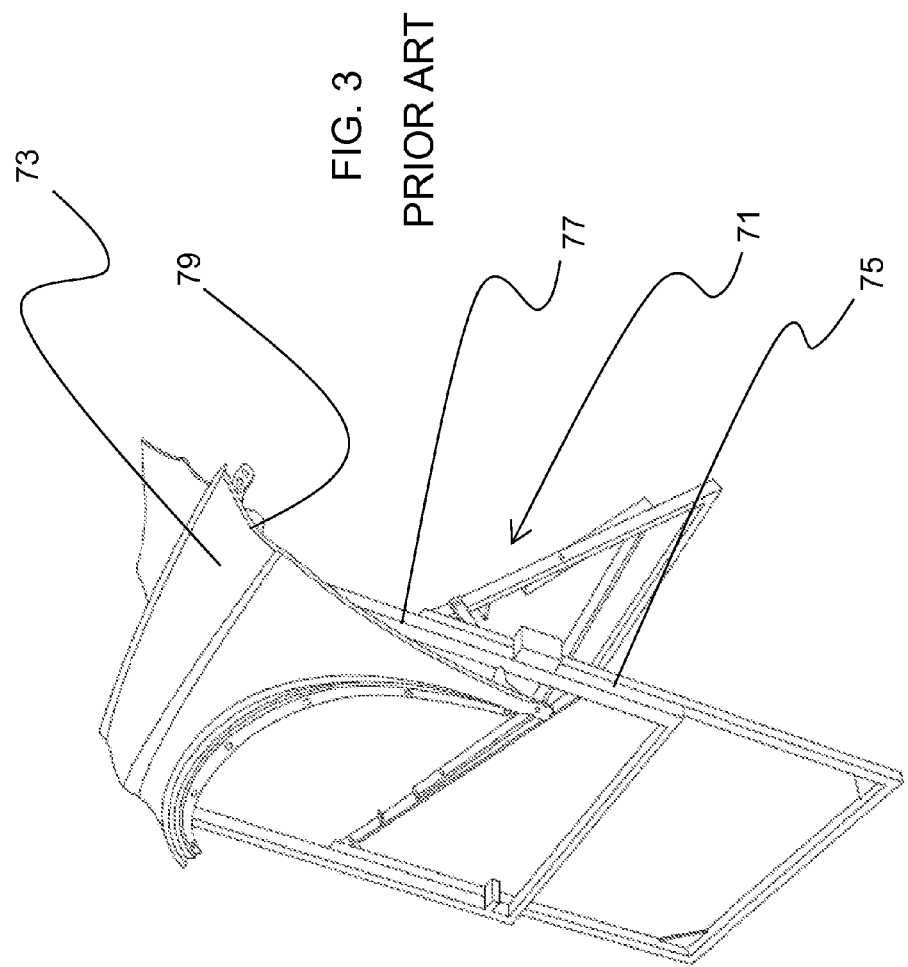
FIG. 3 is a perspective view of a prior art painting stand.

FIG. 3 sets forth a perspective view of a prior art component stand 71 which is shown supporting a front quarter panel fender body component 73 of a vehicle. The prior art stand has two u-shaped legs 75 which are spread apart as a base to define an upper u-shaped frame 77 upon which the fender 73 is supported. As is readily apparent the fender 73 is forced by this stand 71 to lay at an angle substantially matching that of the plane formed by the u-shaped frame 77. This plane is approximately 30 degrees from vertical, and while this does present the front surface of the fender 73 at a desired height and in an orientation that can be readily painted, the fender 73 is at a completely different angle then when it is attached to the vehicle. Thus, as described above, a metallic paint applied to the outer surface of the fender 73 will not orient its metallic flakes in a corresponding manner with those of the immediate adjacent panels and components which were painted in a more vertical orientation such as the vehicle door, or even those components painted in a horizontal manner such as the hood.

Additionally, without the ability to orient the fender 73 in appropriate proximity and alignment with immediately adjacent components and panels, the paint applied to the fender 73 cannot be blended with such an adjacent component. This can lead again to a distinctly different visual appearance between immediately adjacent components and panels. Also, lying in such a 30 degree plane on the frame as shown, the fender 73 cannot be easily jambed, i.e. the back side of the fender 79 cannot be readily primed and base painted without physically significantly re-orienting and supporting the fender 73 in an entirely different manner, or even supporting the fender on a different stand.

FIG. 4 is a perspective view of an embodiment of the special component stand 81 of the present invention and used in the above described process to facilitate the more efficient material reducing and cost savings vehicle repair as previously described. The component stand 81, referred to hereinafter as the stand 81, is designed to directly support a vehicle hood 83 and both front fenders of a vehicle (only one fender 85 is shown here for purposes of simplicity). Importantly, the hood 83 is shown here in a closed position as it would be on the vehicle and in close proximity and generally aligned with the front fender 85 of the vehicle correspondingly supported in the same alignment and orientation that the hood and the fender would be on the vehicle. The stand 81 is provided as shown here with four wheels 87, each disposed on either ends of base struts 89 which permit the stand 81 and supported components to be wheeled easily around the paint booth and the repair facility. The base struts 89 are separated by a telescoping center beam 91 which permits the base struts 89 to be adjusted across a variable stand width generally defined by the size of the vehicle hood 83.

FIG. 5 is a perspective view of the stand 81 without any supported vehicle components which details the main support legs 93 extending upwards from the base struts 89. Each of the support legs 93 have an upper end which support a respective upper cross member 95. Each of the upper cross members 95 are a main support for an opposing end of a rotatable hood mount 97 and also for opposite disposed fender supports 99 on either side of the hood mount 97. The upper cross members 95 are adjustable cooperatively width-wise based on the adjustment of the telescoping center beam 91 noted above.

The hood mount 97 includes an adjustable telescoping cross-brace 101 which extends between opposing pivot points 103 each supported below the respective upper cross member 95. The pivot points 103 are linearly adjustable along a portion of the upper cross member 95 so as to adjust for different hood lengths as better shown in FIGS. 6A and 6B. Extending from the telescoping cross-brace 101 are a pair of support arms 105, each support arm respectively supporting an adjustable hood bar 107. The hood bar 107 has a first end 109 which is designed to bolt directly to an inside surface and connection point on the hood 83 and hence directly support the hood 83 on the stand 81. The general vertical position and height of the hood 83 on the stand 81 is adjusted by a threaded friction knob 111 extending through a portion of the support arms 105 and contacting a surface of the hood bar 109. When the hood bar friction knob 111 is loosened the hood bar 109 is free to be adjusted in a vertical manner as best shown in FIGS. 6A and 6B to adjust the height of the hood 83. It is to be appreciated that the vertical position discussed here with regards to the hood bar 109 is relative to a closed position of the hood support 97 where the hood 83 is supported in a substantially horizontal manner as in FIG. 4 as it would be on a driveable vehicle.

A front hood support 113 is shown in FIGS. 7A and 7B including a cross-beam 115 having an adjustable front hood support bar 117 which is adjustable in a substantially vertical manner by a friction knob 119 arrangement in order to support the front portion of a vehicle hood 83 in the appropriate horizontal closed alignment. The front hood support bar 117 is also adjustable laterally along the cross-beam 115 by a second similar friction knob 121 as well as frontwards and backwards by a third friction knob 123 thus allowing the front of the hood 83 to be supported and varied within in an X, Y, Z plane by such freedom of movement. This permits the front hood support bar to be arranged to the appropriate height, width and distance from the pivot point of the hood support 97 so that the catch or a latch on an underside of the hood 83 can be appropriately supported directly by the V-shaped stop piece 125 on the upper end of the front hood support bar.

The rotating hood support 97 is shown supporting a rear portion of the hood 83 in an open position with the fender support bars 99 supporting a fender 85 in FIGS. 8A and 8B. This open position of the hood 83 due to the ability to rotate the hood bars 107 and hood 83, not only facilitates jambing, i.e. priming and a base coat applied to an undercarriage of the under surface of the hood, but also provides viewing of the fender support bars 99 which are vertically and horizontally adjustable to engage with any hole, aperture or appropriate connection point on the under-surface of the fender 85. The fender support bars 99 are adjustable in a vertical Y direction by a respective friction knob 127 and can also be rotated in a substantially 360.degree. horizontal manner within the friction knob passage 129 so that the fender support bar 99 can engage a variety of different fenders 85 at different support points. Additionally, the entire friction knob support 131 for the fender support bars 99 can be reoriented by sliding the support off and then on either an inside or outside portion of cross member 95 so that even further flexibility is provided for adjustment of the fender support bars 99. For example, in FIG. 8A this arrangement of fender support bars 99 is shown with the far right bar 133 aligned on an inside portion of the cross member 95 and the other two support bars 135, 137 on an outside portion of the cross member 95. In other words these friction knob supports are slidably interchangeable thereby permitting significant horizontal flexibility of the fender support bars 99. It is to be appreciated that the stands described herein may be provided with counterweights 142 as shown in FIG. 8A to facilitate stability of the stand 81. The counterweights 142 are shown here on the base struts 89, but they could be located in other positions and attached to other members to enhance the stability of the stand 81.

Besides the fender support bars 99 adjusting the fender 85 in a vertical Y direction and a horizontal X, Z direction, a fender balance bar 139 as disclosed best in FIGS. 9A, 9B is also provided to balance the hanging fender(s) in the same orientation as it would be on the vehicle. The balance bar 139 is suspended from the cross member 95 by a vertical support 141 and can be moved in a substantially X, Y, Z plane by appropriate friction knobs 143, 144 and passages 147, 149 so that a single free end of the balance bar frictionally engages an inner side surface of the fender 85 and orients the fender 85 about its fender support bar support 99 points so that the fender is oriented in a desired side plane, substantially if not exactly as it would be on the vehicle in a completed and drivable condition of the vehicle. This is important because it ensures that metallic paint applied to the fender 85 as a finish coat dries in a manner as described above which facilitates a high-quality appearance and with appropriate blending with adjacent door panels and the hood.

Figure 10:
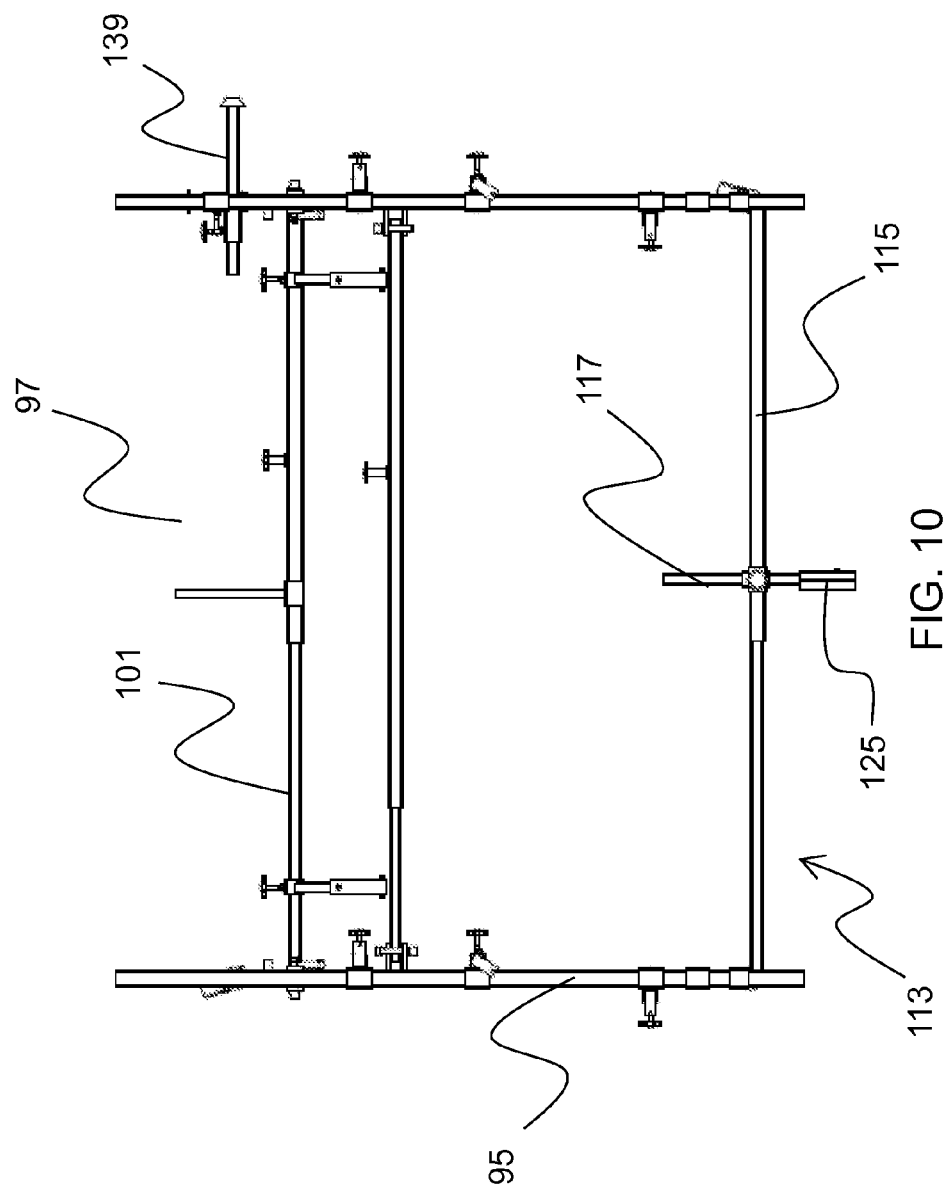
FIG. 10 is a top plan view of the stand of the first embodiment.
Figure 11:
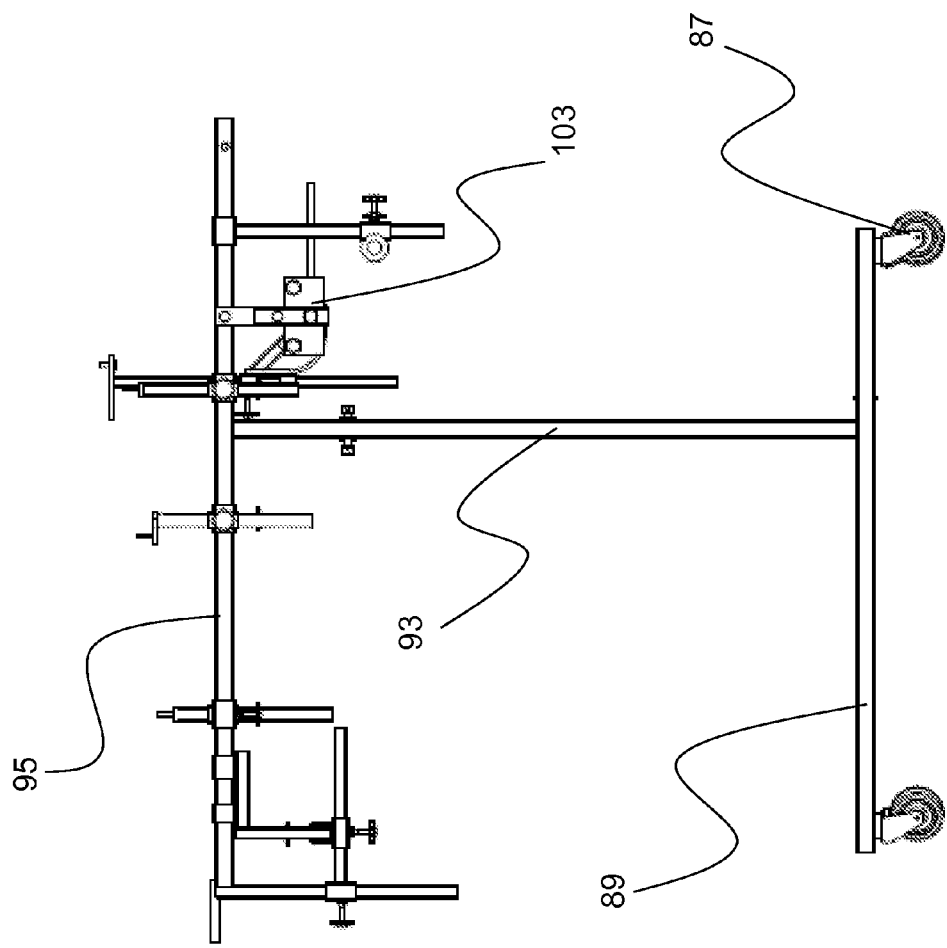
FIG. 11 is a side elevation view of the stand of the present embodiment.
Figure 12:
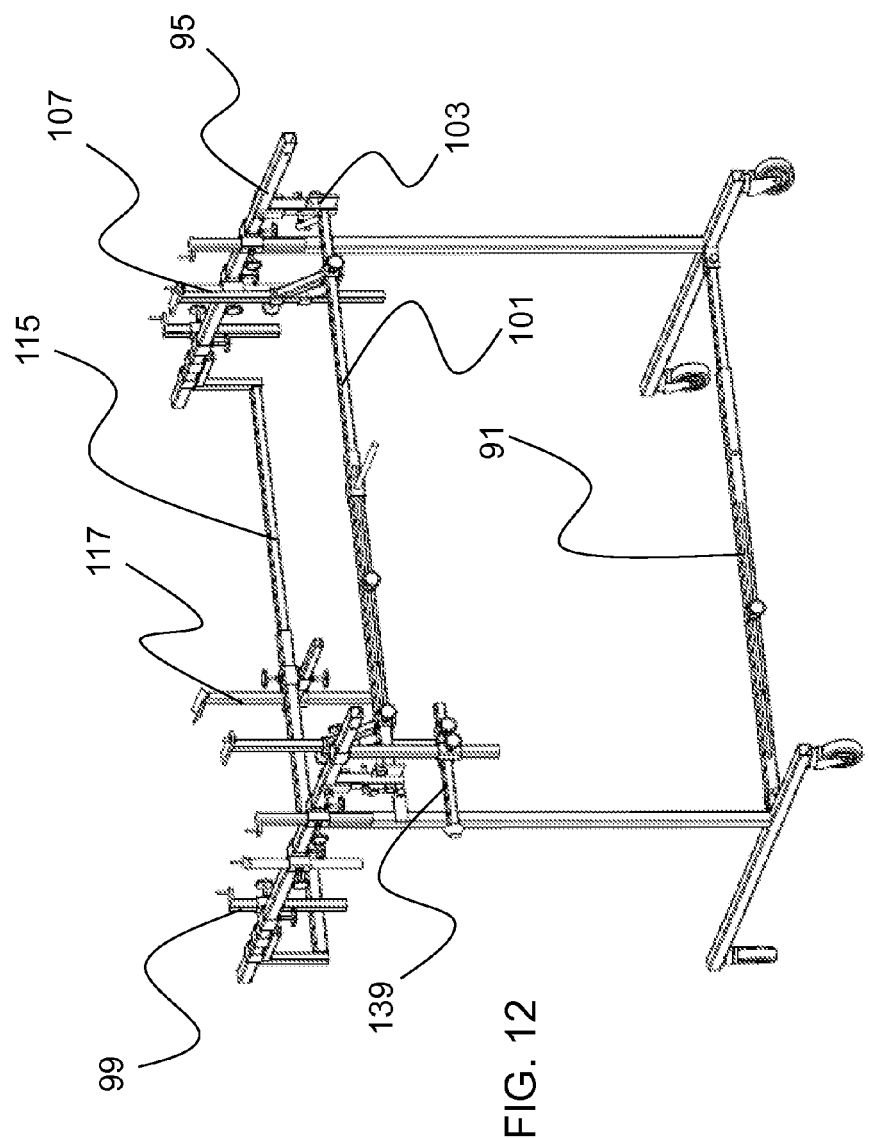
FIG. 12 is a perspective view of the backside of the stand of the present embodiment.
Figure 13:
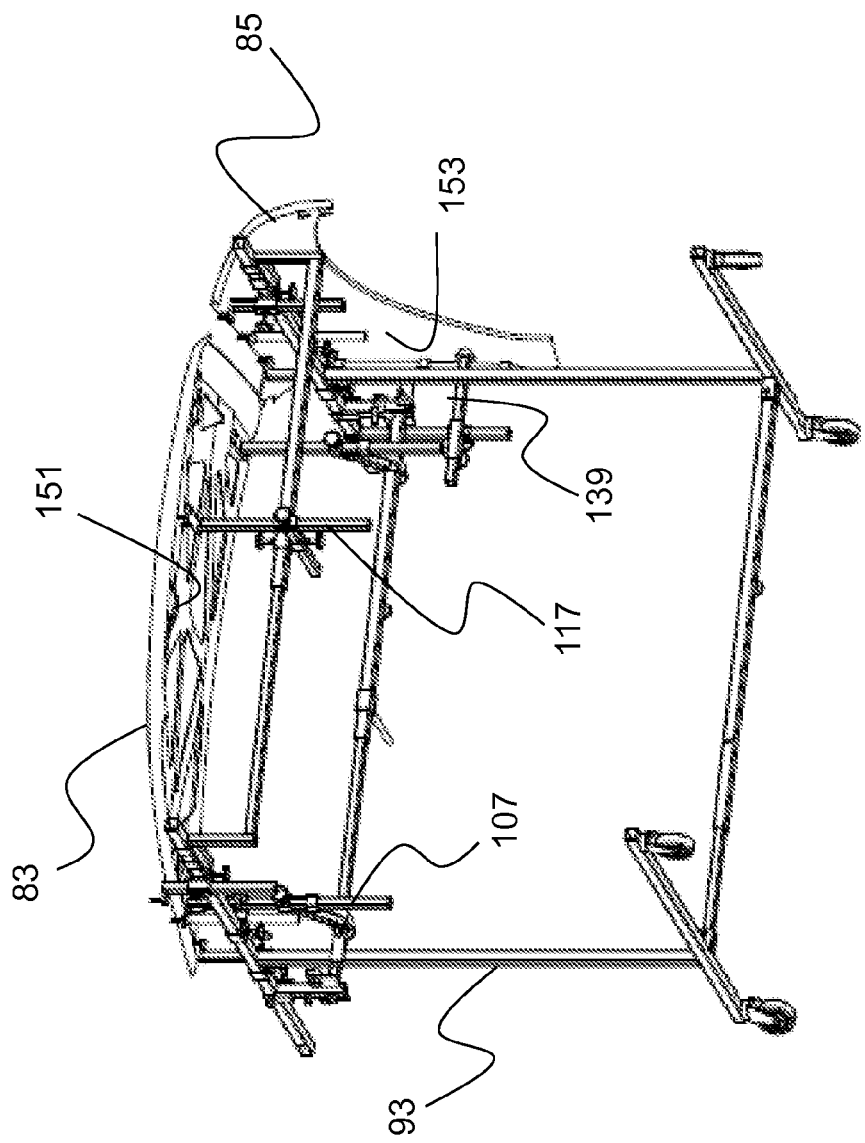
FIG. 13 is a perspective view of an embodiment of the stand supporting a fender and hood in a closed arrangement on the stand.
Figure 14:
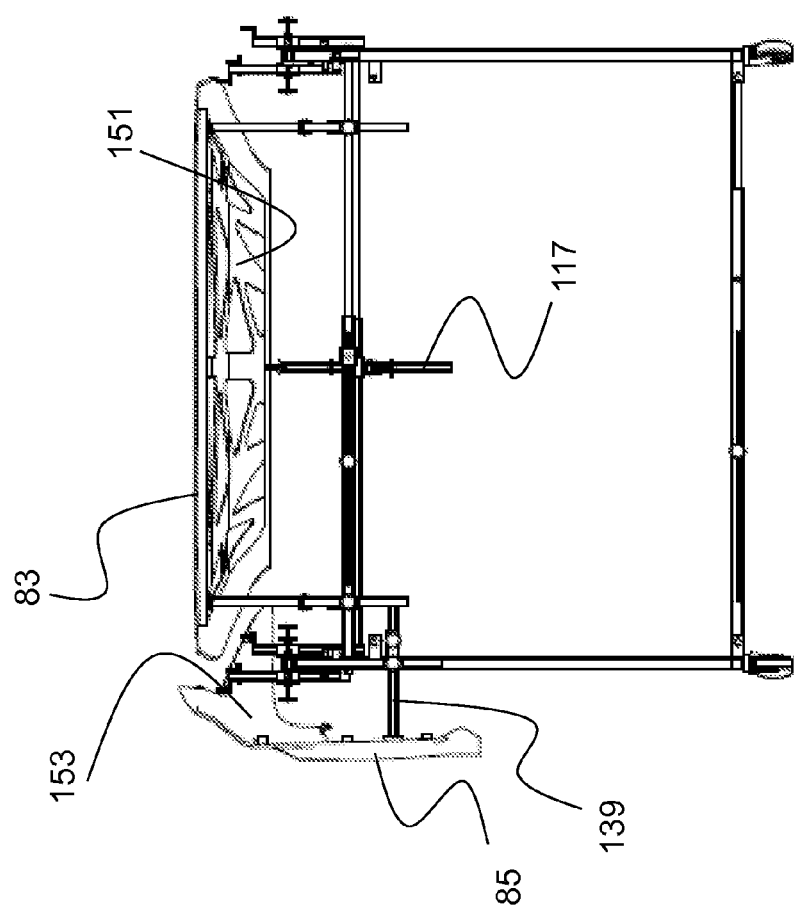
FIG. 14 is a rear elevation will view of an embodiment of the stand supporting the hood and fender.

FIGS. 10-12 disclose still further top, side and perspective views of the main stand 81 of the present invention further detailing the hood supports 97, 113 and fender support bars 99 from additional perspectives. FIGS. 13-16 disclose the stand 81 from several different perspectives showing the arrangement and alignment of a hood 83 and fender 85 on the stand 81 in such a manner as to be oriented in X, Y, Z reference frame exactly as it would be on the vehicle, when the vehicle is in a normal drivable and operable condition. The underside of the hood 151 and of the fender 153 is also shown.

Figure 17B:
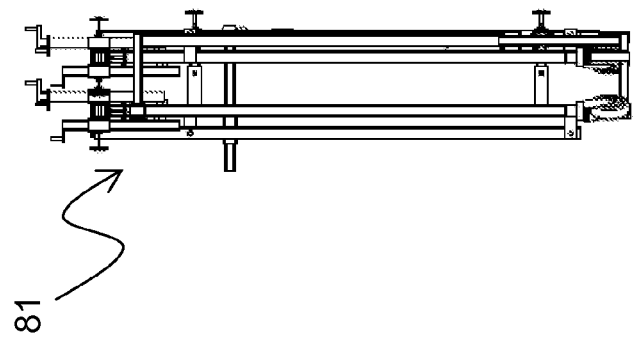
FIGS. 17A and 17B are respective side elevation views of an embodiment of the stand in a folded up and compact state for storage.
Figure 17A:
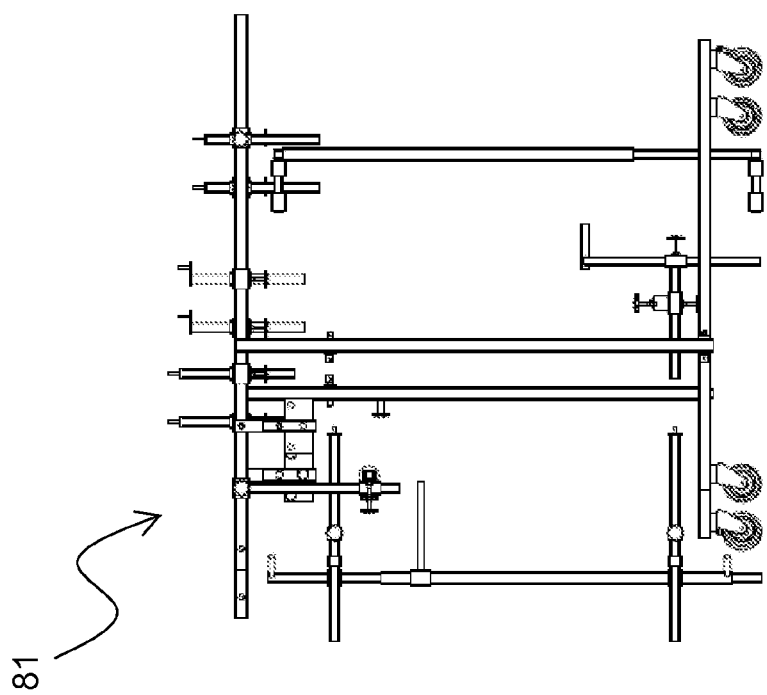
Figure 18:
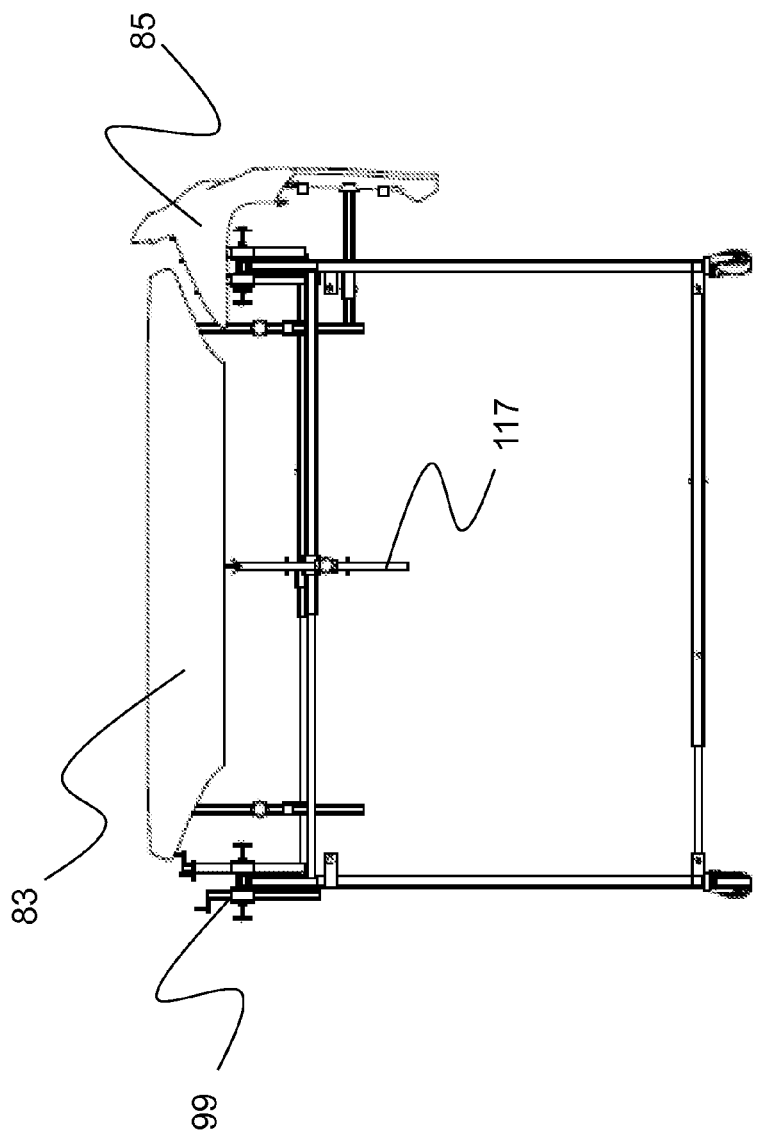
FIG. 18 is a front elevation view of an embodiment of the stand with the hood and fender in a closed position.
Figure 19:
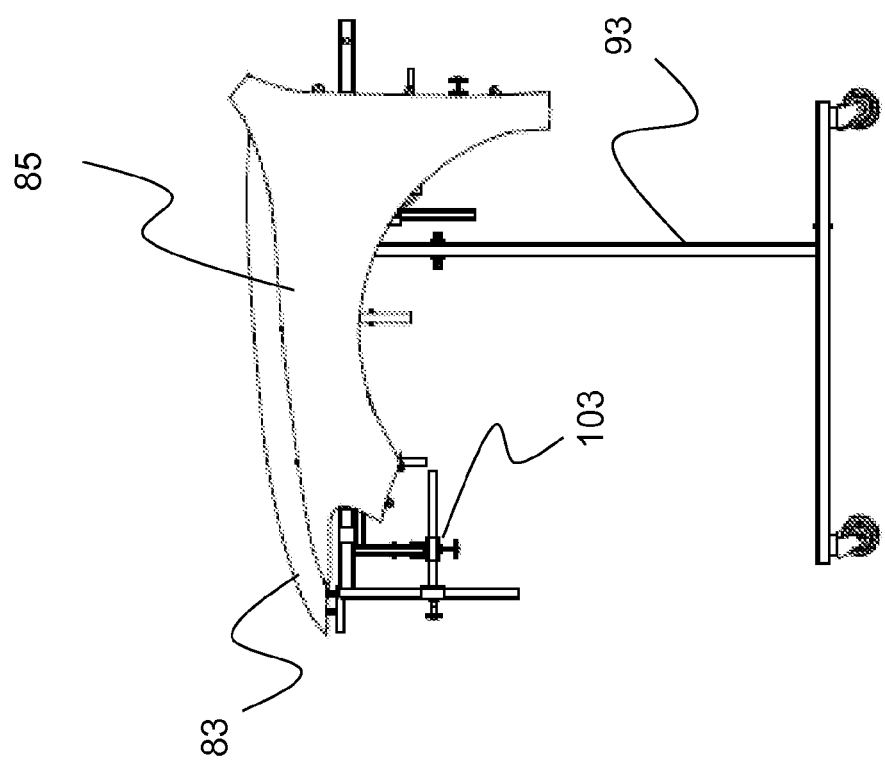
FIG. 19 is a side elevation view of an embodiment of the hood and fender on the stand in a closed position.
Figure 20:
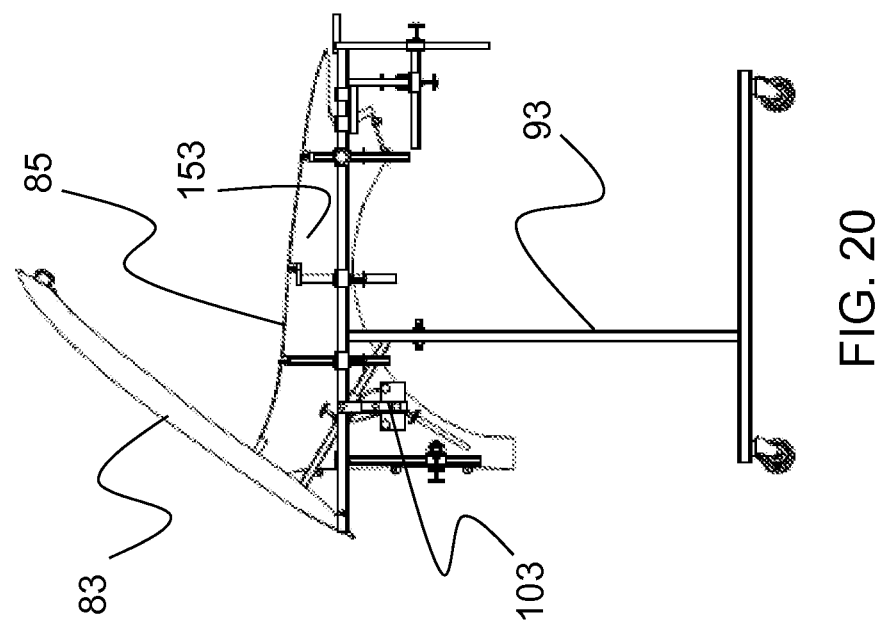
FIG. 20 is a side elevation view of an embodiment of the hood and fender on the stand in an open position.
Figure 21:
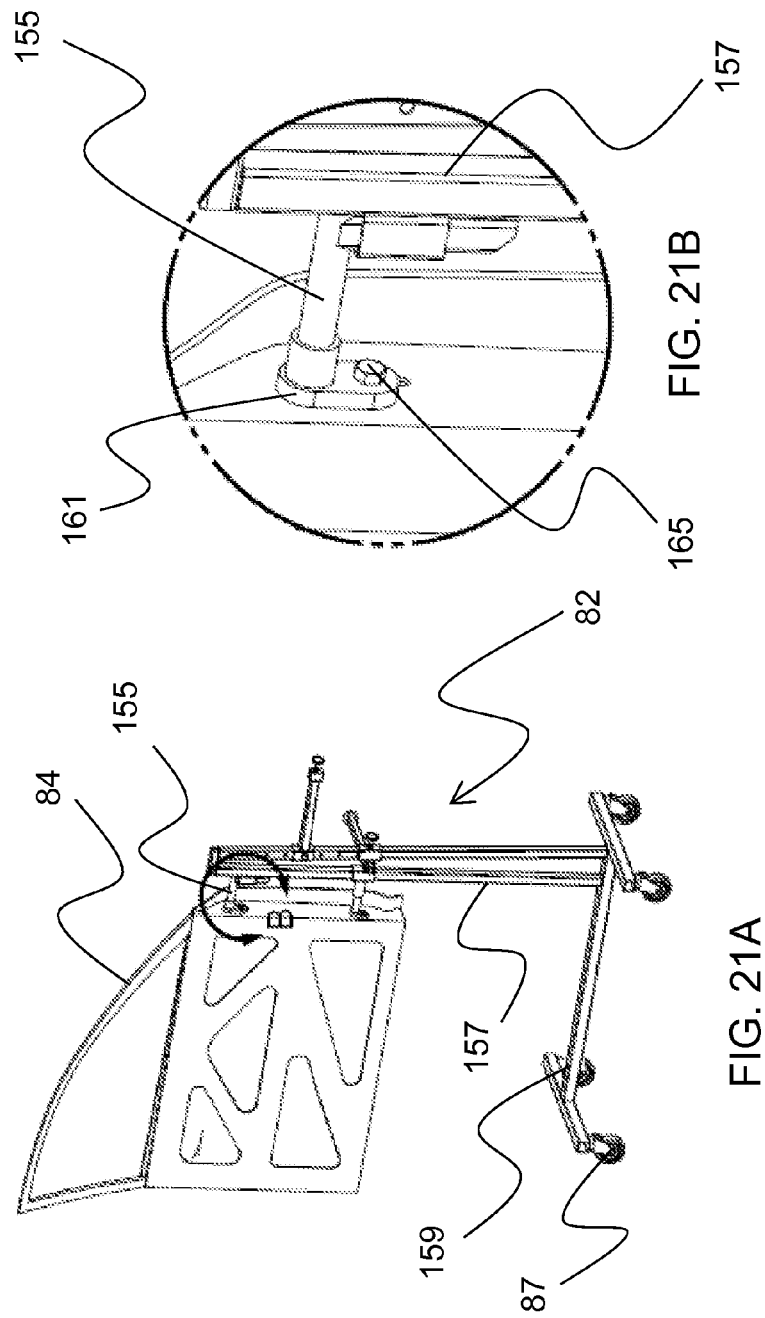
FIGS. 21A and 21B are perspective and close-up views of a first embodiment of a door stand of the present invention.
Figure 22:
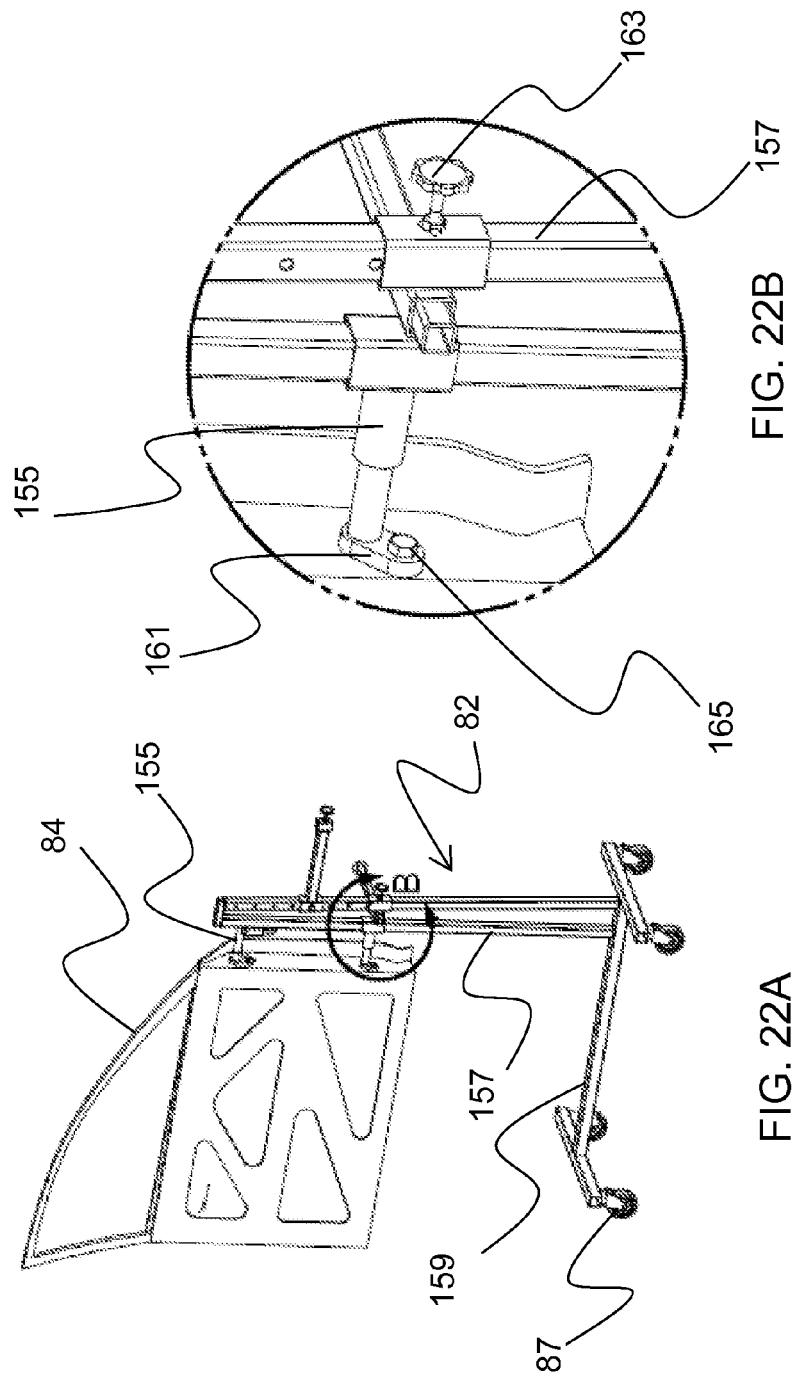
FIGS. 22A and 22B are perspective and close-up views of the door stand attachment mechanism of the first embodiment.
Figure 23:
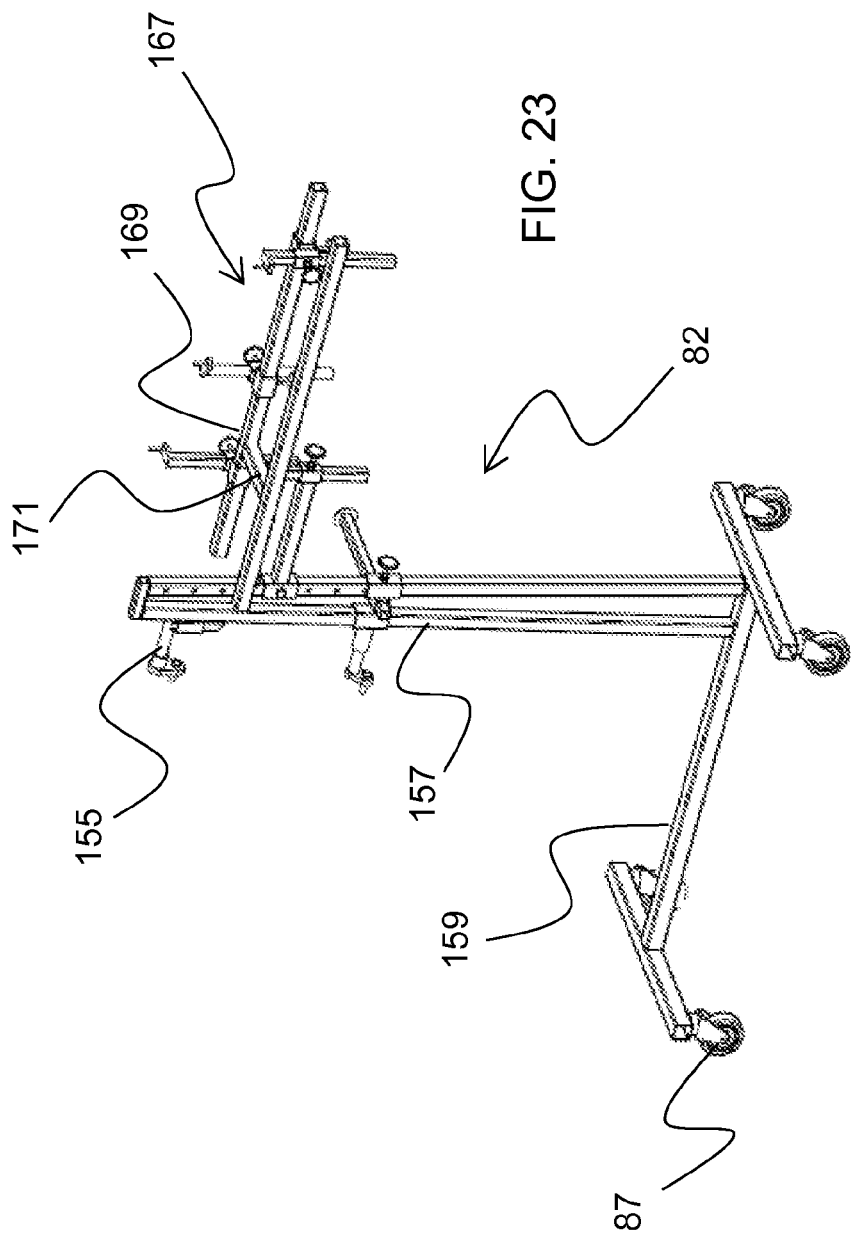
FIG. 23 is a perspective view of an embodiment of the door stand without a door including an additional fender mount attachment to support a fender adjacent a door.
Figure 24:
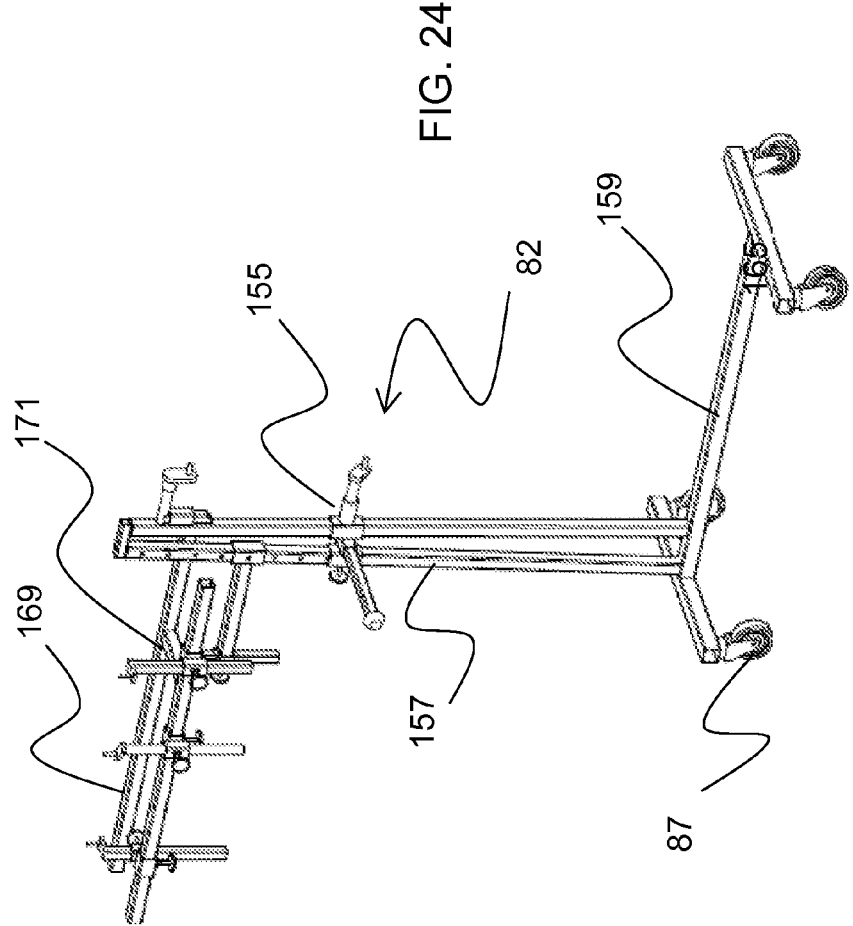
FIG. 24 is a perspective view of the door stand with additional fender support.
Figure 25:
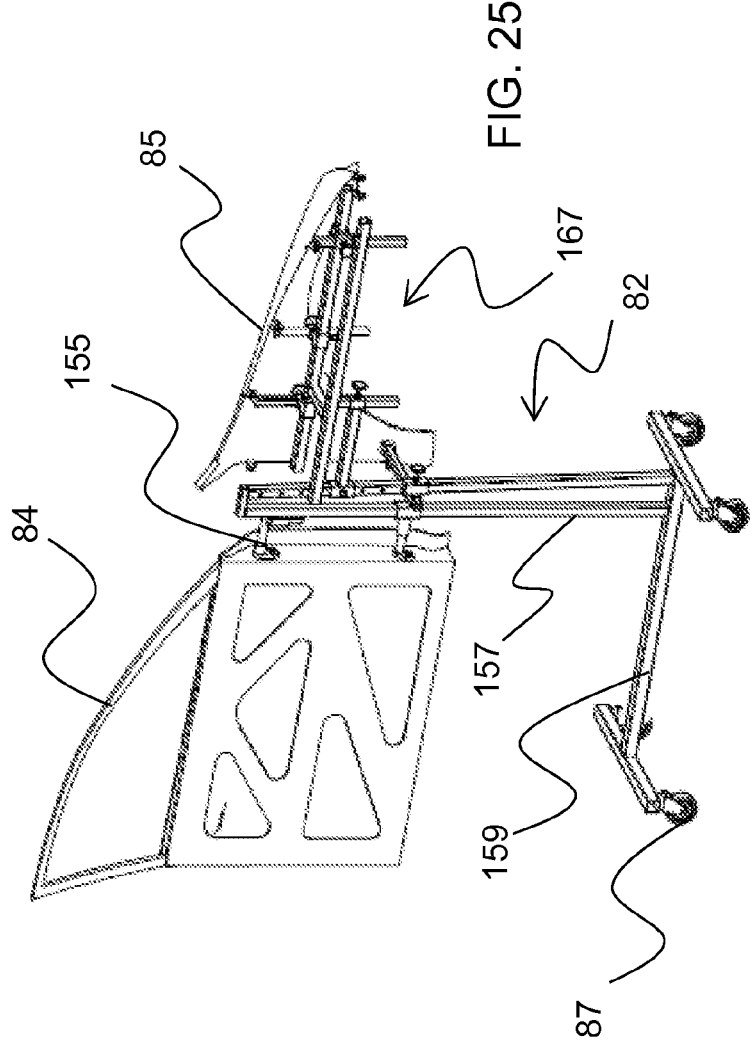
FIGS. 25 and 26 are respective perspective front and back views of the door and fender stand of the present embodiment.
Figure 26:
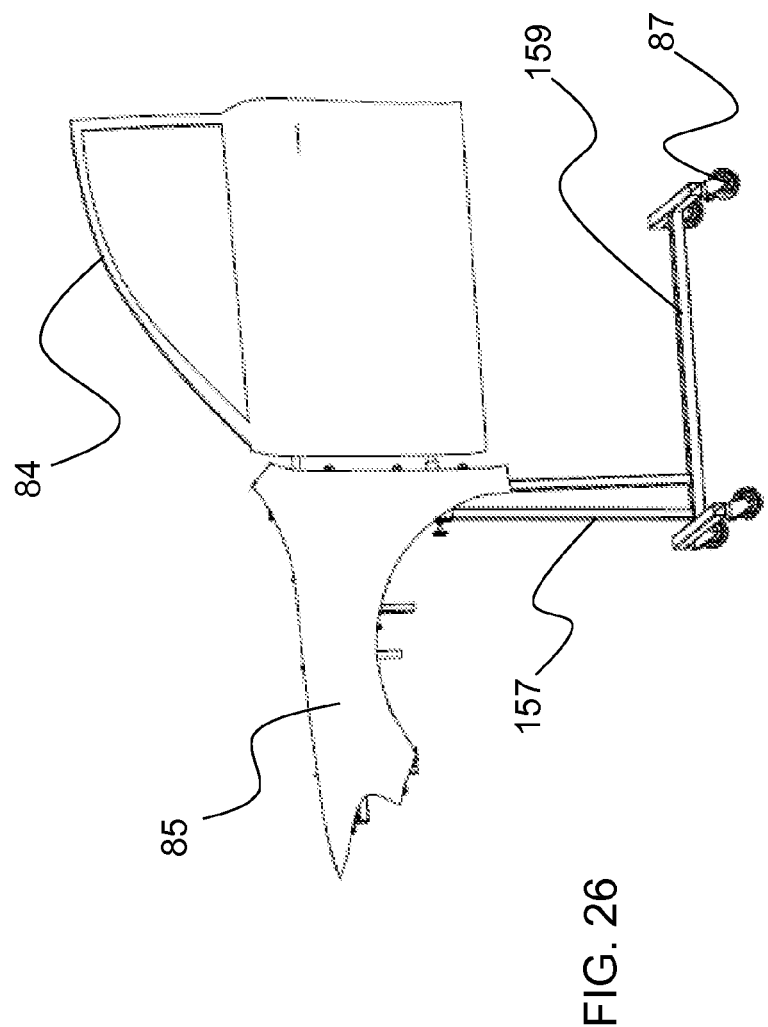

FIGS. 17A, 17B show an embodiment of the stand 81 which provides for the stand 81 to be collapsed into a substantially smaller folded configuration and easily stowed in small storage area or hung on the wall of the repair facility out of the way when not in use. FIGS. 18, 19 illustrate the stand supporting the fender 85 and hood 83 from a front outside perspective in a closed position as they would be observed in use by the painter for painting a final finish coat. FIG. 20 illustrates the stand supporting the fender 85 and hood 83 from a side perspective with the hood 83 in an open position.

FIGS. 21A-22B are a door stand 82 for use in conjunction with the above described stand 81. The vehicle door 84 to be painted is supported by the door stand 82 by horizontal door support bars 155 which extend from the two vertical struts 157 supported on a 4 wheeled base 159. The door support bars 155 are adjustable in a vertical manner using a friction knob 163 along one of the two vertical struts 157 and each support bar 155 includes an attachment piece 161 on a free end which is rotatable 360.degree. and has a bolt 165 and bolt hole set in an offset manner from the door support bar 155. A bolt 165 on the attachment piece 161 can usually engage a threaded connection point on the inside surface of the door 84 to support the door. It is important to note that there are four wheels 87 for supporting the door stand 82 which is important because of the significant leverage forces and moment applied by a heavy door where the door 84 may even be loaded with all its components such as handles and windows. Other known devices and stands which utilize three or less wheels are particularly unstable due to such leverage and moment forces caused by supporting the door.

Figure 27:
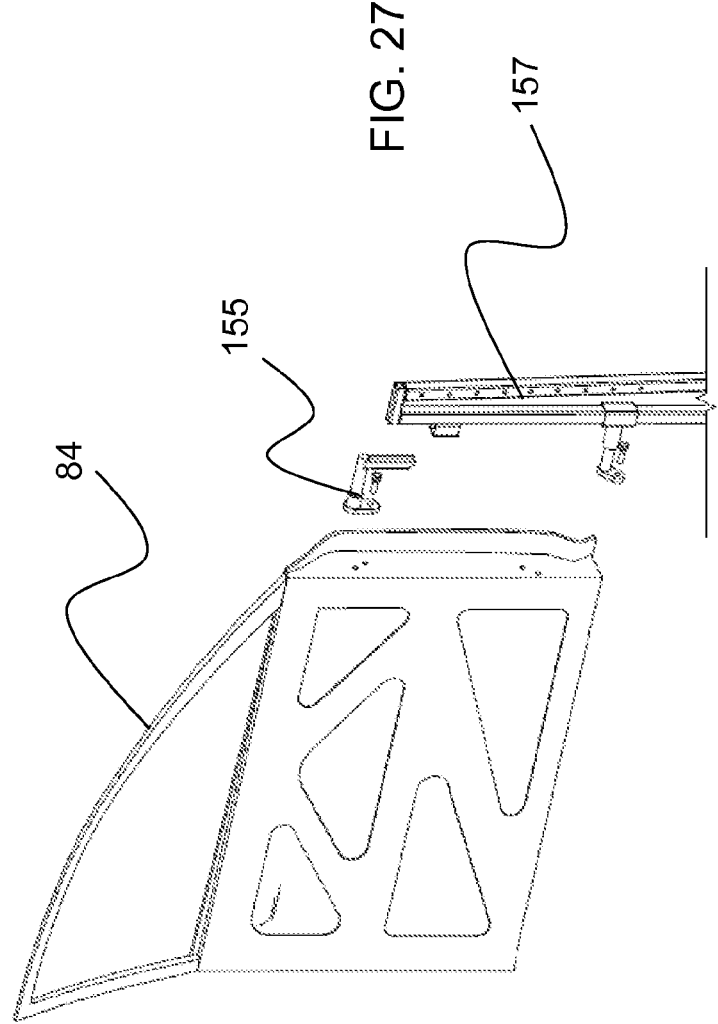
FIG. 27 is a perspective view of an embodiment of the door with door stand supports.
Figure 28:
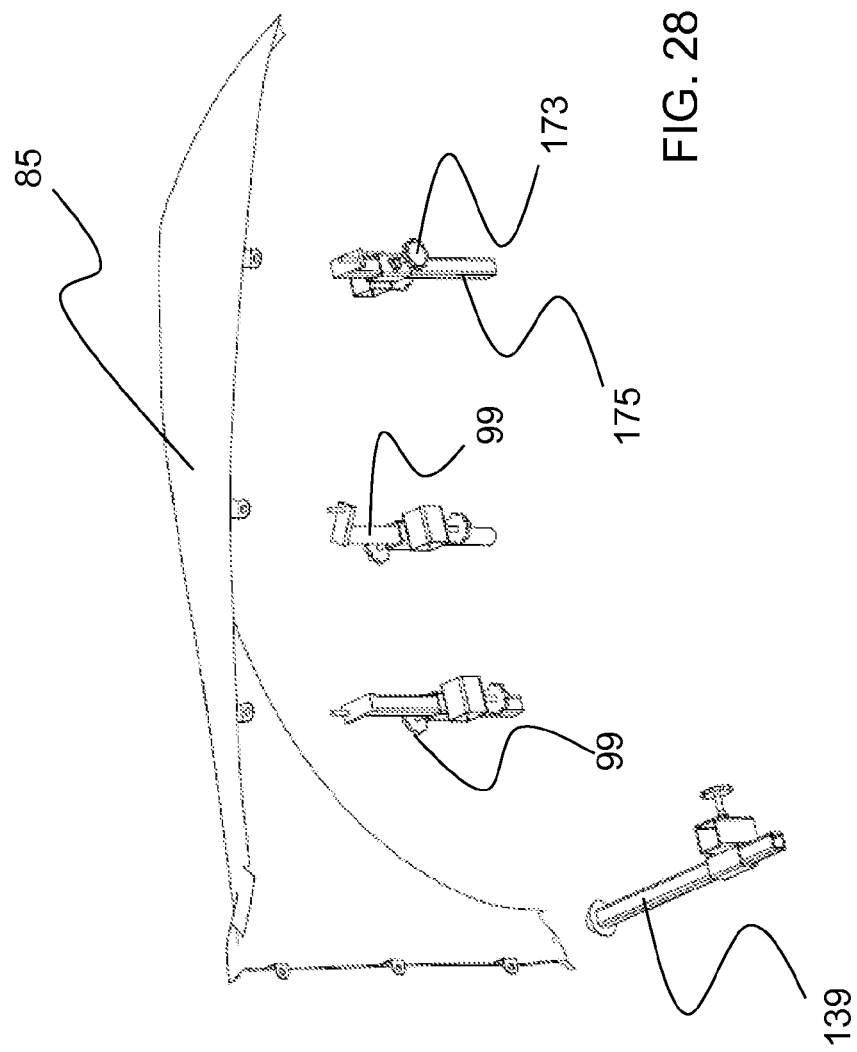
FIG. 28 is a perspective view of an embodiment of the fender with fender stand supports.
Figure 29:
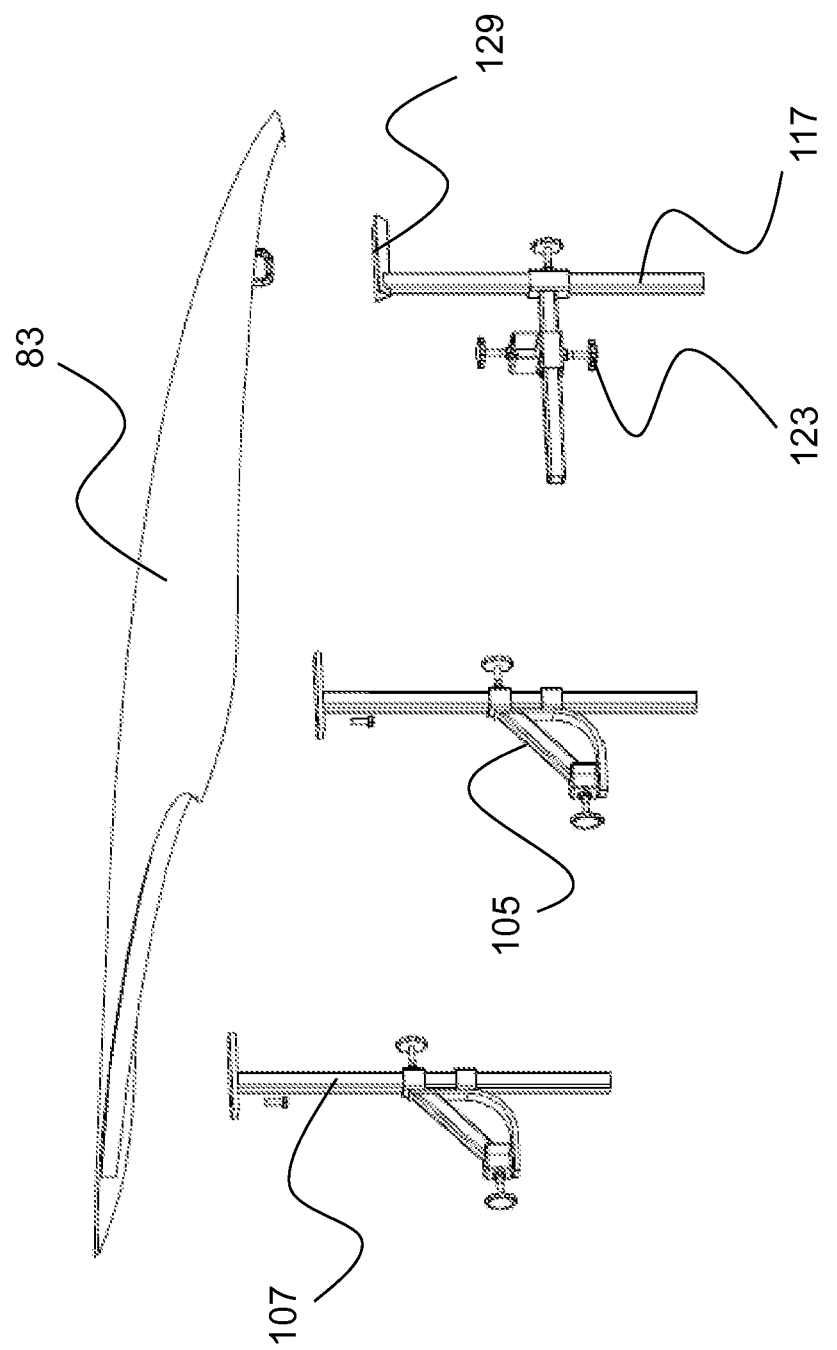
FIG. 29 is a perspective view of an embodiment of the hood with hood stand supports.

FIGS. 23-26 are another embodiment of the door stand 82 including a fender support 167. The pair of fender support bars 169 shown here are similar to that previously described to support a fender 85 as shown specifically in FIGS. 24 and 25. The fender support bars 169 align a fender 85 immediately adjacent a door 84 so that the door panel 84 and fender panel 85 can either be blended and or repaired in the same manner as previously described to ensure a high-quality paint finish and appropriate blending and visual coverage. It is to be appreciated that the fender support 167 is provided with an adjacent cross-member 171 so that passenger side doors can be mounted as well. FIGS. 27-28 illustrate perspective views of the support components for the door stand 82 and the fender support 167. Friction adjustments knobs 173 along vertical bars 175 as described above are provided to align and support the fender 85 adjacent the door 84 in a substantially vertical manner as it would be on a driveable vehicle. A further perspective view of support components for the front hood mount 97 and rear hood mount 113 are shown in FIG. 29.

Figure 30:
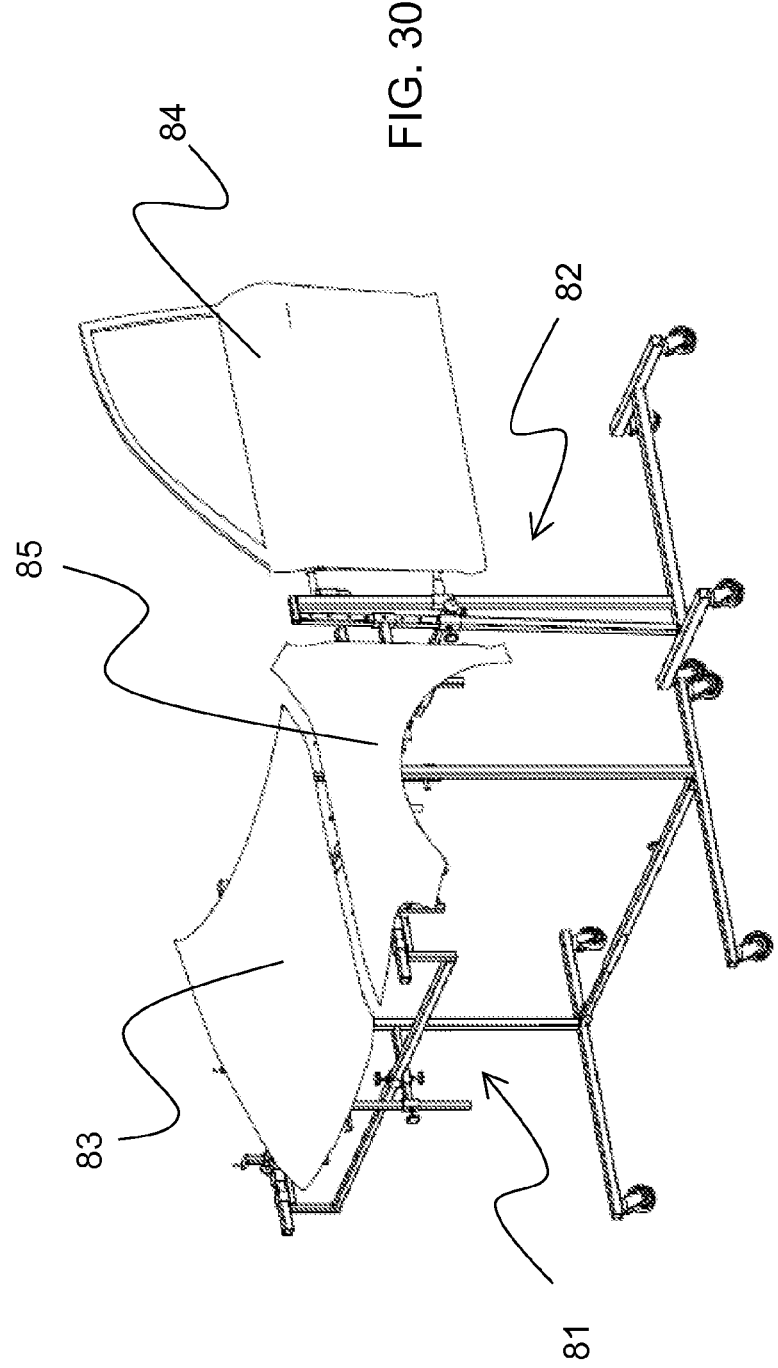
FIG. 30 is a perspective view of the door stand in combination with the main hood and fender stand.
Figure 31:
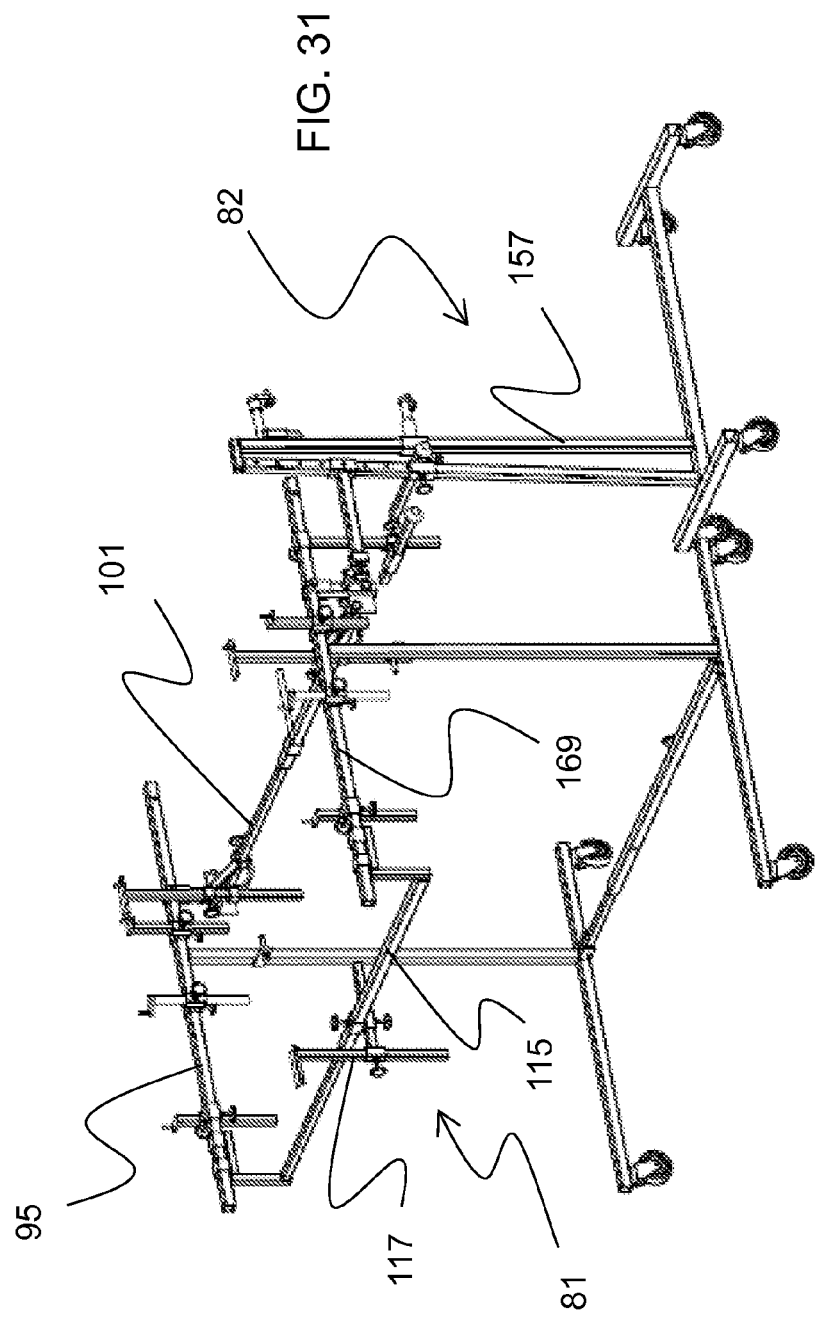
FIG. 31 is a perspective view of the arrangement and alignment of the door stand adjacent to the main stand without supported and accompanying body components.

FIGS. 30 and 31 illustrate the combination use of the main stand 81 and the door stand 82 in conjunction to simulate the arrangement and orientation of the components as they would occur on a vehicle. This ensures a high-quality paint finish and blending of repaired and/or replacement parts in the exact same manner as it would on the vehicle without having to bring the entire vehicle into the paint booth.

Figure 32:
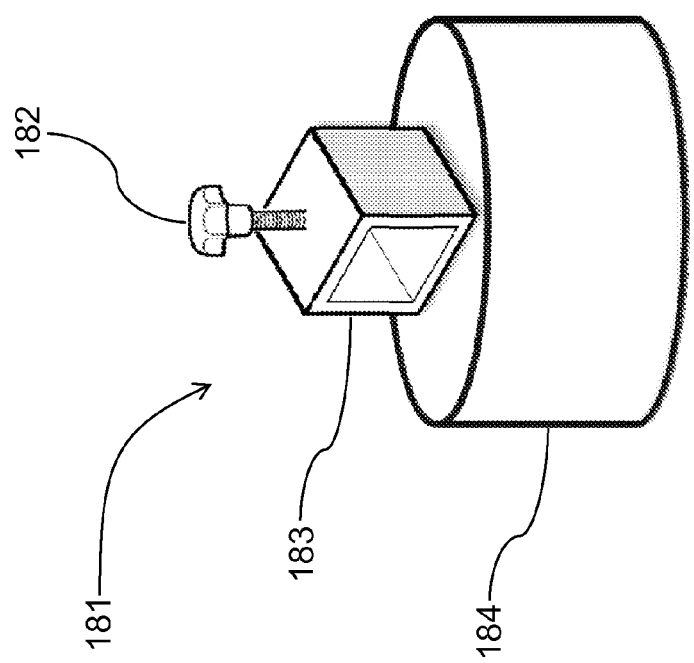
FIG. 32 is a perspective view of a first embodiment of a truck bed support for use with the paint stand of the present invention.

The stand 81 can also be used for almost any portion or part of a vehicle that needs to be painted. For example the stand 81 may also be used to support a pick-up truck bed which has been removed from a pick-up truck for painting. The functional utility of the stand 81 having the cross member 95 facilitates supporting accessories such as the truck bed supports 181 shown in FIG. 32. The truck bed supports 181 have an engaging tube 183 or other such device connected to a contact support 184 which is manufactured of a soft, resilient material such as rubber or plastic or other such known material which does not easily scratch paint and metal. A securing bolt 182 may also be provided to secure the support 181 to the cross member 95. The engaging tube 183 is sized to slide onto the cross member 95 and be adjustable thereon, and tightly secured with the bolt 182 so that a truck bed, or any other type of apparatus or part that needs to be painted can be securely supported thereon. Two truck bed supports 181 can be fitted onto each of the opposing cross members 95 so that the truck bed is supported by a total of 4 supports 181. The important aspect of the present invention is not only that the stand 81 itself can support multiple different vehicle parts at the same time, and also in an appropriate orientation to one another as they are on the vehicle for proper painting, but that such additional accessories such as the truck bed supports 181 can be added to expand the utility of the stand to support almost any part of a vehicle, either alone or in combination with another part, which must be repaired or painted.

Figure 33:
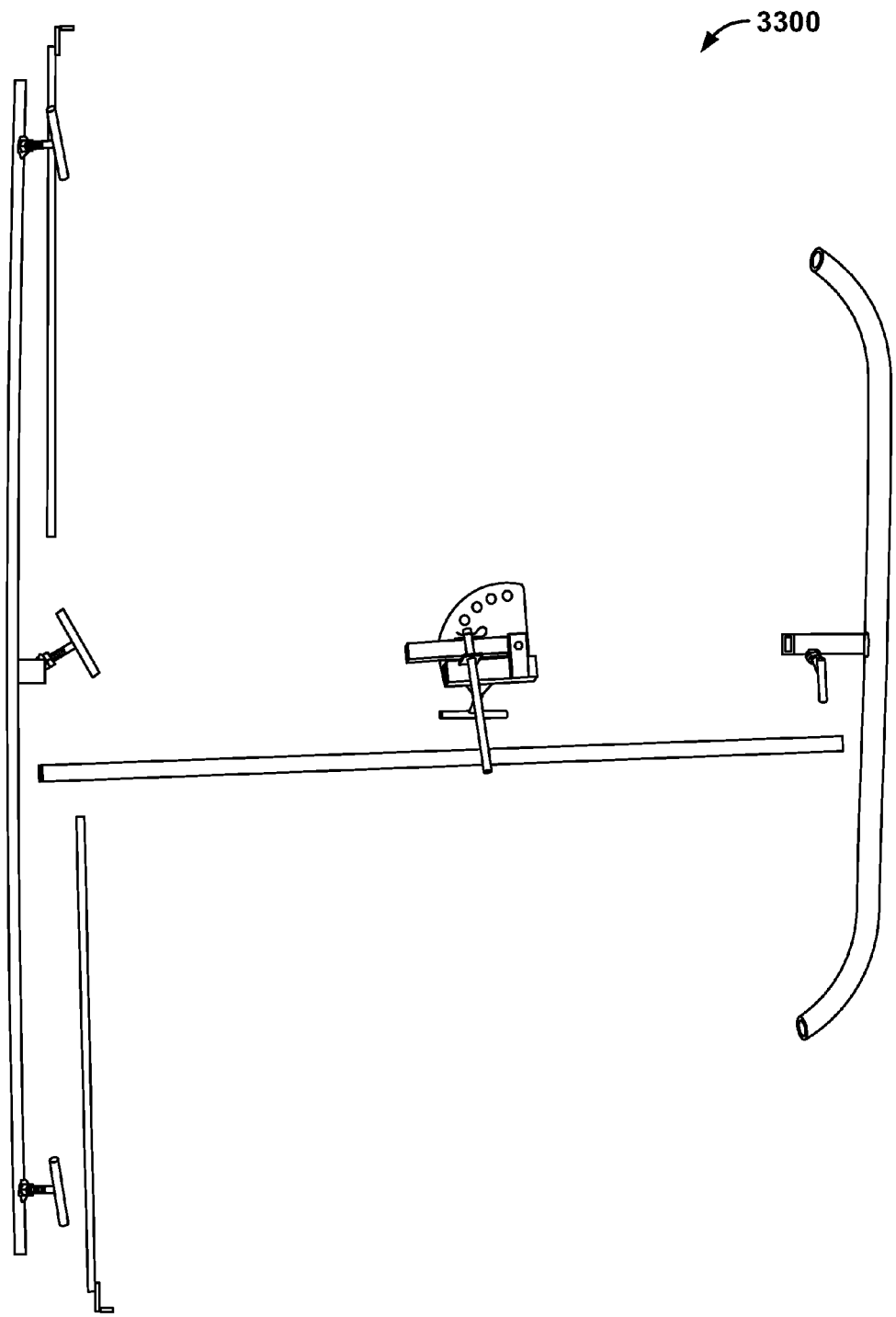
FIGS. 33-55 depict various views of exemplary embodiments of an apparatus for supporting vehicle components for repair and painting.
Figure 34:
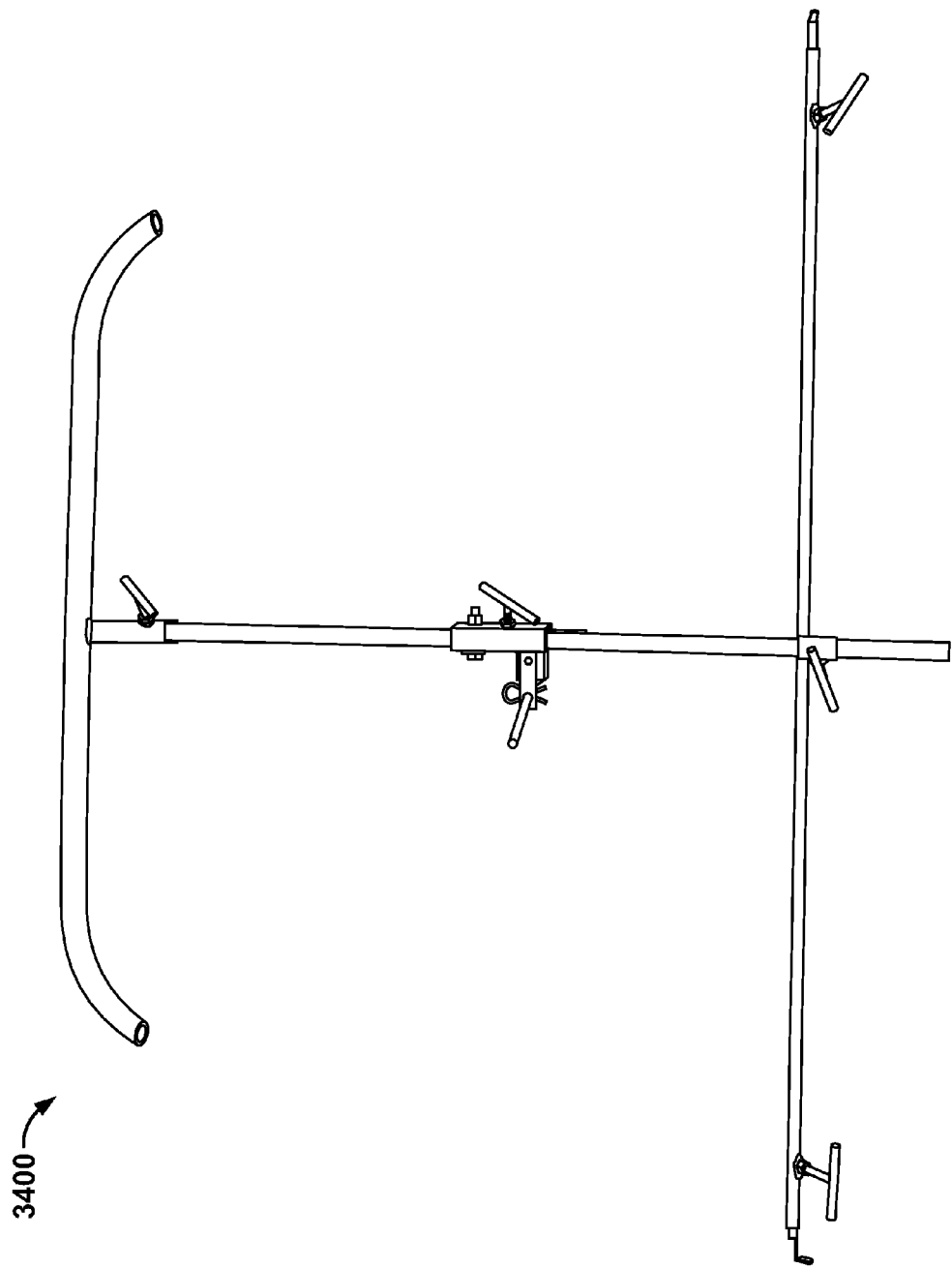
Figure 35:
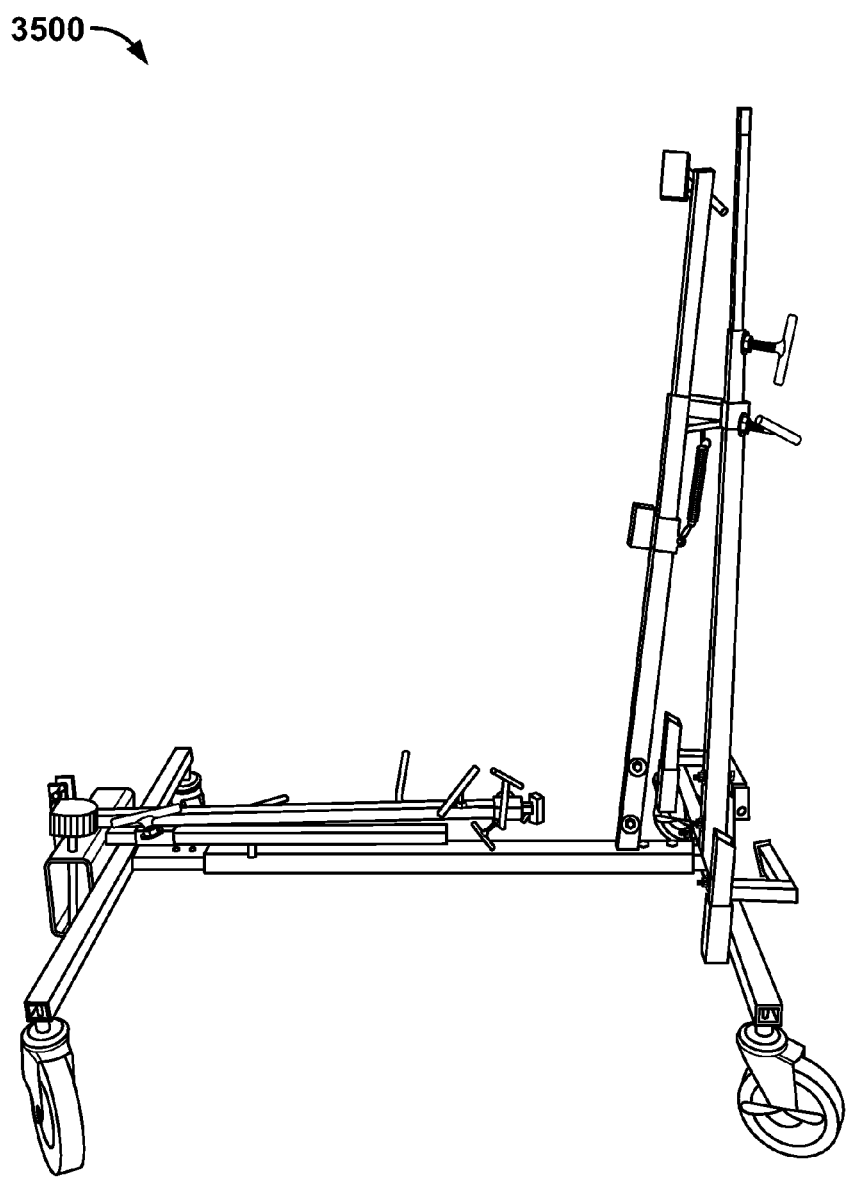
Figure 36:
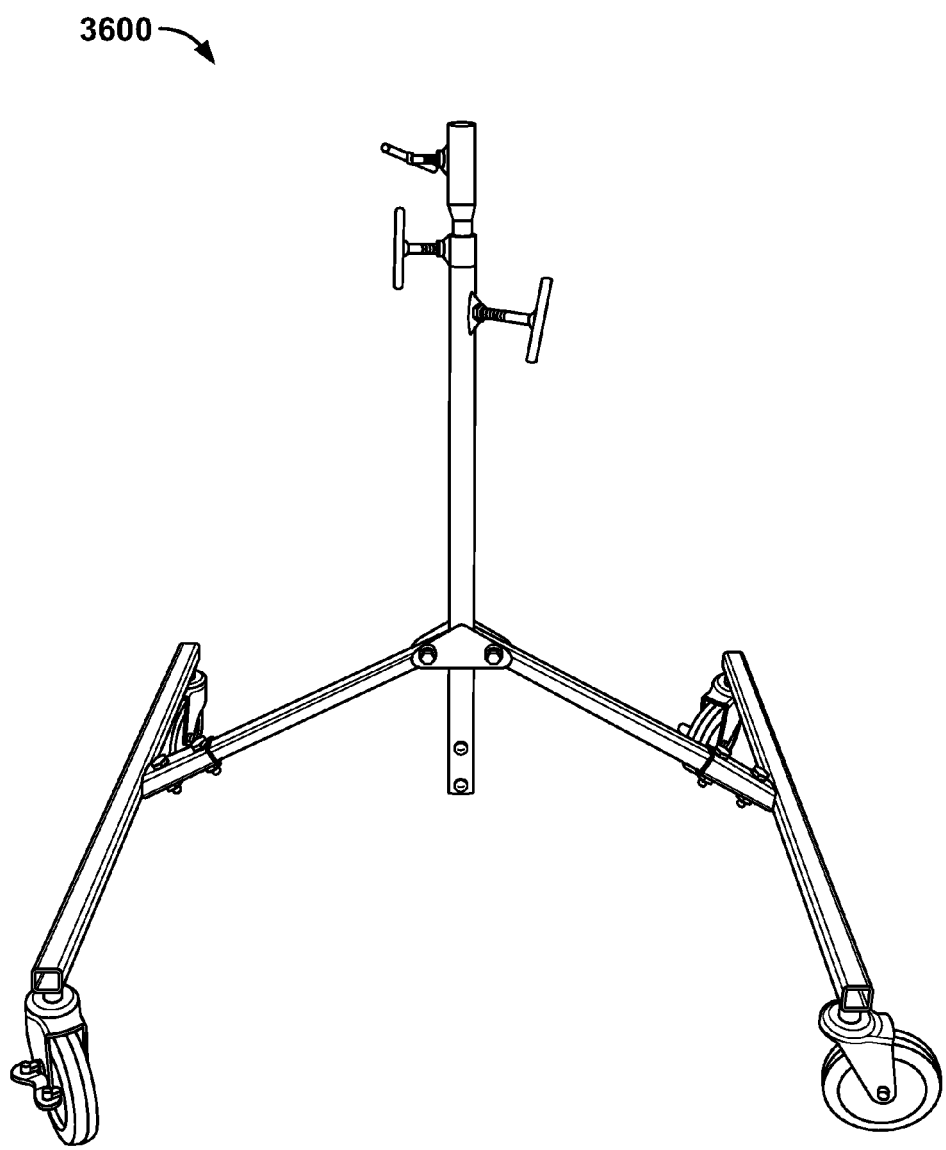
Figure 37:
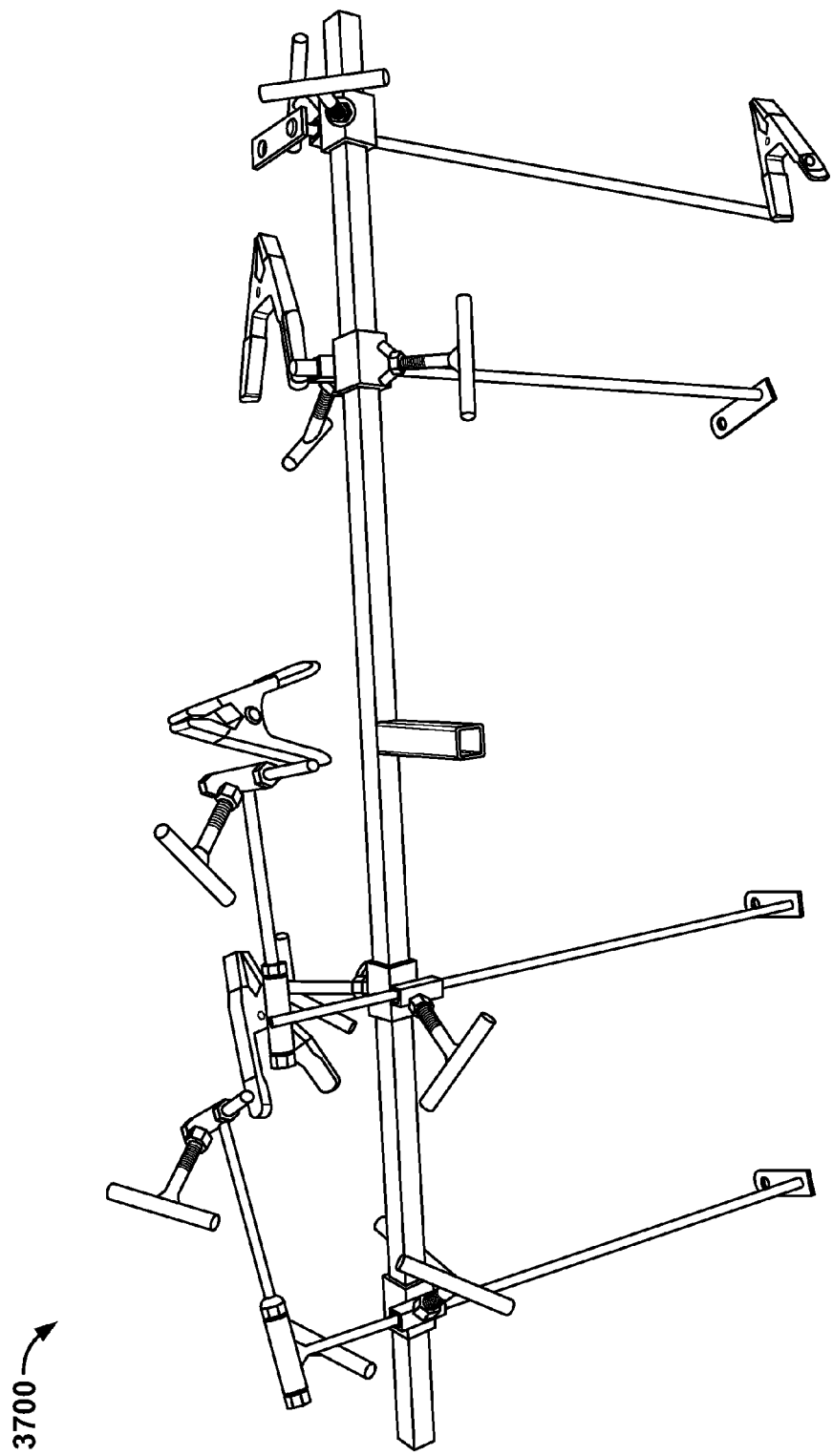
Figure 38:
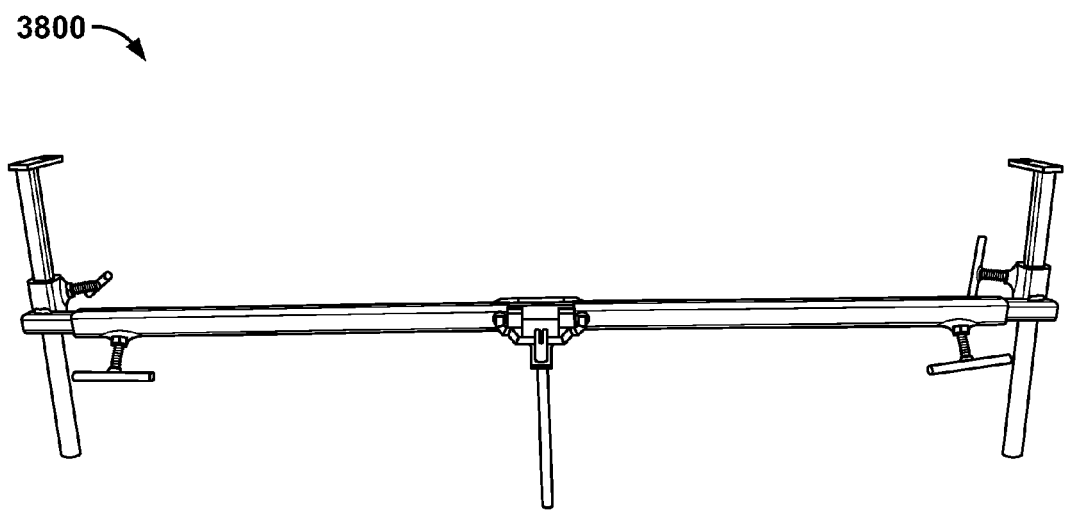
Figure 39:
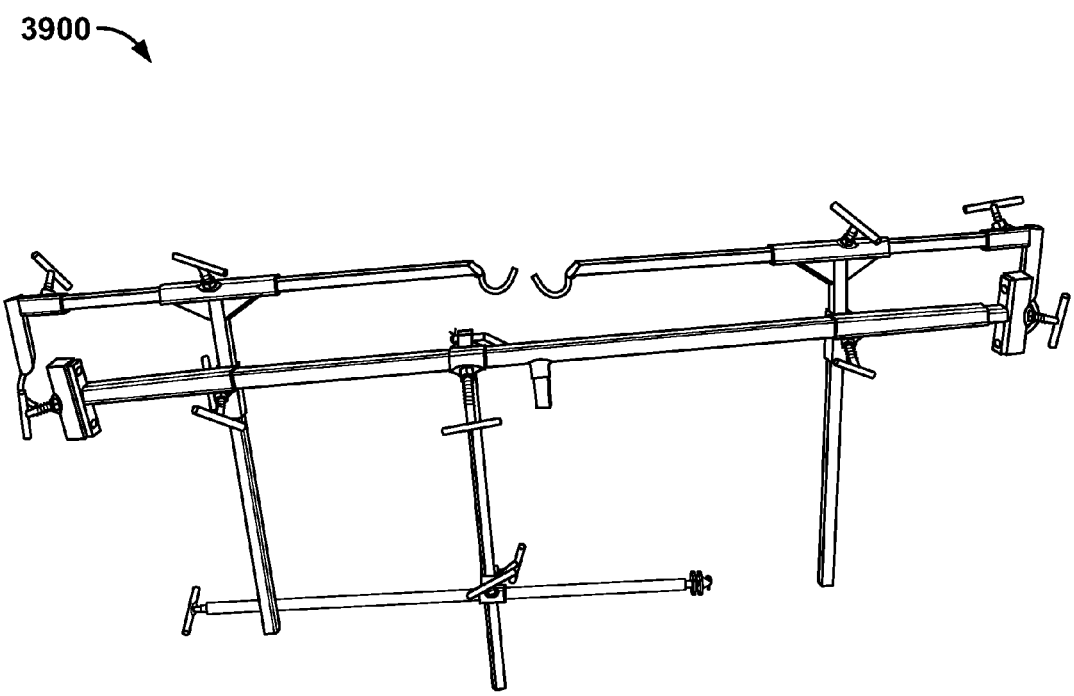
Figure 40:
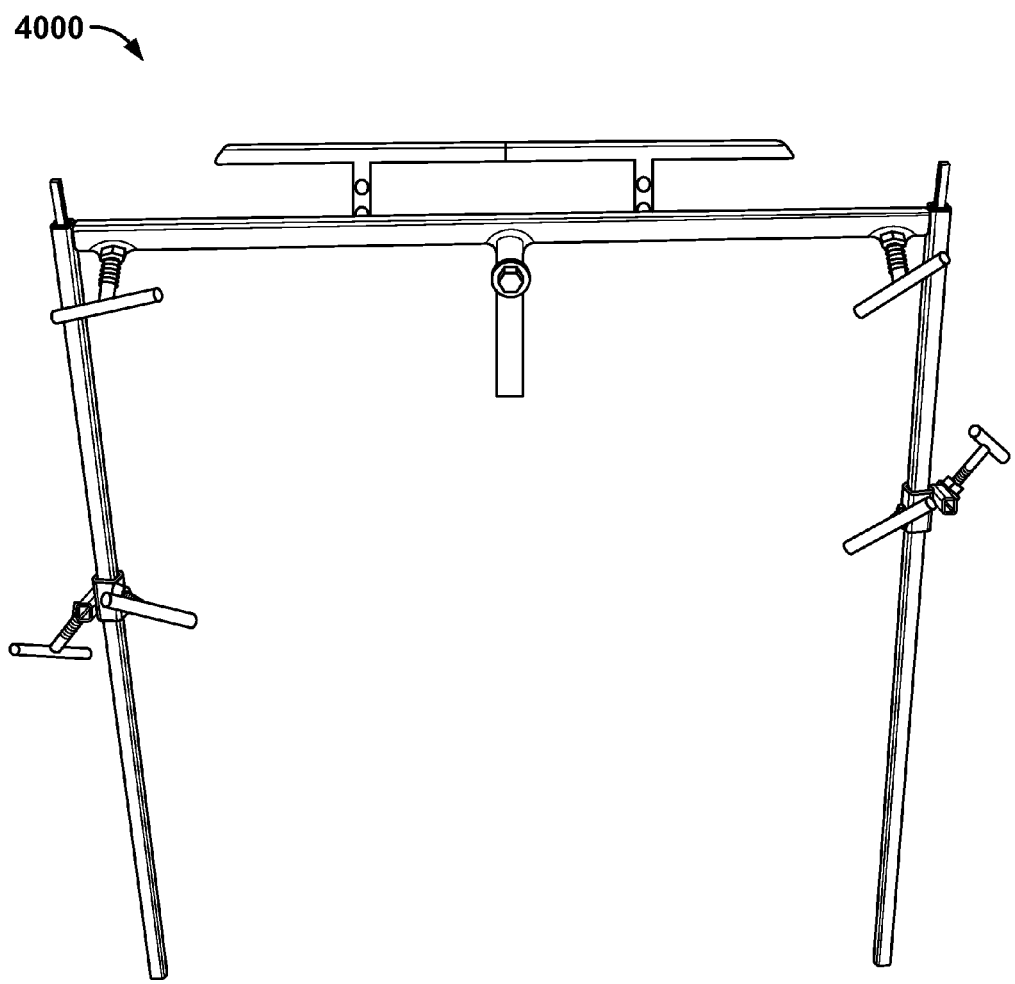
Figure 41:
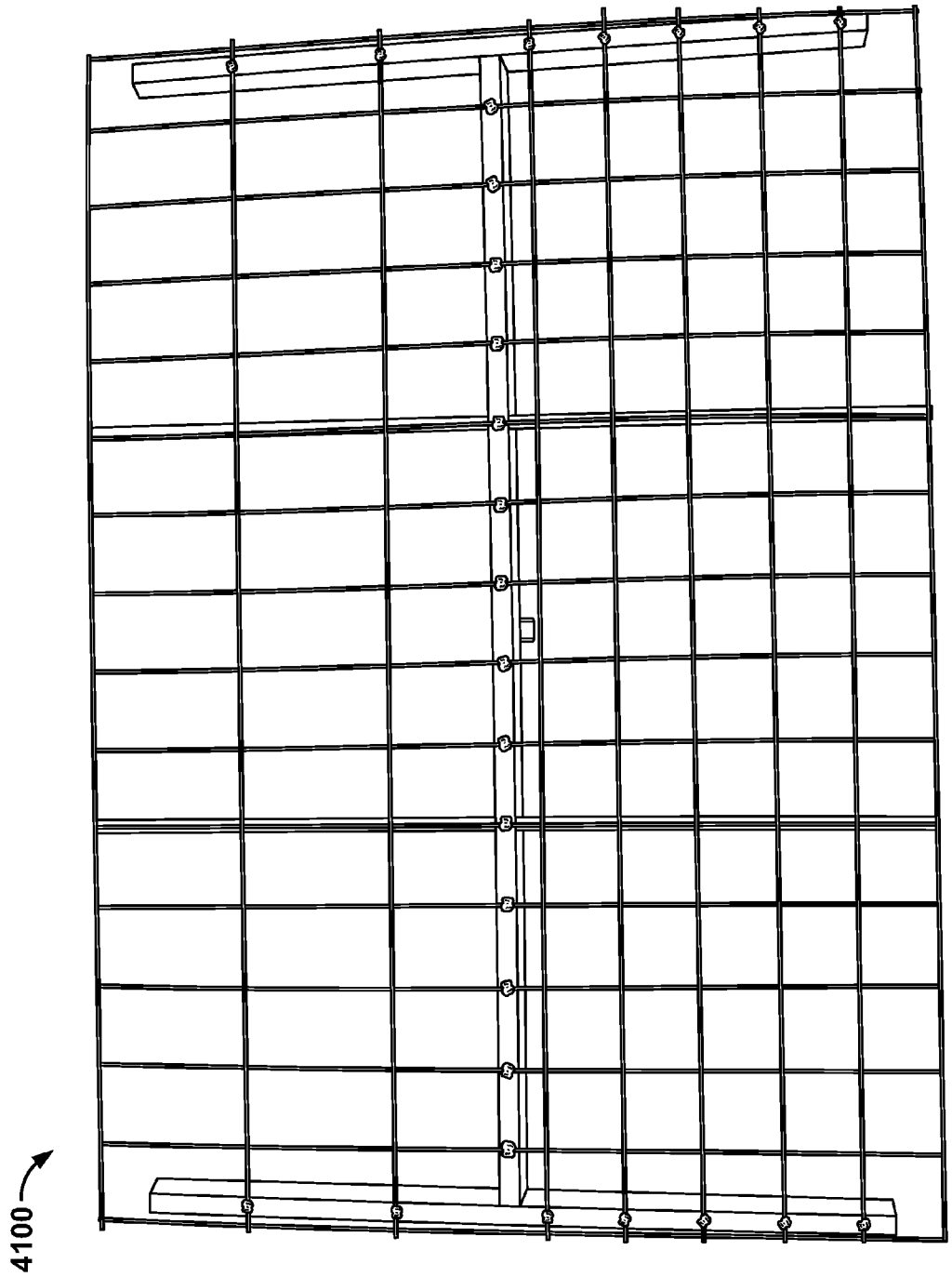
Figure 42:
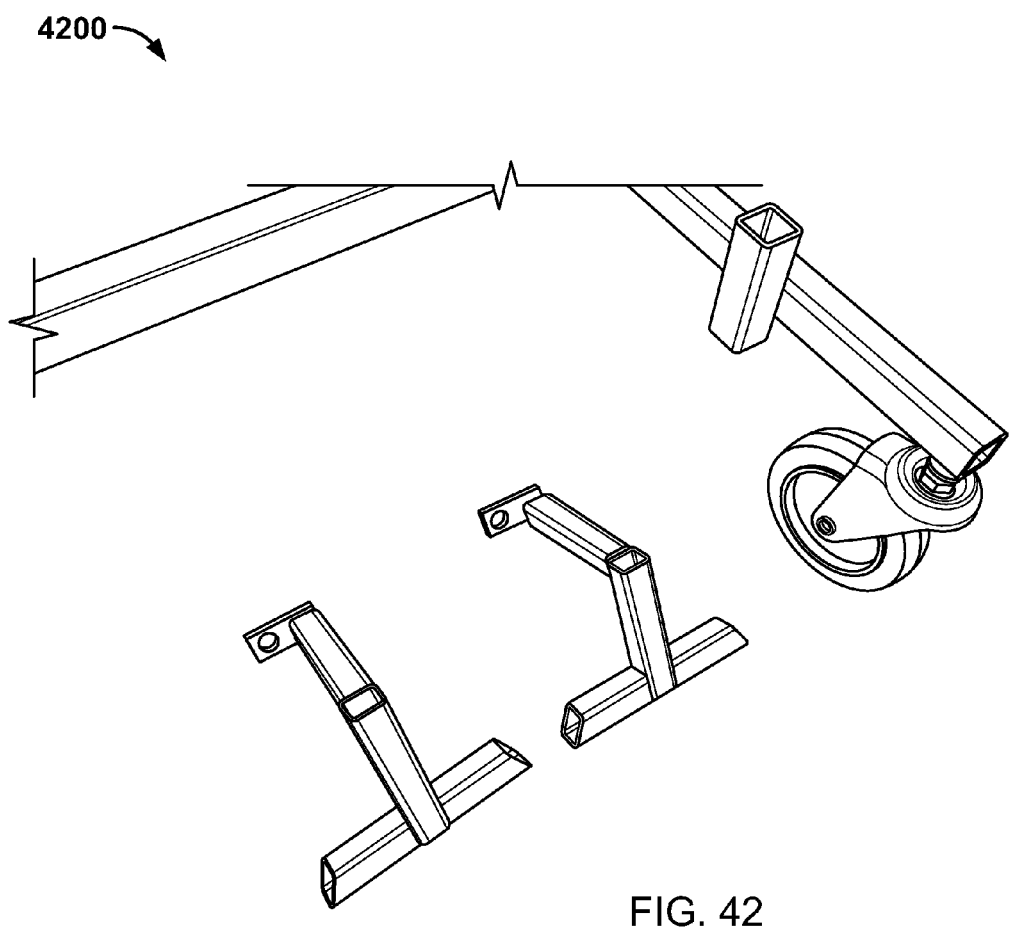
Figure 43:
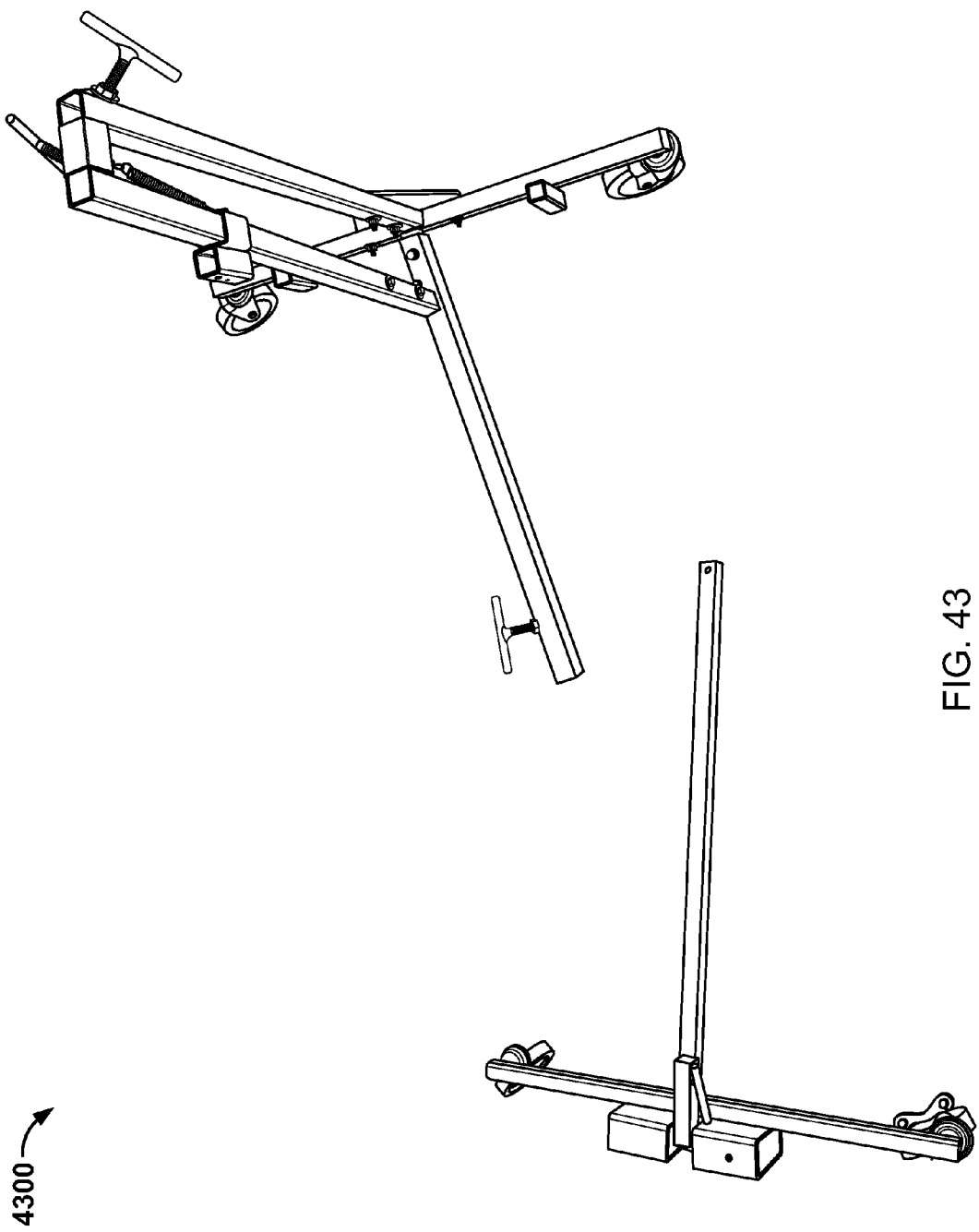
Figure 44:
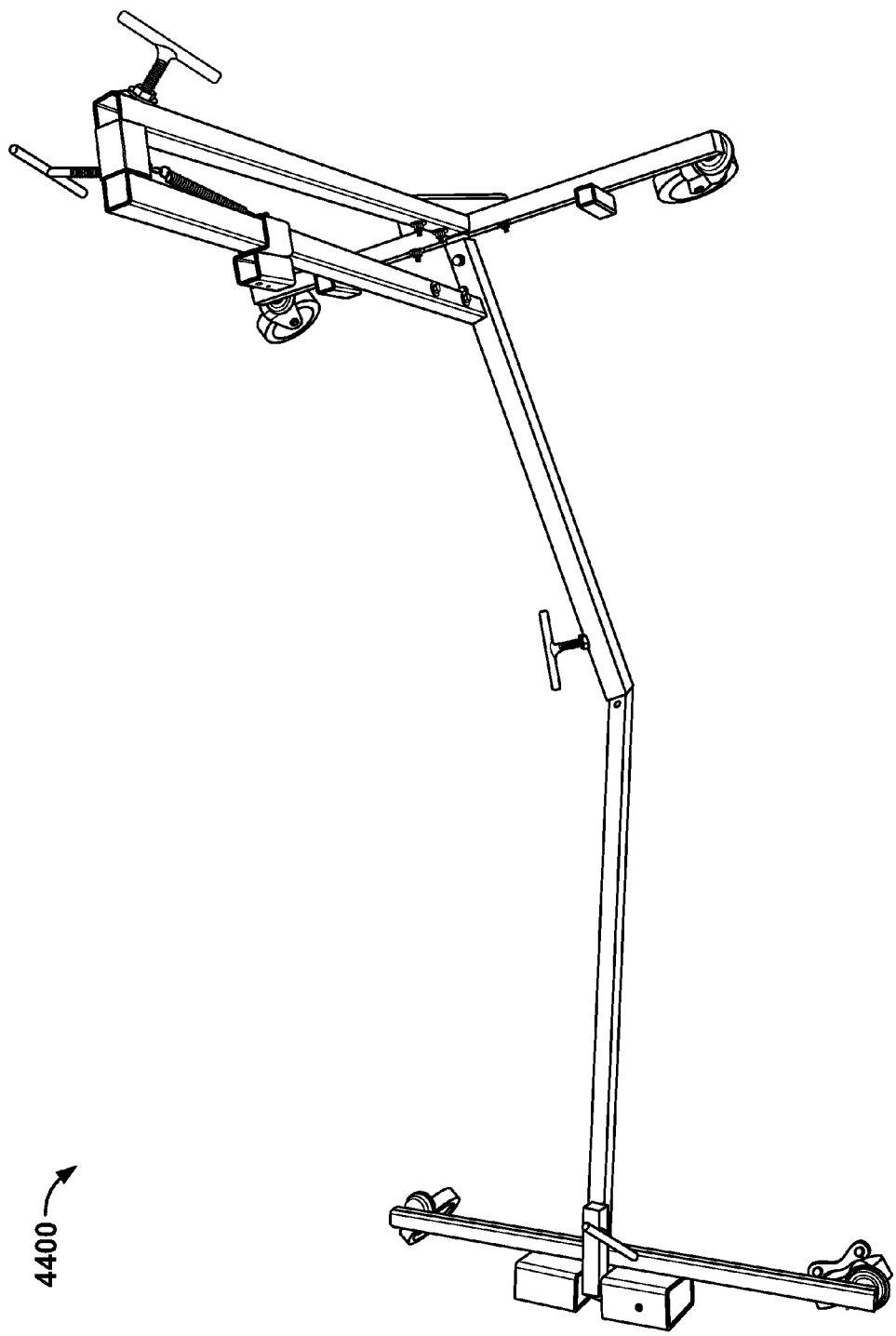
Figure 45:
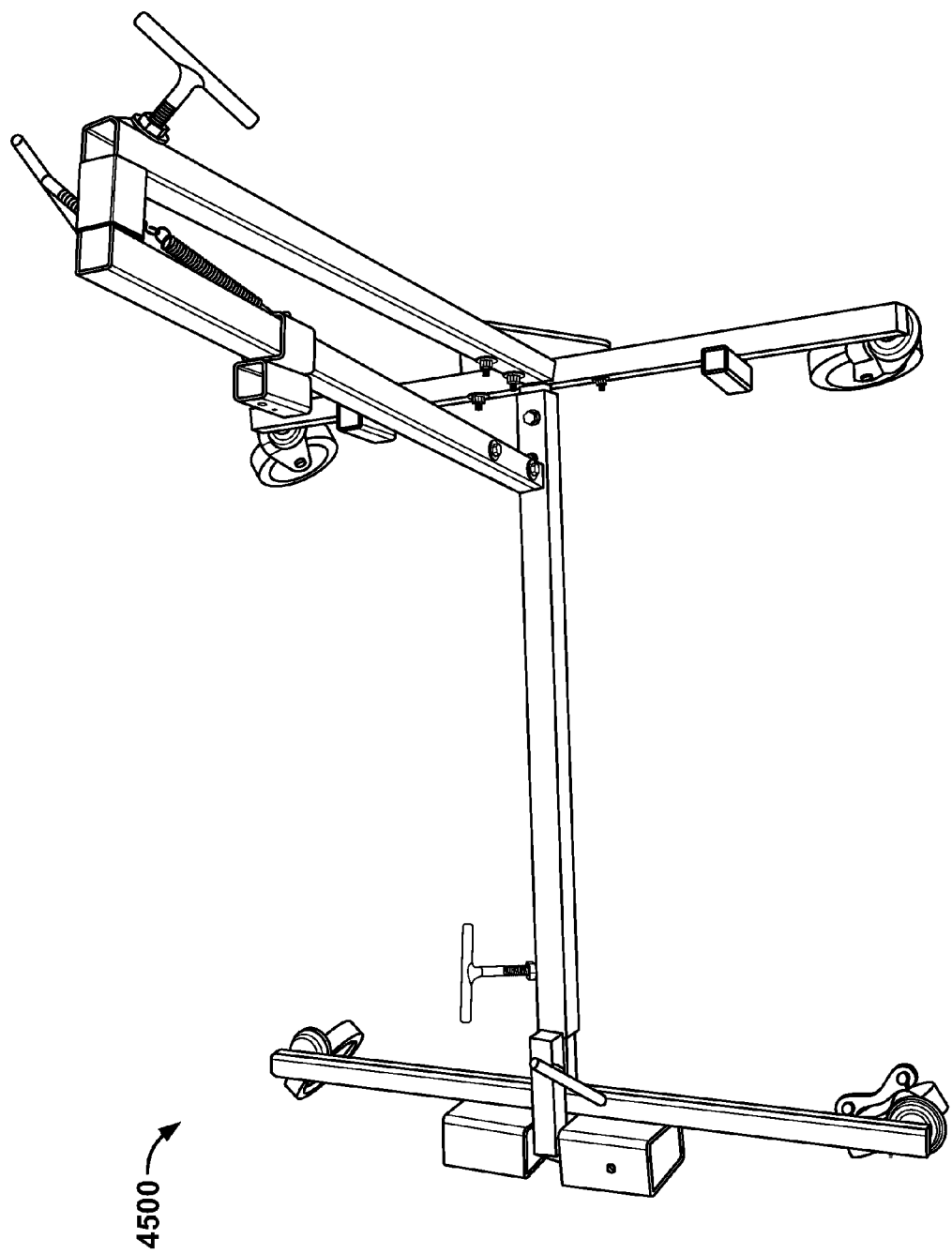
Figure 46:
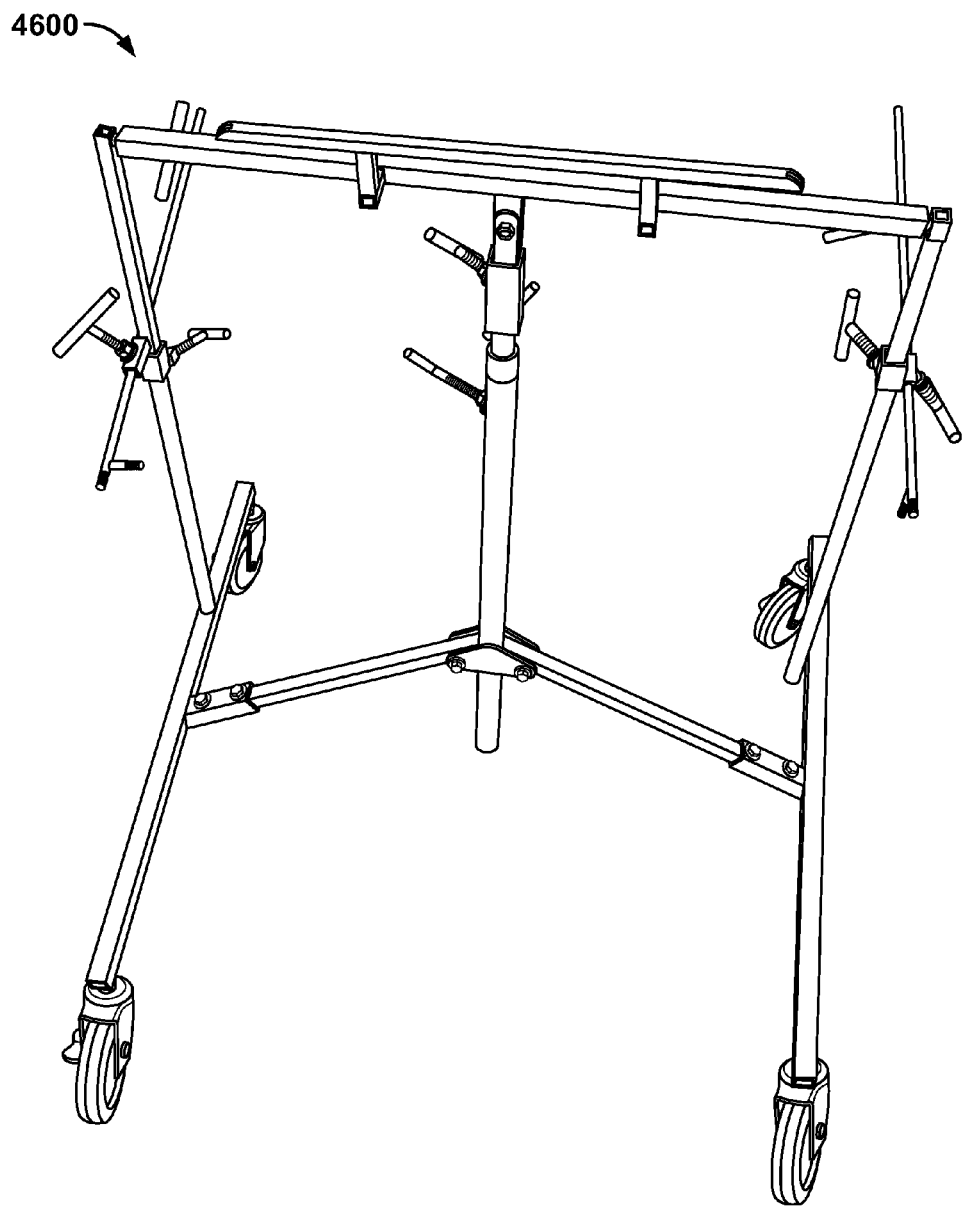
Figure 47:
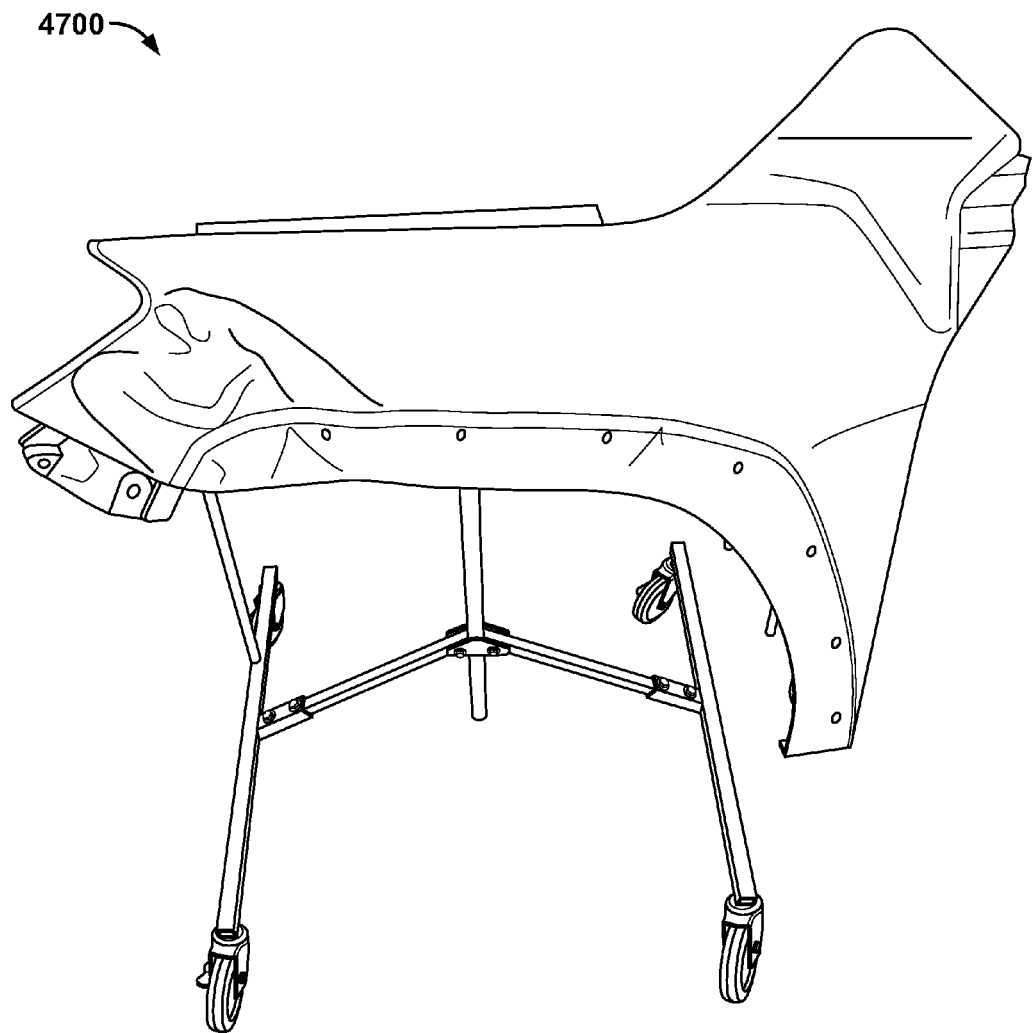
Figure 48:
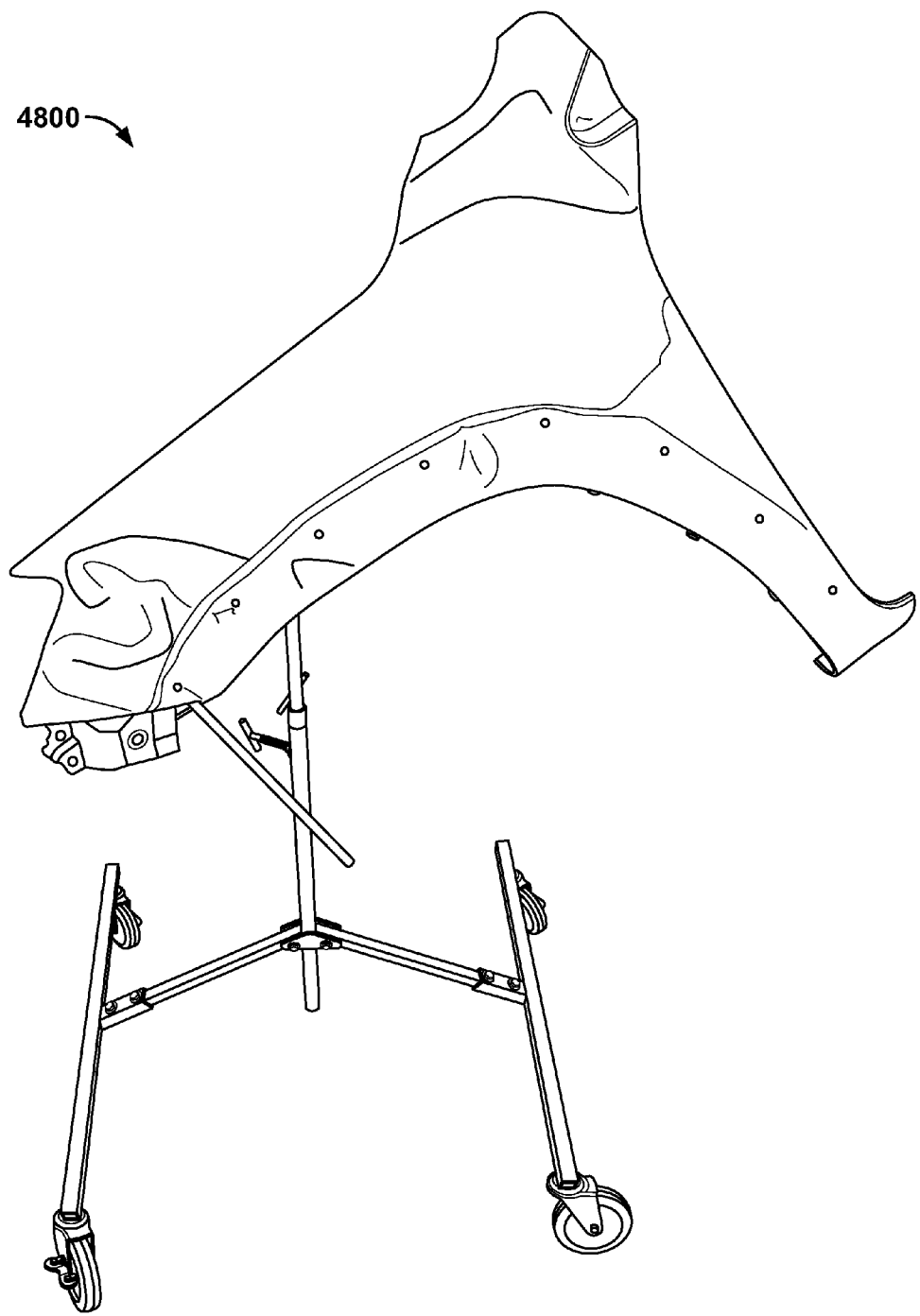
Figure 49:
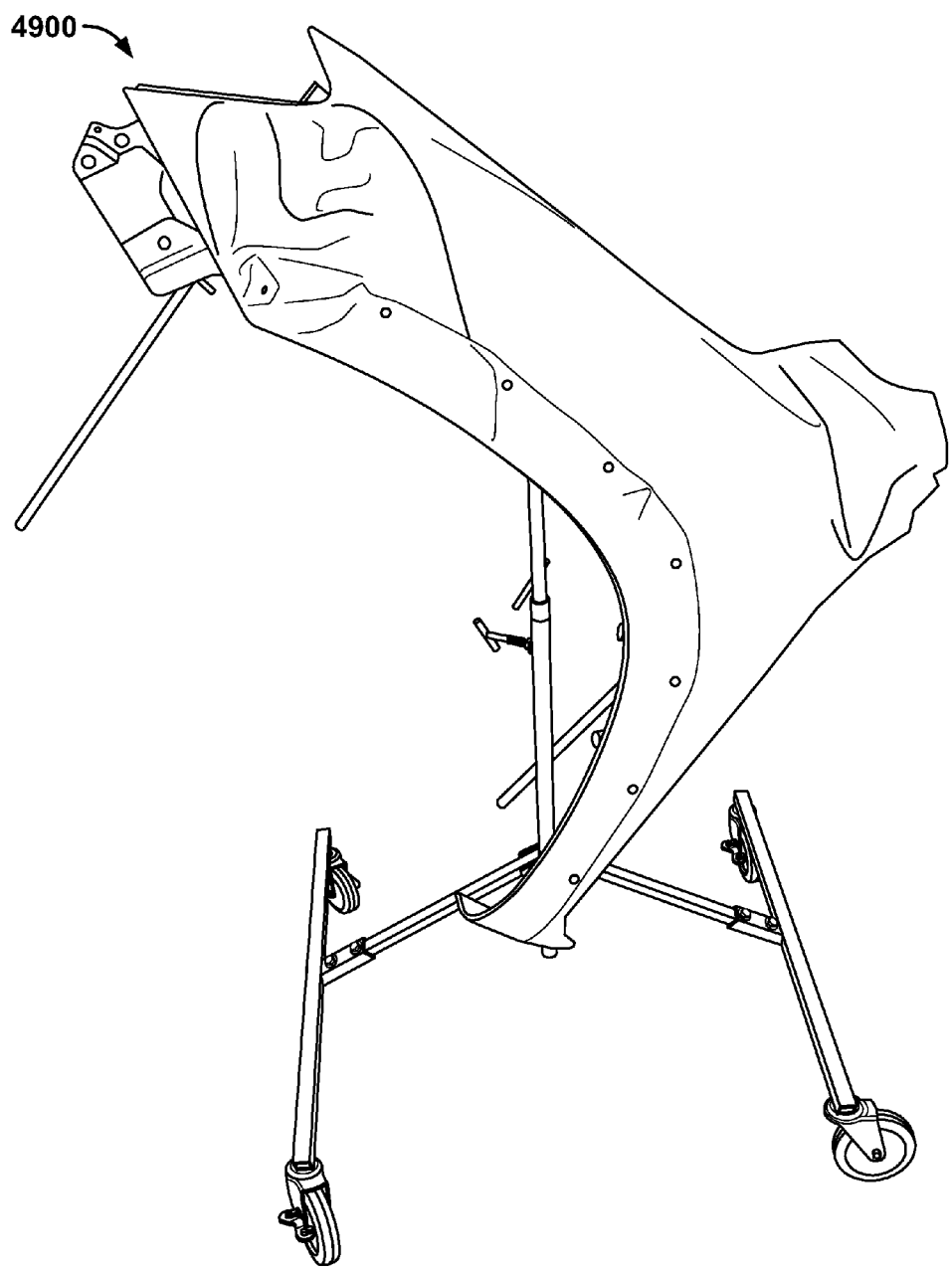
Figure 50:
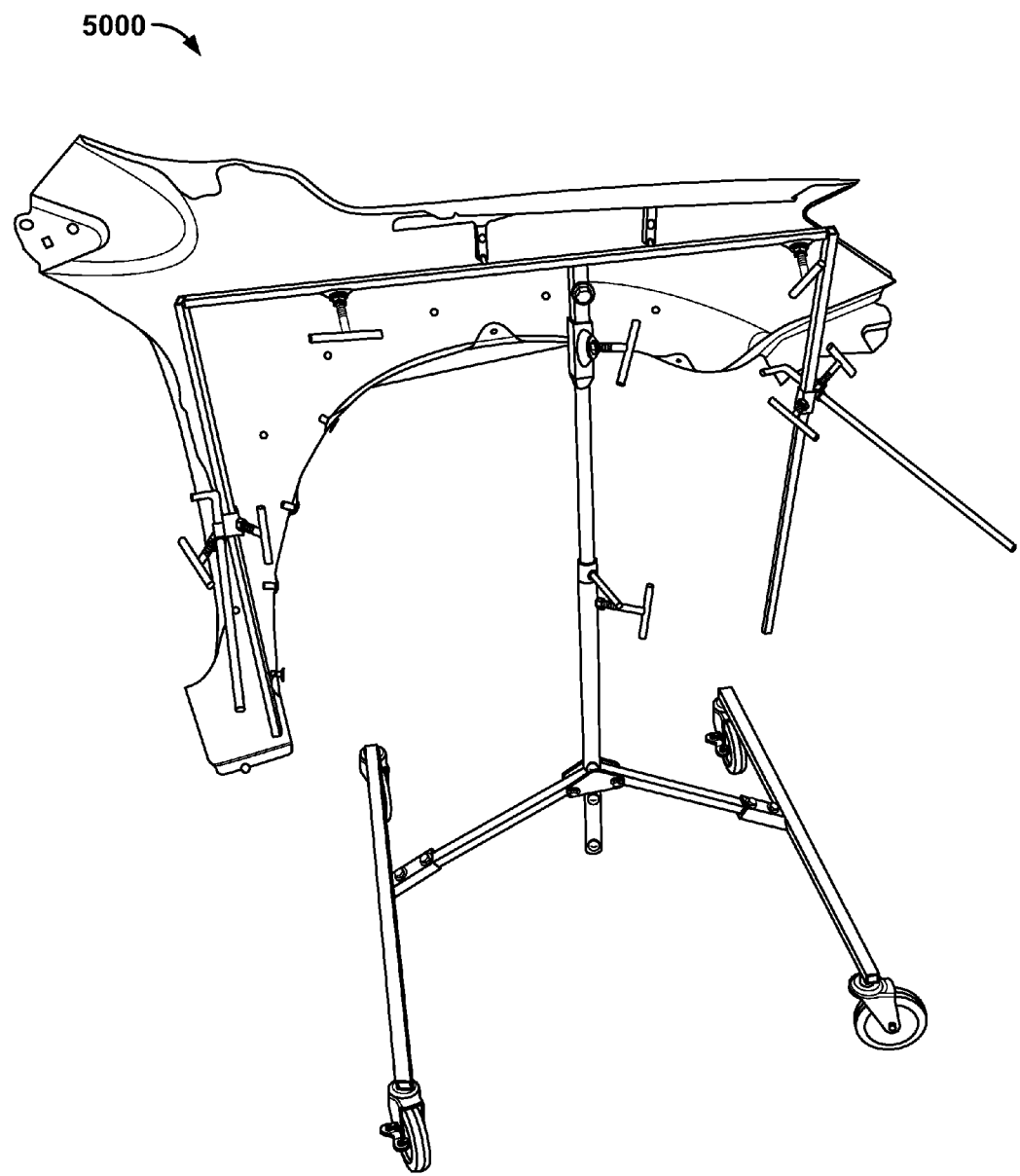

FIGS. 33-55 depict various views of exemplary embodiments of an apparatus for supporting vehicle components for repair and painting. In some embodiments, an apparatus for supporting vehicle components may comprise a base frame and removable heads for enabling the user to customize the apparatus for varying purposes. In some embodiments, the stand depicted generally in figures in a substantially square or rectangular shape may comprise any shape constructed to allow the vehicle components to be painted, or the like. FIGS. 33 and 34 depict bumper heads 3300, 3400 that may be attached to a main stand or a "mini" stand, for example, the main stand 3500 or the mini stand 3600 depicted in FIG. 35 and FIG. 36. FIG. 35 depicts an exemplary main stand 3500 and FIG. 36 depicts a "mini" stand 3600 constructed to allow the attachment and painting of individual components, or the like. The components (wheels, frame, etc.) of each of these stands are the same or similar to those depicted in the bases of the apparatus described, supra, and are not re-described now in the interest of brevity. The main stand and the mini stand may be adapted to receive the heads, which may be removable, or the like. The heads may comprise a small parts head 3700, as depicted in FIG. 37; a pivot head 3800, for example, as depicted in FIG. 38; a hook head 3900, for example, as depicted in FIG. 39; a fender head 4000, for example, as depicted in FIG. 40; a table top head 4100, for example, as depicted in FIG. 41; and/or the like. In some embodiments, the stand may comprise door hinge members, for example, the door hinges members 4200 depicted in FIG. 42. FIGS. 43-45 depict various views of a main stand 4300, 4400, 4500.

Figure 51:
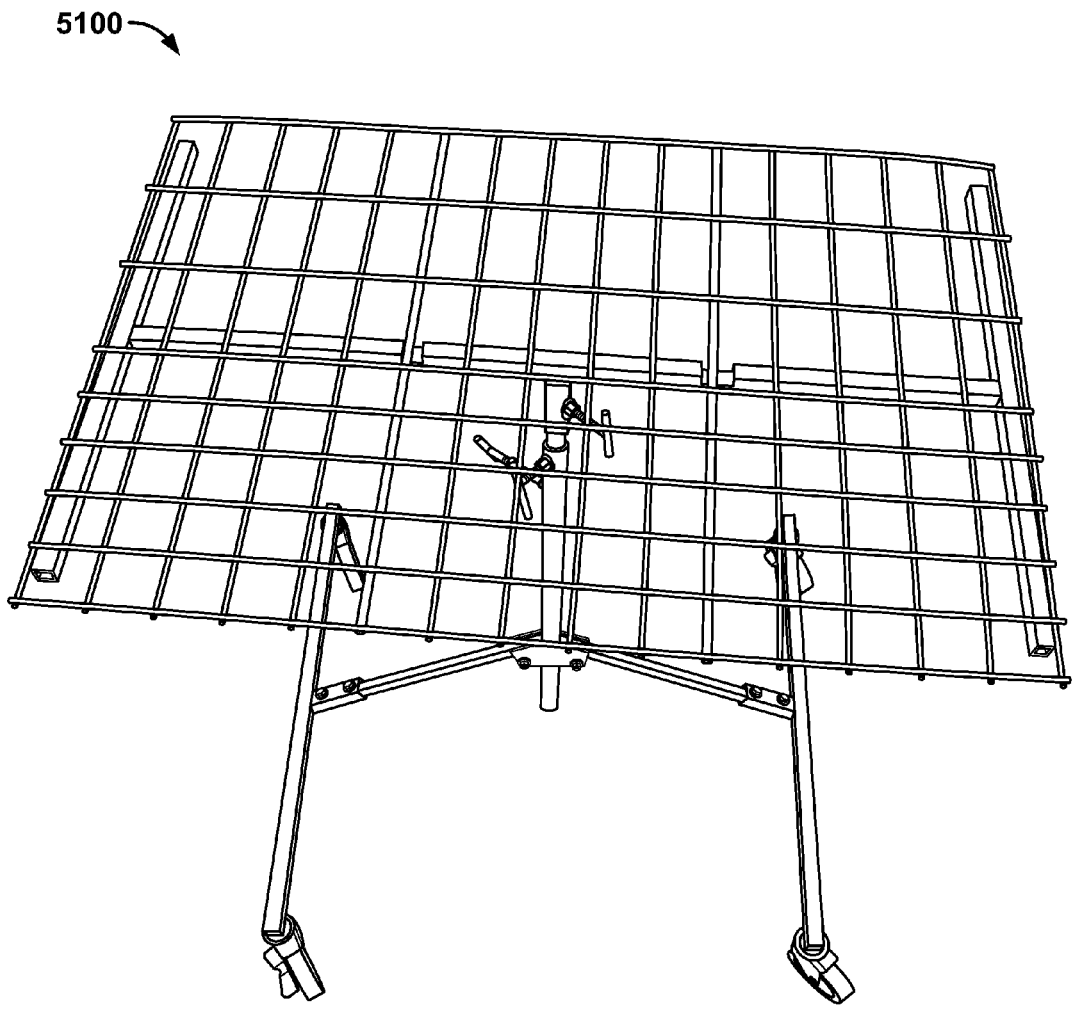
Figure 52:
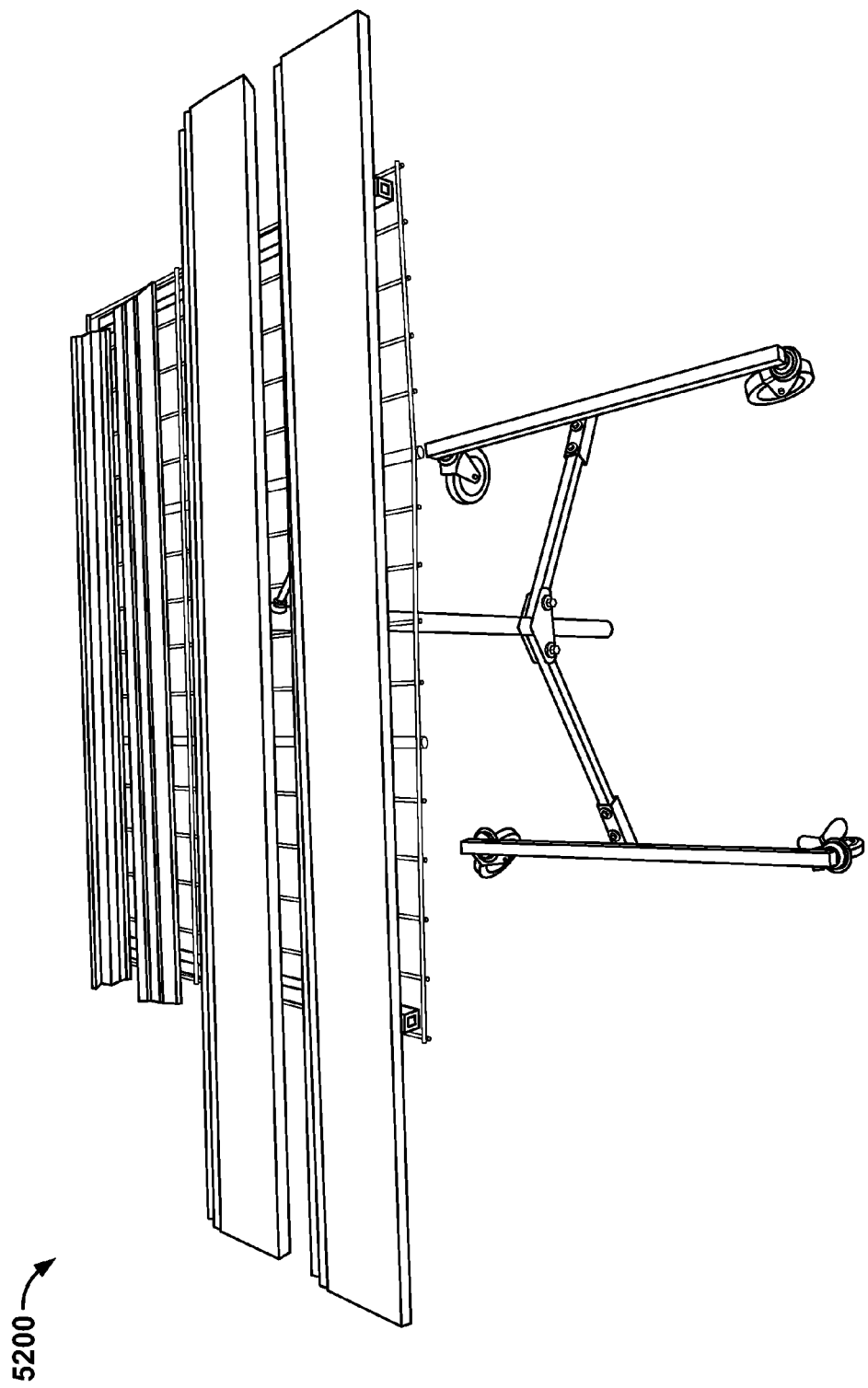
Figure 53:
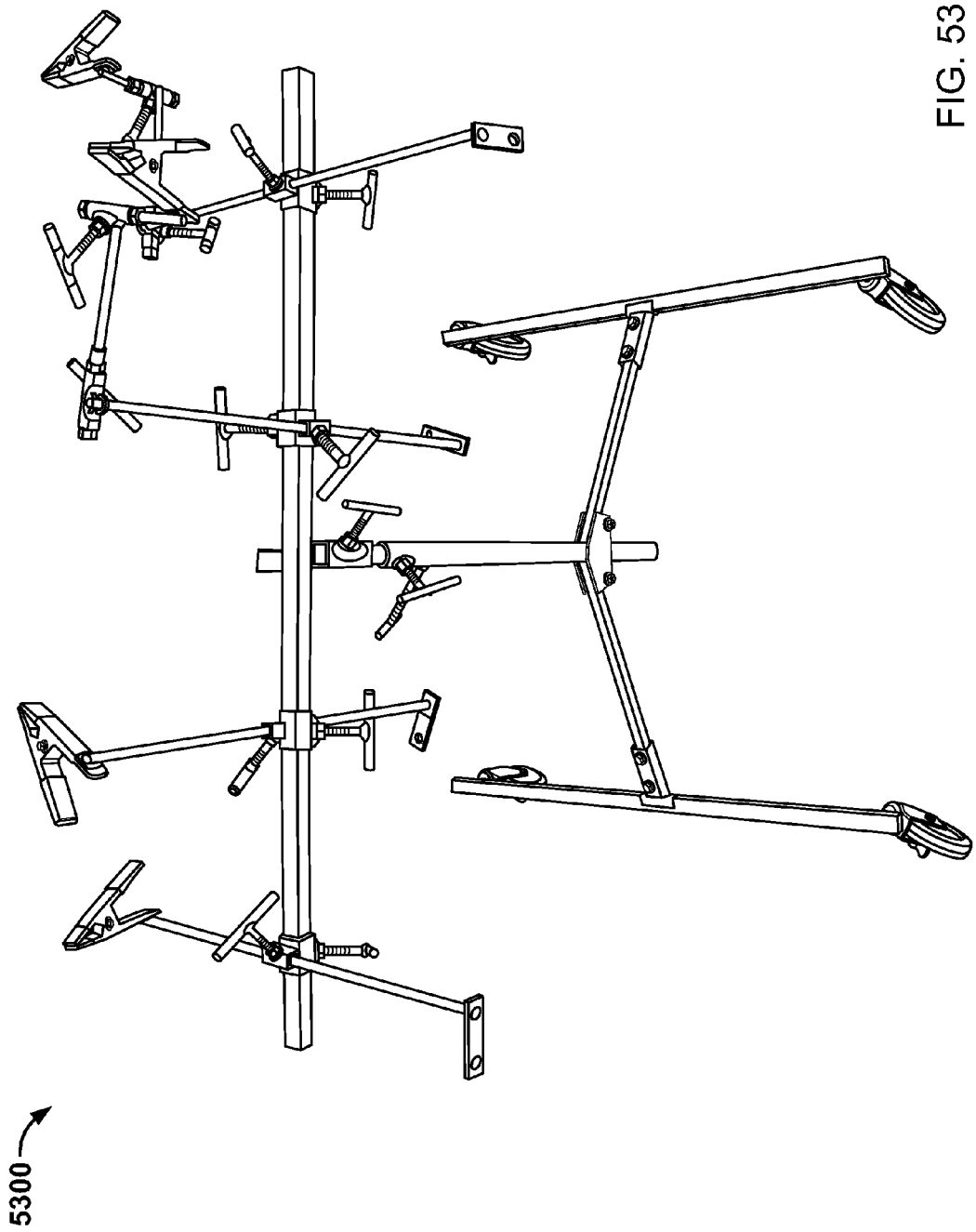
Figure 54:
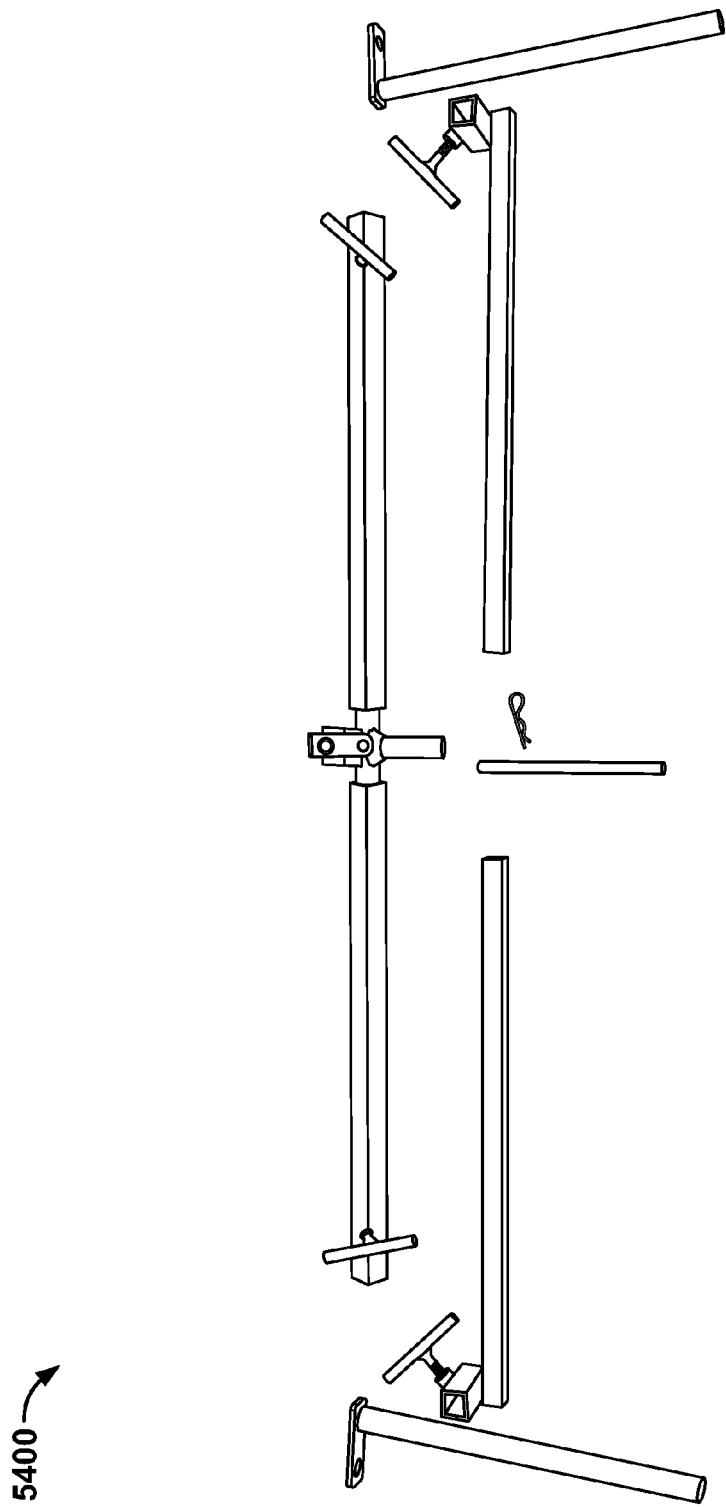
Figure 55:
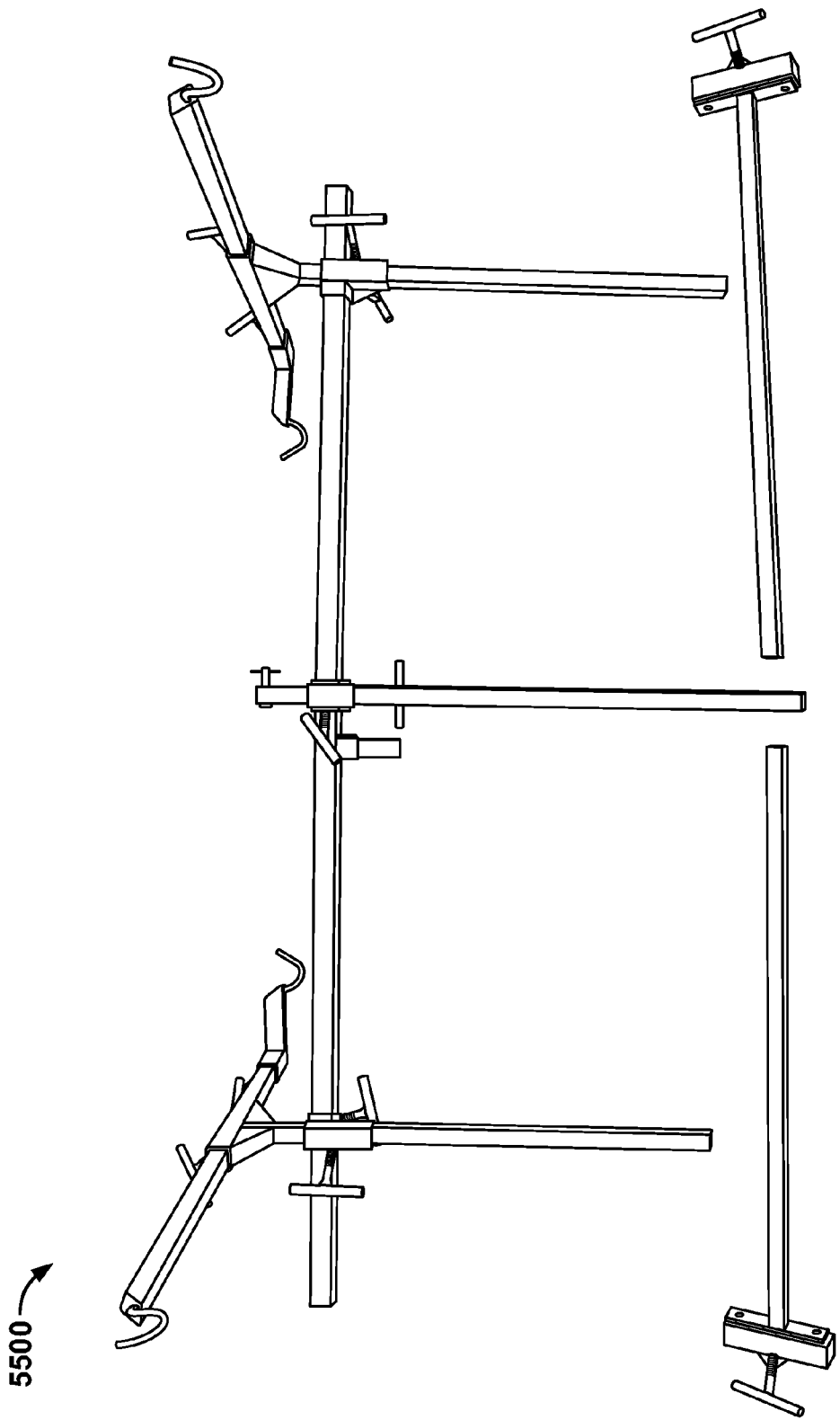

In exemplary embodiments, a main stand 3500 and/or "mini" stand 3600, for example, the main stand 3500 depicted in FIG. 35; or the "mini" stand 3600 depicted in FIG. 36, may be used to support various components. An exemplary "mini" stand 3600 supporting nothing and supporting a fender in various positions 4600, 4700, 4800, 4900, and 5000 is depicted by FIGS. 46-50. The "mini" may also support a table top head 5100, for example, as depicted in FIG. 51. FIGS. 51-52 depict a table top head 5100 and stand with and without supported components 5100, 5200. The "mini" may also support a small parts head, for example, the small parts head 3700 depicted in FIG. 37. FIG. 53 depicts small parts head attached to a mini 5300. FIG. 54 generally depicts a pivot head separated into its various components 5400. FIG. 55 generally depicts a hook head 5500, for example, the hook head depicted in FIG. 39, in an open position.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A method for repairing and painting a damaged vehicle, the method comprising:
   providing an apparatus for supporting vehicle body components for repair and painting comprising:
   an articulated hood support;
   an articulated fender support;
   an articulated door support; and
   wherein the hood, fender and door supports are operable to position the vehicle body components in a driveable orientation to provide for blending of paint across the vehicle components;
   removing the vehicle body components from the damaged vehicle to accomplish body component repairs;
   repairing damaged vehicle body components;
   supporting the vehicle body components on the apparatus in the driveable orientation;

priming and jambing the vehicle body components;

sanding the vehicle body components for a final paint finish;

applying the final paint finish to the vehicle body components; and replacing the vehicle body components on the vehicle.

2. The method of claim 1, wherein the hood support is rotatable and operable to position the hood in an open and closed orientation.

3. The method of claim 1, wherein the apparatus further comprises:

a pair of base struts connected by a center beam; and wheels attached to the pair of base struts.

4. The method of claim 3, wherein the center beam is telescoping.

5. The method of claim 3, wherein the apparatus further comprises:

support legs extending upwards from the base struts;

upper cross members supported by the support legs, the upper cross members comprising a main support for an opposing end of a rotatable hood mount.

6. The method of claim 5, wherein the upper cross members are adjustable cooperatively width-wise based on the adjustment of the telescoping center beam.

7. The method of claim 6, wherein the hood mount comprises an adjustable telescoping cross-brace which extends between opposing pivot points, each pivot point supported below a respective cross member.

8. The method of claim 7, wherein the pivot points are linearly adjustable along a portion of the upper cross member so as to adjust for different hood lengths.

9. The method of claim 7, further comprising a pair of support arms extending from the telescoping cross-brace, each support arm respectively supporting an adjustable hood bar, the hood bar having a first end constructed to bolt directly to an inside surface of a hood and directly support the hood on the apparatus.

10. An apparatus for supporting vehicle body components for repair and painting comprising:

an articulated hood support;

an articulated fender support;

an articulated door support; and wherein the hood, fender and door supports are operable to position the vehicle body components in a driveable orientation to provide for blending of paint across the vehicle components.

11. The apparatus of claim 10, wherein the hood support is rotatable and operable to position the hood in an open and closed orientation.

12. The apparatus of claim 10, wherein the apparatus further comprises:

a pair of base struts connected by a center beam; and wheels attached to the pair of base struts.

13. The apparatus of claim 12, wherein the center beam is telescoping.

14. The apparatus of claim 13, wherein the apparatus further comprises:

support legs extending upwards from the base struts;

upper cross members supported by the support legs, the upper cross members comprising a main support for an opposing end of a rotatable hood mount.

15. The apparatus of claim 14, wherein the upper cross members are adjustable cooperatively width-wise based on the adjustment of the telescoping center beam.

16. The apparatus of claim 15, wherein the hood mount comprises an adjustable telescoping cross-brace which extends between opposing pivot points, each pivot point supported below a respective cross member.

17. The apparatus of claim 16, wherein the pivot points are linearly adjustable along a portion of the upper cross member so as to adjust for different hood lengths.

18. The apparatus of claim 17, further comprising a pair of support arms extending from the telescoping cross-brace, each support arm respectively supporting an adjustable hood bar, the hood bar having a first end constructed to bolt directly to an inside surface of a hood and directly support the hood on the apparatus.

* * * * *